(12) United States Patent
Elisha

(10) Patent No.: US 11,981,402 B1
(45) Date of Patent: May 14, 2024

(54) FLOATING SYSTEM FOR AN OFFSHORE WIND TURBINE

(71) Applicant: Nicholas John Vincent Elisha, Sugarland, TX (US)

(72) Inventor: Nicholas John Vincent Elisha, Sugarland, TX (US)

( * ) Notice: Subject to any disclaimer, the term of this patent is extended or adjusted under 35 U.S.C. 154(b) by 0 days.

(21) Appl. No.: 18/349,146

(22) Filed: Jul. 9, 2023

Related U.S. Application Data

(63) Continuation of application No. 18/318,927, filed on May 17, 2023, now abandoned.

(60) Provisional application No. 63/381,780, filed on Nov. 1, 2022.

(51) Int. Cl.
| | |
|---|---|
| *B63B 35/44* | (2006.01) |
| *B63B 21/50* | (2006.01) |
| *B63B 35/38* | (2006.01) |
| *B63B 39/03* | (2006.01) |
| *B63B 75/00* | (2020.01) |
| *F03D 13/25* | (2016.01) |

(52) U.S. Cl.
CPC ............ *B63B 35/44* (2013.01); *B63B 21/502* (2013.01); *B63B 21/507* (2013.01); *B63B 35/38* (2013.01); *B63B 39/03* (2013.01); *B63B 75/00* (2020.01); *F03D 13/25* (2016.05); *B63B 2021/505* (2013.01); *B63B 2035/446* (2013.01); *F05B 2240/93* (2013.01); *F05B 2240/95* (2013.01)

(58) Field of Classification Search
CPC .......... B63B 35/44; B63B 75/00; B63B 35/38
See application file for complete search history.

(56) References Cited

U.S. PATENT DOCUMENTS

2021/0276673 A1\* 9/2021 Boo ........................ F03D 13/25

FOREIGN PATENT DOCUMENTS

| AU | 2021276567 A1 * | 2/2023 | ............ B63B 21/20 |
| CN | 105240221 A * | 1/2016 | ............ B63B 1/107 |
| WO | WO-2018122220 A1 * | 7/2018 | ............ B63B 1/107 |

\* cited by examiner

*Primary Examiner* — S. Joseph Morano
*Assistant Examiner* — Jovon E Hayes
(74) *Attorney, Agent, or Firm* — Ashok Tankha

(57) ABSTRACT

The floating system is a single column tension leg platform for a floating offshore wind turbine (SCTLP). The single column tension leg platform comprises a central main vertical floating column, a buoyant base attached to and disposed below the central main vertical floating column, a station keeping system attached to the buoyant base, and an inter array cable riser system. The buoyant base is of one of a triangular shape and a circular shape.

18 Claims, 48 Drawing Sheets

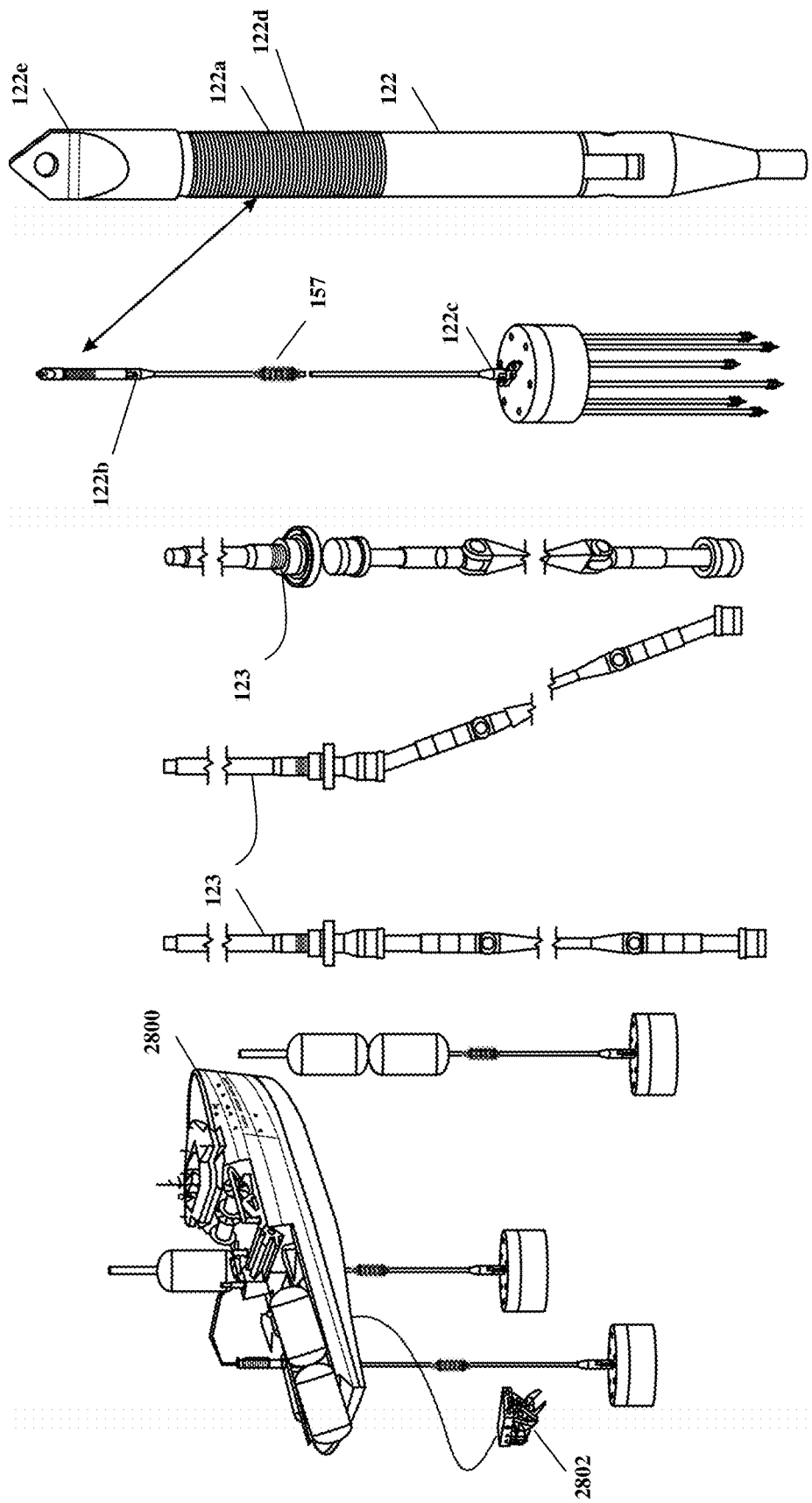

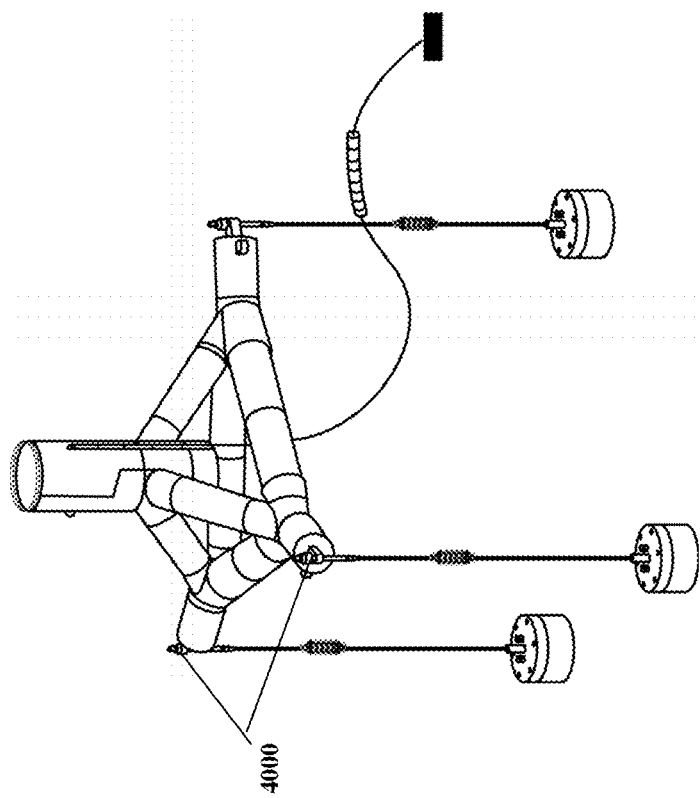
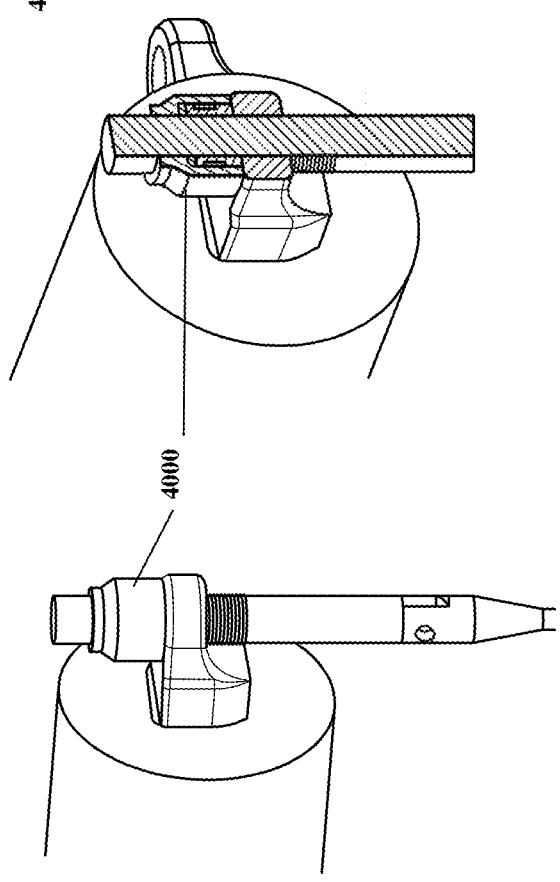
FIG. 40C
FIG. 40B
FIG. 40A

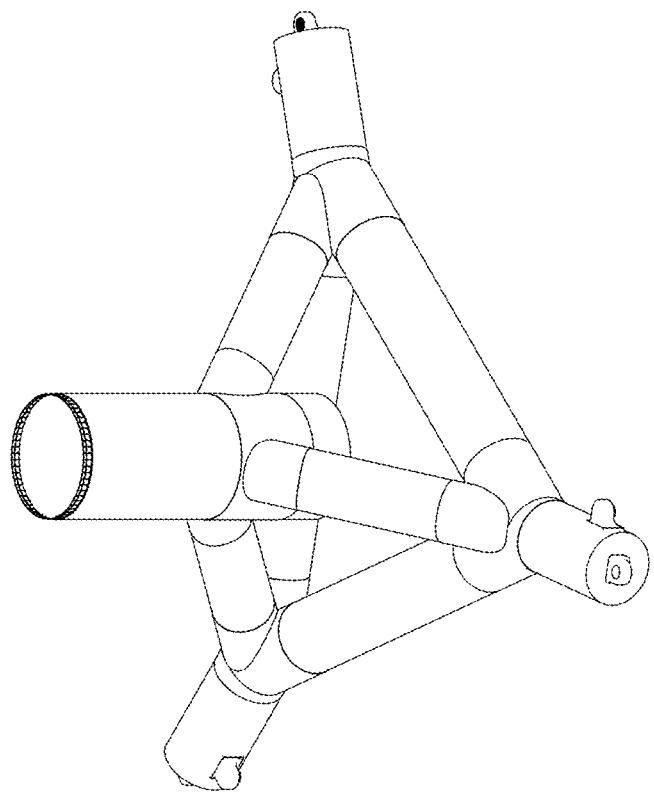
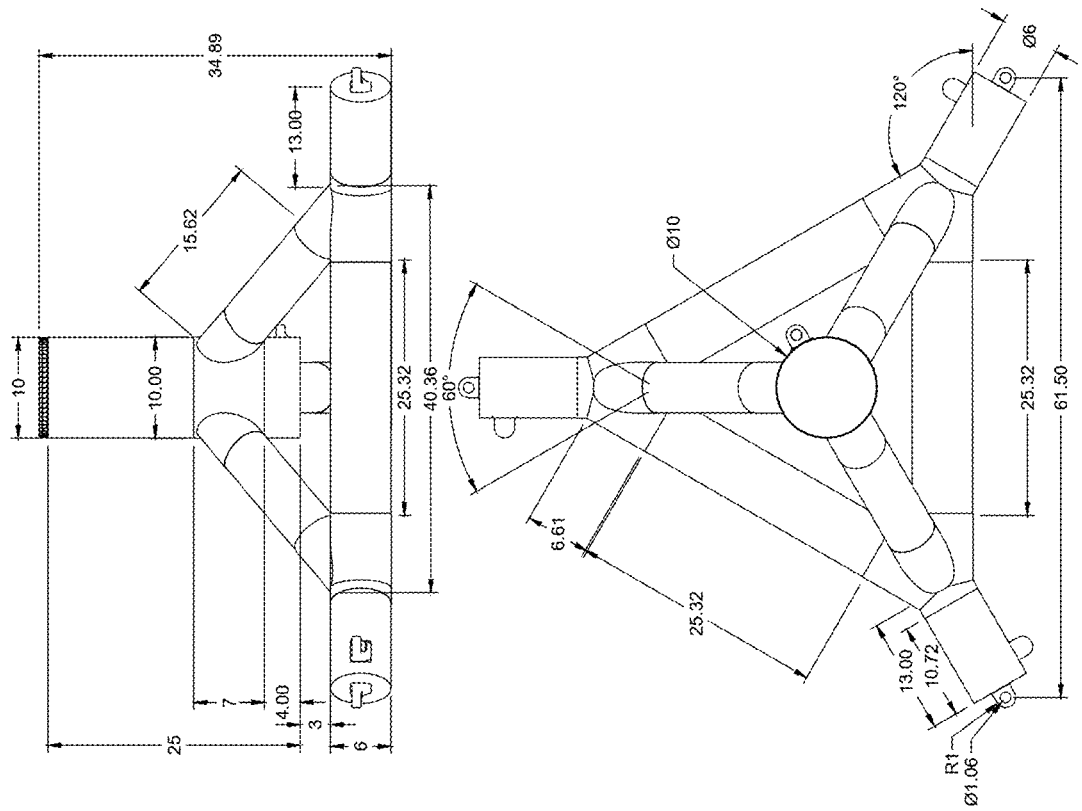
FIG. 44A

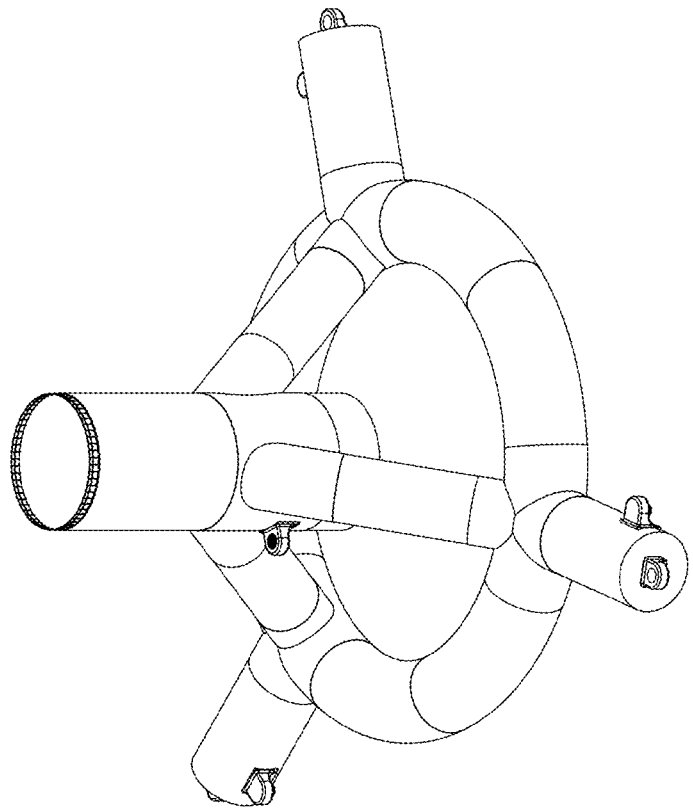
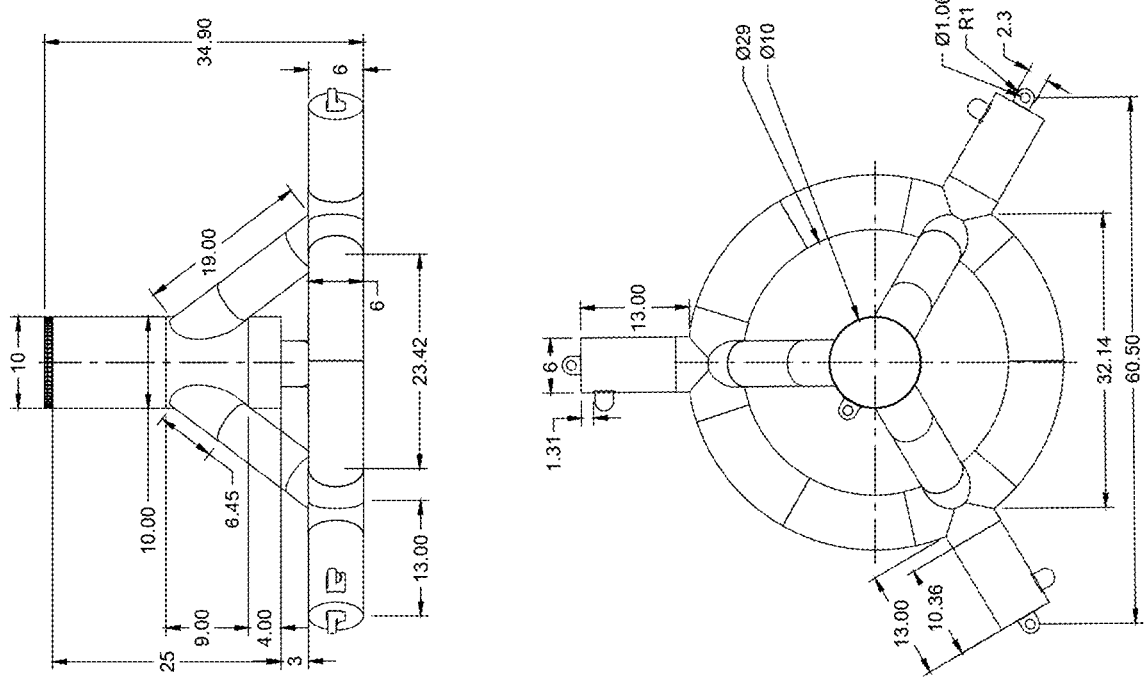
FIG. 44B

FLOATING SYSTEM FOR AN OFFSHORE WIND TURBINE

CROSS REFERENCE TO RELATED APPLICATIONS

This application claims priority to and the benefit of the provisional patent application titled "ELISHA—Floating Offshore Wind Turbine System (FOWT)", application No. 63/381,780, filed in the United States Patent and Trademark Office on Nov. 1, 2022. The specification of the above referenced patent application is incorporated herein by reference in its entirety.

BACKGROUND

1. Field of the Invention

This invention, in general relates to floating offshore support platforms that can support structures placed on or above the surface of a body of water, and can maintain a stable, substantially upright orientation in shallow and deep water. More specifically, this invention relates to a single column tension leg platform for supporting an offshore wind turbine.

2. Description of Related Art

Offshore Wind projects in the United States and around the world have started accelerating with the intention of reducing our dependence on fossil fuels and lowering our carbon footprint. Wind based energy production over a water body requires placement of either a fixed-bottom offshore platform or a floating structure in a body of water. A fixed-bottom offshore platform is rigidly attached to a bottom of the water body. Examples of fixed-bottom offshore platforms comprise monopile platforms, tri-pod platforms, suction bucket platforms, gravity-based platforms, jacket-based platforms, etc. The fixed-bottom offshore platforms are limited to water depths of up to around 165 feet. Floating structures are either permanently or semi-permanently placed in a body of water, and may be anchored to the bottom of the water body using a station keeping system comprising of cables, steel or fibre tendons, chains etc or a combination of them with an appropriate anchoring system. A lot of factors affect the manner in which these floating structures are placed and supported to create a floating offshore wind turbine (FOWT) system. Examples of such factors comprise weight and size of the turbine, structure, depth of the water, wind speed and sea conditions at the place where the structure is placed, etc. Approximately 58% wind resources in the US and approximately 80% wind resources in the rest of the world are located in waters having a depth of over 60 mtrs, and require FOWT foundations. FOWT systems help harness wind energy from sites further from shore, out of sight, with better winds. Furthermore, floating wind technology is expected to be deployed at utility scale by the year 2024.

Therefore, optimized FOWT systems are required for the success of floating offshore wind turbine (FOWT) industry. Floating Offshore platforms have been used in offshore Oil & Gas floating industry from many years. To maintain the competitive advantage of the United States in the fast-developing FOWT industry and transfer experience and lessons learnt from the offshore Oil & Gas floating industry, there is a long felt need for a simple yet robust and scalable floating system to cater to both Horizontal Axis Wind Turbines (HAWT) and Vertical Axis Wind Turbines (VAWT) which are increasing in size by about 15% each year.

Wind development is still heavily subsidized by governments so the Wind industry will have to drastically optimize their projects to lower project Levelized Cost Of Electricity (LCOE) to be feasible, especially when government subsidies are steadily withdrawn. Projects are being awarded at highly competitive strike rates which have steadily fallen globally by approximately 70% over the past several years which is a challenge to wind projects. A smaller commercial sized 800 MW floating wind project with 13 MW turbines currently requires about 60-63 FOWT's units to be constructed and installed on a single project. If not drastically optimized and supply chain de-risked, they have a greater chance of defaulting putting our renewable energy goals at risk. This means the LCOE will have to be constantly optimized for the project to be feasible over its lifetime, especially floating offshore wind, which is currently an expensive endeavour. Hence, there is a long felt need for a floating system having a lower project Levelized Cost Of Electricity (LCOE).

Some of the key components to reducing LCOE is an efficient floater design, optimization of its supply chain efficiency, widely spread fabrication with non-complex FOWT structural design, and optimized transport & installation costs. Hence, there is a long felt need for a floating system that has a simple FOWT structural design which can be easily transported and installed. There is also a long felt need for a floating system that can be fully assembled and easily commissioned onshore or quayside, has adequate stability and shallow draft for quayside integration while afloat and for final tow out to location, with a simple installation technic eliminating the need for large, hard to find and expensive Wind Turbine Installation Vessels.

SUMMARY OF THE INVENTION

This summary is provided to introduce a selection of concepts in a simplified form that are further disclosed in the detailed description of the invention. This summary is not intended to determine the scope of the claimed subject matter.

The floating system disclosed herein addresses the above-recited need for a simple yet robust and scalable floating system to cater to both Horizontal Axis Wind Turbines (HAWT) and Vertical Axis Wind Turbines (VAWT). This optimized floating system has the potential to lower a project's Levelized Cost Of Electricity (LCOE). Furthermore, the floating system has a simple FOWT structural design, and can be easily fabricated, transported and installed. The floating system can be fully assembled and easily commissioned onshore or quayside. The floating system has adequate stability and shallow draft for quayside integration while it is afloat, and for final tow out to location. The floating system disclosed herein is a single column tension leg platform (SCTLP) for a floating offshore wind turbine (FOWT). The single column tension leg platform comprises a central main vertical floating column, a buoyant base attached to the central main vertical floating column, a station keeping system attached to the buoyant base, and an inter array cable riser system. The buoyant base is of either a triangular shape or a circular shape.

The central main vertical floating column comprises a vertical tubular column hull, a transition piece connector at a top end of the vertical tubular column hull for connecting the vertical tubular column hull to a nacelle rotor assembly. There are decks within the vertical tubular column hull for housing one or more of a passive ballast and marine systems. The central main vertical floating column also comprises firefighting equipment, lifesaving equipment, a redundant mooring tendon porch, and a plurality of mooring points and hook up systems. In an embodiment, the firefighting equipment and the lifesaving equipment are housed on the decks within the vertical tubular column hull. The central main vertical tubular column is designed to be fitted with either a horizontal axis wind turbine (HAWT) or a vertical axis wind turbine (VAWT). The passive ballast system comprises a plurality of ballast tanks for water and/or permanent ballast with appropriate vent pipes and sounding systems. The central main vertical floating column further comprises other systems necessary for the functioning of the FOWT including temporary installation aids and power generation equipment. In an embodiment, the temporary installation aids and the power generation are housed on the decks within the vertical tubular column hull.

The buoyant base comprises three or more pontoons, three or more pontoon extensions, three or more end joints for connecting the pontoons and the pontoon extensions, three or more column braces for connecting the pontoons to the vertical tubular column hull, a top ring joint for connecting the three column braces, marine systems and a passive ballast system, and ballast tanks. Each of the pontoons comprises one or more pontoon sections attached together. The nacelle rotor assembly tower comprises a tower comprising two or more tower sections, a nacelle, rotor blades, a turbine, a turbine shaft, a generator, struts, and one or more lighting systems. The station keeping system is a tension leg system, with a micropile drilled helical anchoring system. In an embodiment, station keeping system is either a turret based rotating system, a hybrid combination of gravity, or suction and driven pile. Furthermore, the station keeping system comprises moorings, buoys, permanent length adjustment joint, tendons, main and spare tendon porches, an anchoring system, a spare tendon, and micropiles. The inter array cable riser system comprises a cable hull entry point assembly, riser system, and appropriate mattressing at the cable landing area on the sea floor. The (SCTLP) is extensively optimized and requires a proprietary installation process as described below, and installation tools for it to be safely and economically installed.

A method for assembling and installing a single column tension leg platform-floating offshore wind turbine (SCTLP-FOWT) is also disclosed. The method comprises assembling the buoyant base by connecting three or more curved or straight pontoons, three or more pontoon extensions to which a main and spare tendon porch are attached, three or more end joints, three or more column braces, and a top ring joint. The spare tendon porch is used for hook up of a fourth tendon, if required. Next, the method comprises assembling the central main vertical floating column. Assembling the central main vertical floating column comprises outfitting the vertical tubular column hull by housing parts within the vertical tubular column. The parts housed within the vertical tubular column comprises multiple decks for housing one or more of a passive ballast and marine systems. The central main vertical floating column also comprises firefighting equipment, lifesaving equipment, a redundant mooring tendon porch, and a plurality of mooring points and hook up systems. In an embodiment, the firefighting equipment and the lifesaving equipment are housed on the decks within the vertical tubular column hull. The central main vertical floating column further comprises other systems necessary for the functioning of the FOWT including temporary installation aids and power generation equipment. In an embodiment, the temporary installation aids and the power generation are housed on the decks within the vertical tubular column hull. The passive ballast system comprises a plurality of ballast tanks for water and/or permanent ballast, an associated venting system and any other systems required for the functioning of the FOWT. Assembling the central main vertical floating column further comprises positioning the buoyant base below the central main vertical floating column and attaching the central main vertical tubular column to the buoyant base. Assembling the central main vertical floating column further comprises attaching the three or more column braces to the vertical tubular column hull. The buoyant base provides support to the vertical tubular column hull. On completion of assembly of the vertical tubular column hull and its subcomponents, a transition piece is attached to the top of the vertical tubular column hull, which facilitates the connection of the tower, nacelle rotor assembly and blades quayside, followed by entire system integration and commissioning. Next, the floating offshore wind turbine is attached to the vertical tubular column hull using the transition piece connector.

The method for assembling the SCTLP-FOWT further comprises of installing the station keeping system at an offshore installation site, ballasting down the single column tension leg platform to tow out draft, towing out the SCTLP-FOWT to installation site, attaching the fully assembled single column tension leg platform to the station keeping system at the offshore installation site, ballasting down the SCTLP-FOWT to lock off draft, hooking up the single column tension leg platform to A permanent length adjustment joint (LAJ), and de-ballasting the single column tension leg platform to tension the mooring and bringing the single column tension leg platform to operational draft. The station keeping system comprises the permanent length adjustment joint, moorings/tendons, load reduction device (if required), temporary buoys and spacer wires, an anchoring system, which could be micropiles or any other suitable anchoring system. Furthermore, installing the station keeping system comprises anchoring the station keeping system to the sea floor and vertically stowing it off the sea floor using the temporary buoys and spacer wires ready for hook up to the FOWT.

The method for assembling SCTLP-FOWT further comprises connecting the inter array cable system to the SCTLP-FOWT and to an electrical substation for stabilization before exporting the power ashore. The power generated by the SCTLP-FOWT is transmitted to the electrical substation. The inter array cable riser system comprises a cable hull entry point assembly, a riser system, and mattressing to protect the cable at landing point on the sea floor.

The method for assembling the single column tension leg platform further comprises installing the anchor system in the sea floor using the micropiles or other appropriate anchoring systems, attaching the tendons to the anchor system using a tendon bottom connector which connects into a main tendon connector on the anchor system, fitting a load reduction device if required, a short permanent length adjustment joint (LAJ) to top of the tendon, suspending the system vertically in the water column with temporary buoys in between the short permanent length adjustment joint and the tendon, securing the three vertically stowed tendons using spacer wires, positioning the single column tension leg platform over the tendons and hooking up the single column tension leg platform to the station keeping system.

After positioning the single column tension leg platform over the tendons, the method for assembling the single column tension leg platform further comprises installing a disconnectable and reusable length adjustment joint (LAJ) installation tool, a tensioner system and a tendon top connector assembly (TTCA) which sits inside the base of the tensioner system. Next, the method for assembling the single column tension leg platform further comprises connecting the length adjustment joint (LAJ) installation tool to the permanent length adjustment joint (LAJ) which is attached to the top of tendon, activating the tensioner which grips the length adjustment joint (LAJ) installation tool using four sets of gripper pads and the tendon porch of single column tension leg platform via two hydraulic clasps in the tensioner system, which locks the single column tension leg platform to the tendons/station keeping system, and removing the temporary buoys and spacer wires, initiating a crawl of the tensioner system simultaneously along with ballasting down of the single column tension leg platform. The tensioner system is locked to and presses down on the tendon porches and maintains a constant pre-determined pressure while gripping the LAJ installation tool securely, thereby holding the single column tension leg platform firmly in position to the tendons/station keeping system until lock off position and the operational draft is reached.

The method for assembling the single column tension leg platform further comprises levelling the single column tension leg platform using the ballast system when the single column tension leg platform reaches the lock off draft position on a grooved or threaded section of the permanent length adjustment joint (LAJ), thereafter activating the tendon top connector assembly (TTCA) when the single column tension leg platform is fully levelled and upright, and locking the single column tension leg platform to the permanent length adjustment joint (LAJ) and the pre-installed tendons.

After the single column tension leg platform is locked off, the method for assembling the single column tension leg platform further comprises levelling the single column tension leg platform again, and pre-tension equalizing the single column tension leg platform to a pre-calculated lock off draft pre-tension value. The method for assembling the single column tension leg platform further comprises de-ballasting the single column tension leg platform in a controlled manner to in-place or operational draft while closely monitoring draft, tendon tension and maintaining the single column tension leg platform upright throughout the process.

After the single column tension leg platform has reached its final in-place or operational draft, the method for assembling the single column tension leg platform further comprises fine-tuning intended pre-tension by ballast adjustments while ensuring the single column tension leg platform is upright. The method for assembling the single column tension leg platform further comprises securing the ballast system and removing the tensioner system and the length adjustment joint (LAJ) installation tool from the single column tension leg platform.

In one or more embodiments, related systems comprise circuitry for executing the methods disclosed herein. The circuitry is configured to execute the methods disclosed herein depending upon the design choices of a system designer. In an embodiment, various structural elements are employed depending on the design choices of the system designer.

BRIEF DESCRIPTION OF THE DRAWINGS

The foregoing summary, as well as the following detailed description of the invention, is better understood when read in conjunction with the appended drawings. For illustrating the embodiments herein, exemplary constructions of the embodiments are shown in the drawings. However, the embodiments herein are not limited to the specific structures and components disclosed herein. The description of a structure or a component referenced by a numeral in a drawing is applicable to the description of that structure or component shown by that same numeral in any subsequent drawing herein.

FIGS. 28A-28C illustrate steps of installing a station keeping system at an offshore installation site.

FIGS. 40A-40B illustrates installation of a tendon top connector assembly (TTCA) cover.

FIG. 40C illustrates a riser for the inter array-cable system.

FIGS. 44A and 44B illustrate the principal dimensions of the triangular shape buoyant base and the circular shape buoyant base.

DETAILED DESCRIPTION OF THE INVENTION

Disclosed herein is a simple yet robust and scalable floating system to cater to both Horizontal Axis Wind Turbines (HAWT) and Vertical Axis Wind Turbines (VAWT). The floating system disclosed herein is a single column tension leg platform for a floating offshore wind turbine. The floating system has the potential to lower project Levelized Cost Of Electricity (LCOE). Furthermore, the floating system has a simple FOWT structural design, and can be easily transported and installed. The floating system can be fully assembled and easily commissioned onshore or quayside, has adequate stability and shallow draft for quayside integration afloat and for final tow out to location.

Figure 1:
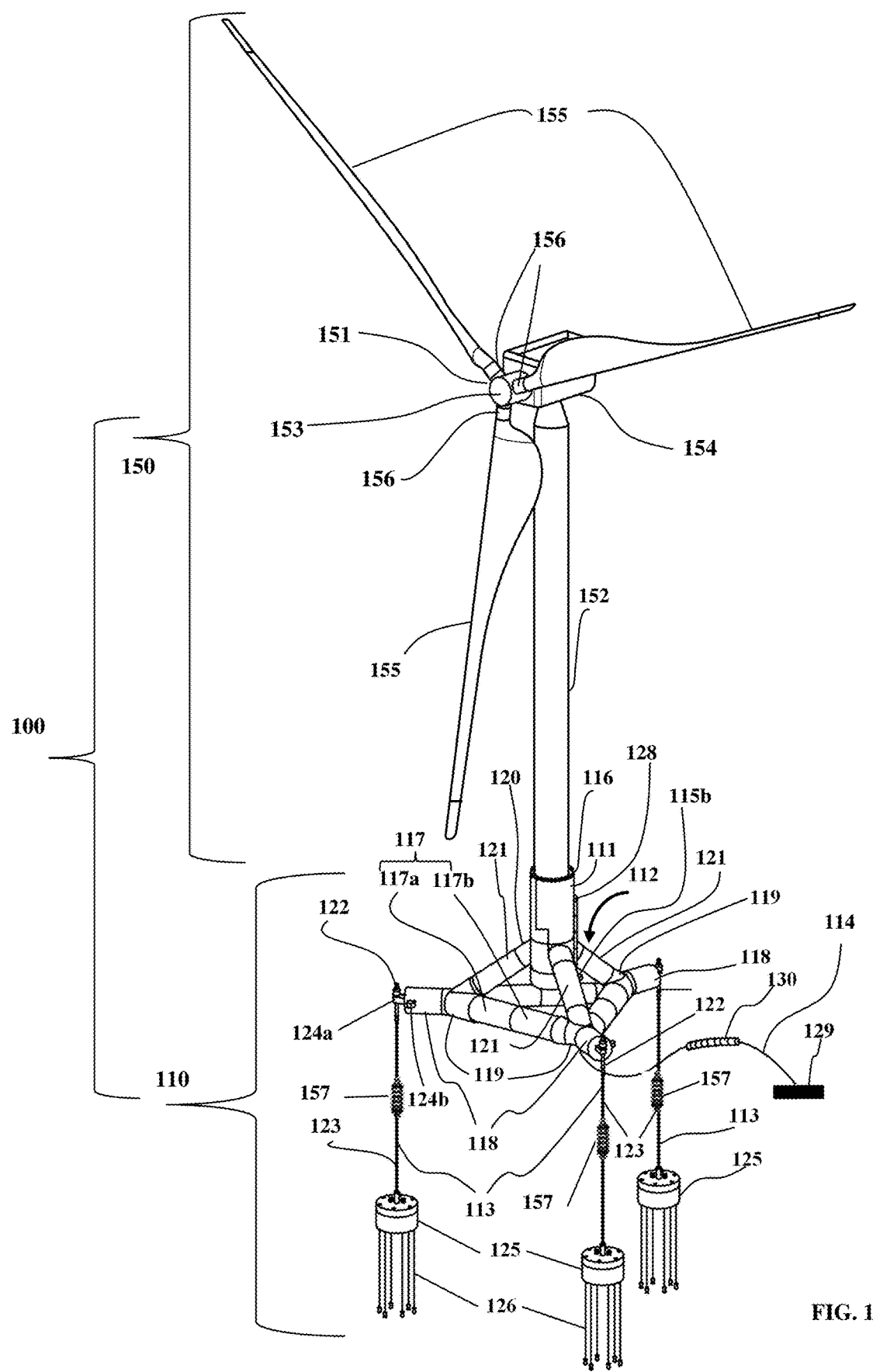
FIG. 1 illustrates an embodiment of a single column tension leg platform floating offshore wind turbine (SCTLP-FOWT) comprising a horizontal axis wind turbine.

FIG. 1 illustrates an embodiment of the single column tension leg platform 110 floating offshore wind turbine 100 comprising a horizontal axis wind turbine 151.

As illustrated in FIG. 1, the single column tension leg platform 110 comprises a central main vertical floating column 111, a buoyant base 112 attached to the central main vertical floating column 111, a station keeping system 113 attached to the buoyant base 112, and an inter array cable system 114. The buoyant base 112 is of either a triangular shape, as illustrated in FIGS. 1, 10-12, 30-35, 37-40 or a circular shape, as illustrated in FIGS. 13 and 21-23.

The single column tension leg platform 110 for a floating offshore wind turbine 100 is designed to float on water with a shallow draft during quayside integration and final tow out to location. Here, shallow draft refers to the fact that when afloat during quayside integration and final tow out to location the buoyant base 112 is not submerged far below the waterline of a waterbody in which the single column tension leg platform 110 is deployed.

Figure 2:
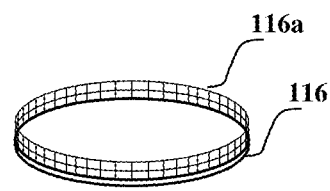
FIG. 2 illustrates a transition piece for connecting a vertical tubular column hull of the single column tension leg platform to a tower of the horizontal axis wind turbine.
Figure 4:
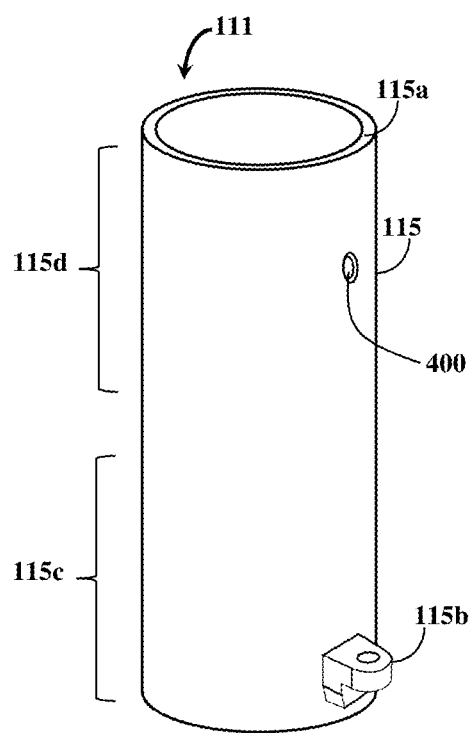
FIG. 4 illustrates the vertical tubular column hull of the single column tension leg platform.

The central main vertical floating column 111 comprises a vertical tubular column hull 115, as shown in FIG. 4, and a transition piece connector 116 at a top end 115a of the vertical tubular column hull 115 for connecting the vertical tubular column hull 115 to a nacelle rotor assembly 150, as shown in FIGS. 1 and 2. FIG. 2 illustrates the transition piece for connecting the vertical tubular column hull 115 of the single column tension leg platform 110 to a tower 152 of the horizontal axis wind turbine 151. As shown in FIG. 2, the transition piece connector 116 is a circular plate having a similar diameter to the diameter of the vertical tubular column hull 115 and slightly larger diameter to the tower 152 of the horizontal axis wind turbine 151. The transition piece connector 116 comprises guard rails 116a attached to an outer perimeter of the transition piece connector 116. Air vent heads, ballast tank sounding pipes and the ballast manifold will be located in the space between the guard rails 116a and the tower base 152. In an embodiment, the transition piece connector 116 comprises holes (not shown) along the towers outer perimeter to connect the tower 152 to the vertical tubular column hull 115 of the single column tension leg platform 110 using either bolts, quick couplers or another connection mechanism.

Figure 11:
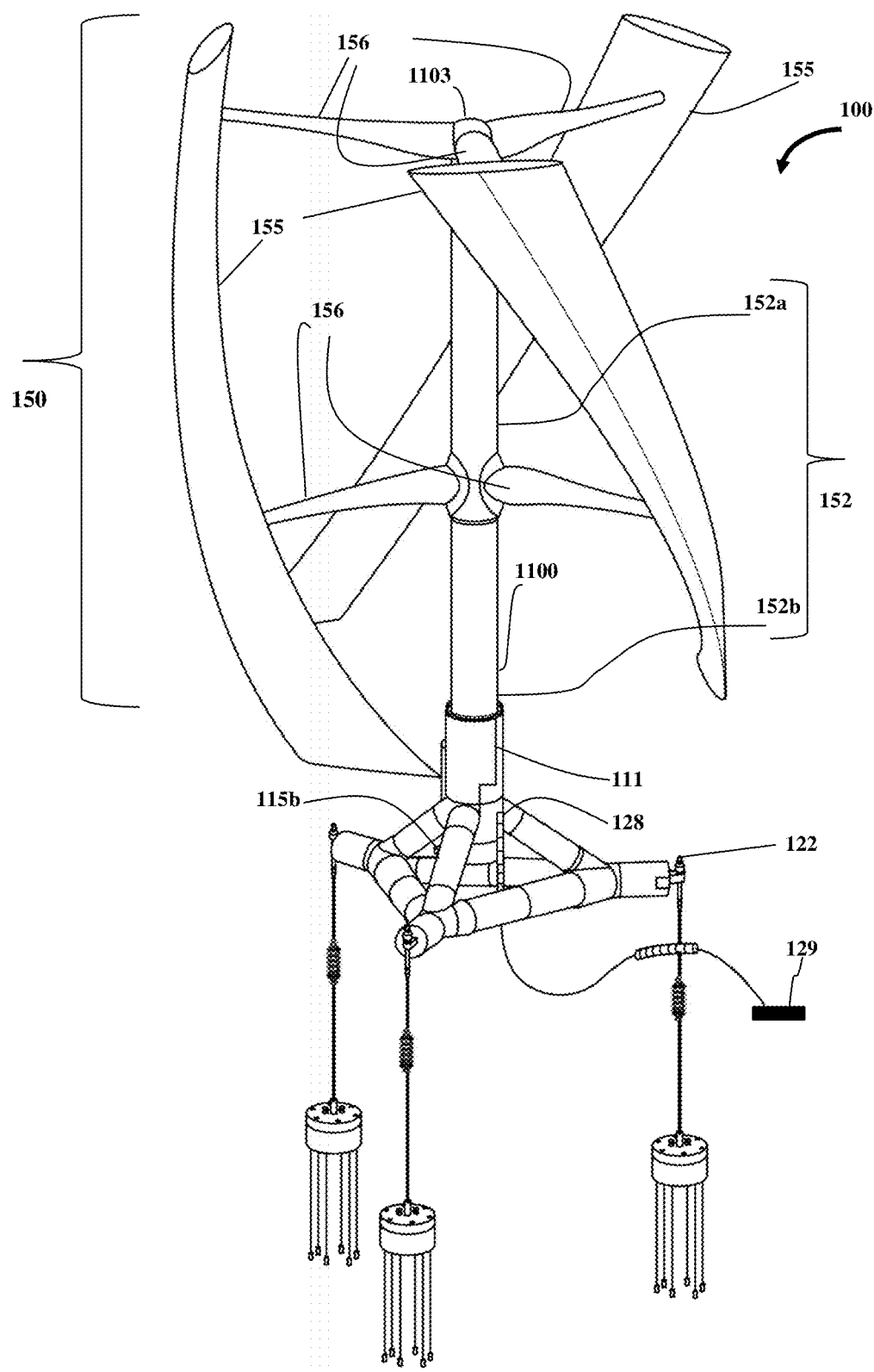
FIG. 11 illustrates the embodiment of the single column tension leg platform shown in FIG. 1 comprising a vertical axis wind turbine.
Figure 43:
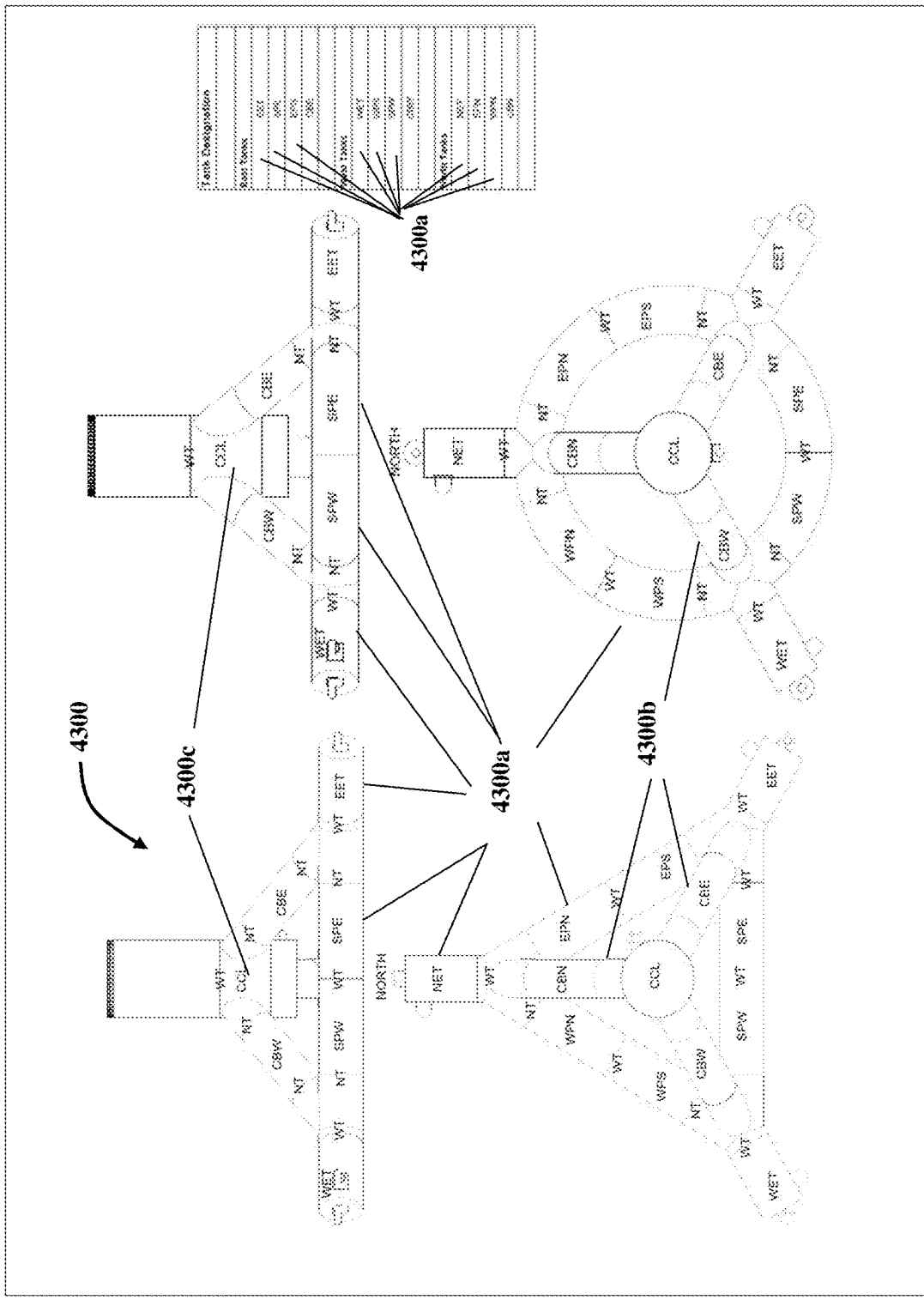
FIG. 43 illustrate the ballast tank configurations of the passive ballast system within a circular shape buoyant base and a triangular shape buoyant base.

As used herein, nacelle rotor assembly 150 is either the horizontal axis wind turbine 151 as shown in FIG. 1 or a vertical axis wind turbine 1100 as shown in FIG. 11. The central main vertical floating column 111 further comprises a plurality of decks (not shown) within the vertical tubular column hull 115 for housing a passive ballast system 4300. The passive ballast system 4300 comprises a plurality of ballast tanks 4300a for containing water and/or a permanent ballast, as shown in FIG. 43. In an embodiment, the decks act as ballast tanks 4300a of the passive ballast system 4300. FIG. 43 illustrates the ballast tank configurations of the passive ballast system 4300 within a circular shape buoyant base 1312 and a triangular shape buoyant base 112. Each pontoon extension will also have a ballast tank 4300a and watertight bulkheads.

Permanent ballast comprises a heavy material and the ballast tanks 4300a are filled with water and/or the permanent ballast to stabilize the single column tension leg platform 110 for the floating offshore wind turbine 100. The central main vertical floating column 111 further comprises a plurality of basic marine systems (not shown) housed within the vertical tubular column hull 115 of the central main vertical floating column 111. In an embodiment, the FOWT 100 is not equipped with an active ballast system 4300 but will have an optimized Marine system for ballasting via portable pumps or installation vessel pumps. This optimized piping will be mainly housed at the main vertical floating column 111 and within the floaters single column with branch lines extending into the pontoon ballast tanks 4300a. These are subject to change depending on location specific requirements. The buoyant base 112 is made up of simple rolled fabricated steel components to keep costs low, which can be easily assembled quayside in different ways depending on yard, crane capacity and port facilities available.

The central main vertical floating column 111 further comprises firefighting equipment (not shown), lifesaving equipment (not shown), if required one or more fourth tendon mooring points 115b and temporary installation hook up systems (not shown). The central main vertical floating column 111 further comprises temporary installation aids (not shown) and power generation equipment.

Figure 3:
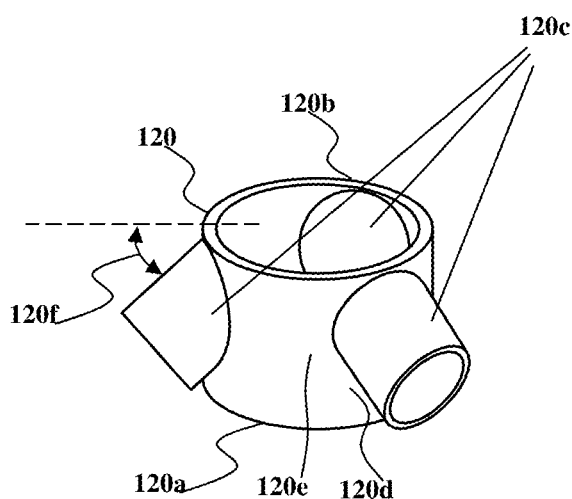
FIG. 3 illustrates a top ring joint for connecting three or more column braces to the vertical tubular column hull.

As illustrated in FIG. 1, the buoyant base 112 comprises three or more pontoon sections 117, three or more pontoon extensions 118, and three or more end joints 119 for connecting the pontoons 117 and the pontoon extensions 118. The buoyant base 112 further comprises three or more column braces 121 for connecting the pontoons 117 to the vertical tubular column hull 115. FIG. 3 illustrates a top ring joint 120 for connecting three or more column braces 121 to the vertical tubular column hull 115. The buoyant base 112 further comprises the top ring joint 120 and multiple ballast tanks 4300a housed inside the pontoon 117 and pontoon extension sections 117, 118 and 119. The top ring joint 120 has a diameter that is slightly greater than the diameter of the vertical tubular column hull 115 to ensure that the vertical tubular column hull 115 is slid into the top ring joint 120. As shown in FIGS. 1, 4 and 11, the top ring joint 120 is disposed at a lower section 115c, shown in FIG. 4 of the vertical tubular column hull 115, just above the mooring point 115b. In an embodiment, a lower opening 120a of the top ring joint 120 is positioned over the top surface 115a vertical tubular column hull 115 and then the top ring joint 120 is slid over the vertical tubular column hull 115. The top ring joint 120 is then welded to the lower section 115c of the vertical tubular column hull 115.

The top ring joint 120 has a cylindrical tubular structure comprising the lower opening 120a and a top opening 120b. The top ring joint 120 further comprises three or more cylindrical tubular holders 120c projecting outwards from a circular wall 120d of the top ring joint 120. Each of the three or more cylindrical separated from the adjacent one of the three or more cylindrical tubular holders 120c by about 120 degrees. Furthermore, each of the three or more cylindrical tubular holders 120c are angled 120f downwards towards the lower opening 120a. In an embodiment, each of the three or more cylindrical tubular holders 120c are angled 120f downwards by about 30 degrees, about 45 degrees, or about 60 degrees from a plane of the top opening 120b. Furthermore, the three or more cylindrical tubular holders 120c are located proximal to the top opening 120b as shown in FIG. 3. In an embodiment, the three or more cylindrical tubular holders 120c are located proximal to a mid-section 120e of the circular wall 120b. In another embodiment, the three or more cylindrical tubular holders 120c are located proximal to the lower opening 120a.

Figure 5:
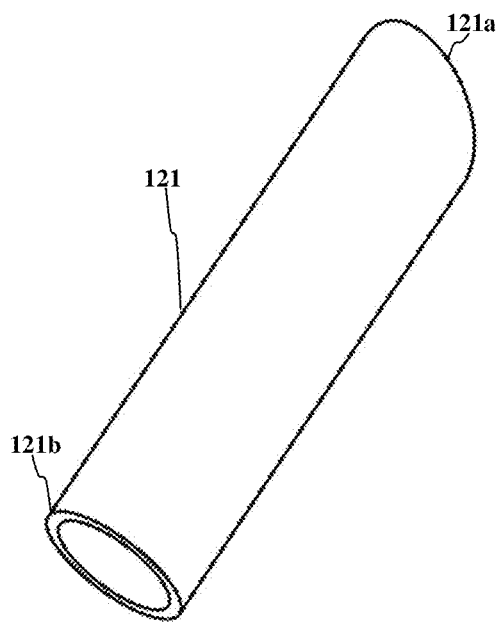
FIG. 5 illustrates an embodiment of the column brace for connecting the pontoons to the vertical tubular column hull through an end joint.

FIG. 5 illustrates an embodiment of the column brace 121 for connecting the pontoon 117 to the vertical tubular column hull 115 through an end joint 119.

Figure 6:
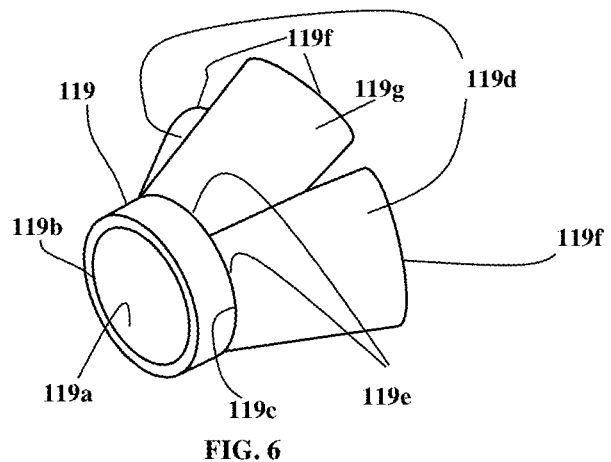
FIG. 6 illustrates an embodiment of the end joint for connecting the pontoons and the pontoon extension.

FIG. 6 illustrates an embodiment of the end joint 119. The end joint 119 further connects the pontoon 117 and the pontoon 118. In an embodiment, the column brace 121 is a cylindrical tubular structure. An external diameter of the column brace 121 is slightly less than an internal diameter of the cylindrical tubular holder 120c of the top ring joint 120 to enable a top portion 121a of the column brace 121 to be slid into one of the cylindrical tubular holders 120c and fastened to the cylindrical tubular holder 120c. The end joint 119 comprises a primary tubular section 119a comprising a top opening 119b and a bottom opening 119c. A plurality of secondary tubular sections 119d and 119g merge into the bottom opening 119c of the primary tubular section 119a. More specifically, the upper openings 119e of the secondary tubular sections 119d and 119g merge into the bottom opening 119c of the primary tubular section 119a. Portions of the bottom opening 119c of the primary tubular section 119a that are outside the upper openings 119e of the secondary tubular sections 119d and 119g are closed. In an embodiment, inner diameter of the secondary tubular sections 119d and 119g is slightly greater than the external diameter of the column brace 121 to accommodate a bottom portion 121b the column brace 121 at the lower opening 119f of middle secondary tubular section 119g. In an embodiment, the column brace 121 resembles the shape of a truncated hollow cylinder with the top portion 121a being truncated, as shown in FIG. 5.

Figure 7:
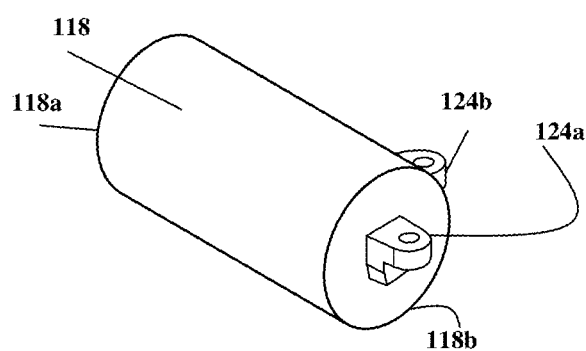
FIG. 7 illustrates an embodiment of a pontoon extension.

FIG. 7 illustrates an embodiment of the pontoon extension 118. The pontoon extension 118 also has a tubular structure and comprises a closed first end 118a and a closed second end 118b. A portion of the pontoon extension 118 at the first end 118a is configured to be accommodated in the primary tubular section 119a of the end joint 119. More specifically, the portion of the pontoon extension 118 at the first end 118a is slid into the top opening 119b of the primary tubular section 119a and secured to the primary tubular section 119a of the end joint 119. Each of the pontoon extensions 118 comprises a primary tendon porch 124a and a spare tendon porch 124b. In an embodiment, a tendon porch 124a, for example, the main tendon porch is attached to the closed second end 118b and the spare tendon porch 124b, for example, the spare tendon porch, is attached to a cylindrical wall of the pontoon extension 118, proximal to the closed second end 118b. The outer diameter of the pontoon extension 118 is slightly lesser than the inner diameter of the primary tubular section 119a to enable the first end 118a of the pontoon extension 118 to slide into the top opening 119b of the primary tubular section 119a.

Figure 8:
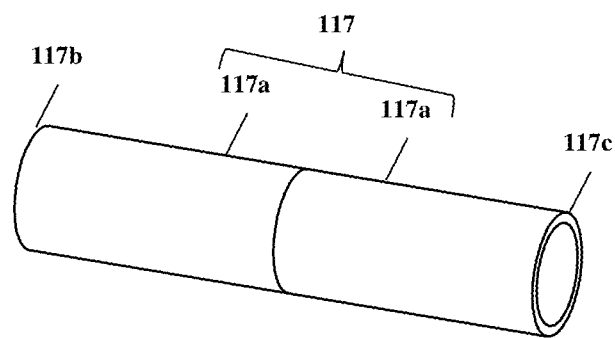
FIG. 8 illustrates an embodiment of a pontoon comprising pontoon sections.

FIG. 8 illustrates an embodiment of a pontoon 117 comprising pontoon sections 117a that are attached together. Each pontoon comprises a ballast tank 4300a. Each pontoon 117 is configured to be slid into a lower opening 119f of one of the two outermost secondary tubular sections 119d of an end joint 119 and secured to the end joint 119. In an embodiment, the outer diameter of the pontoon 117 is slightly lesser than the inner diameter of the secondary tubular section 119d to enable a first end 117b and a second end 117c of the pontoon 117, shown in FIG. 8, to slide into the lower opening 119f of the secondary tubular section 119d.

Figure 9:
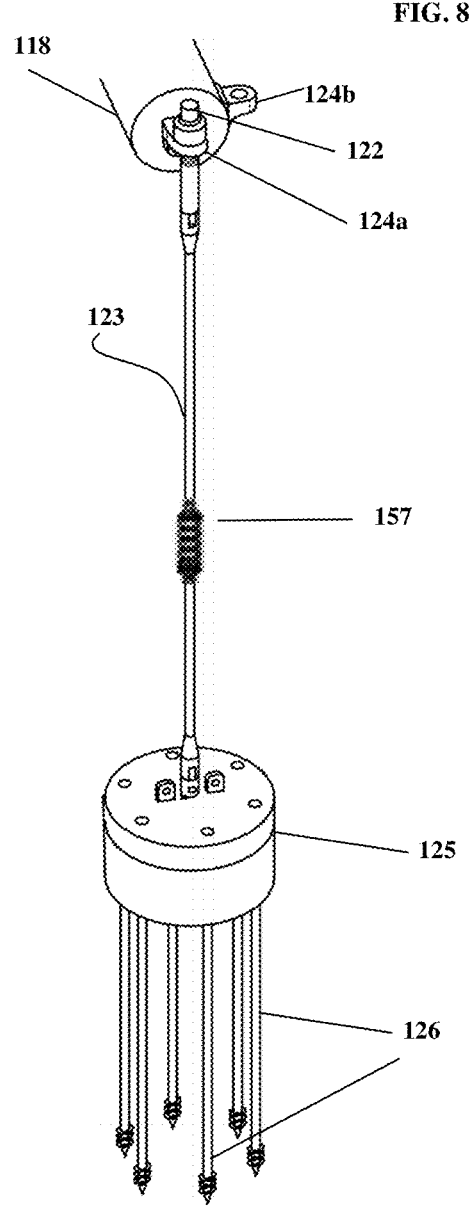
FIG. 9 illustrates an embodiment of a mooring secured to a pontoon extension.
Figure 10:
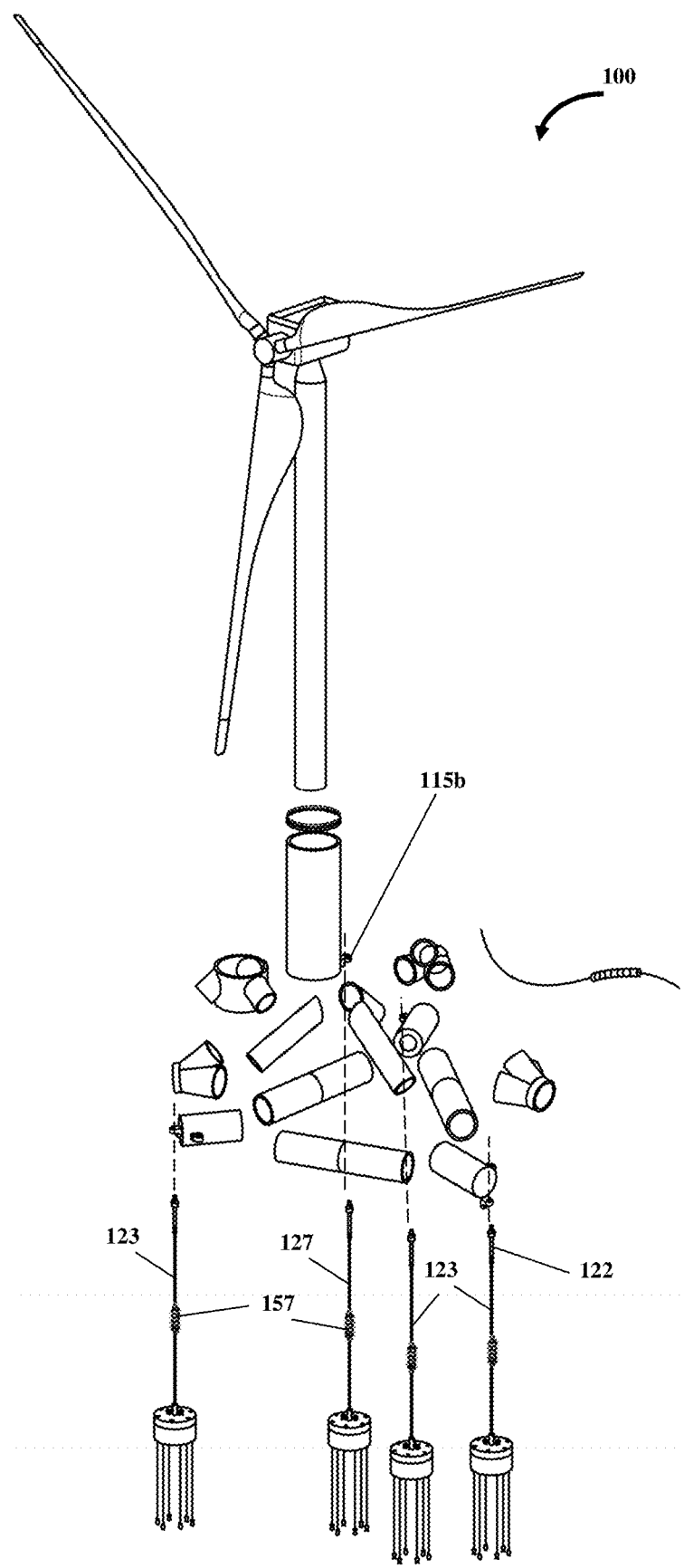
FIG. 10 illustrates an exploded view of the embodiment of the floating offshore wind turbine shown in FIG. 1.
Figure 24:
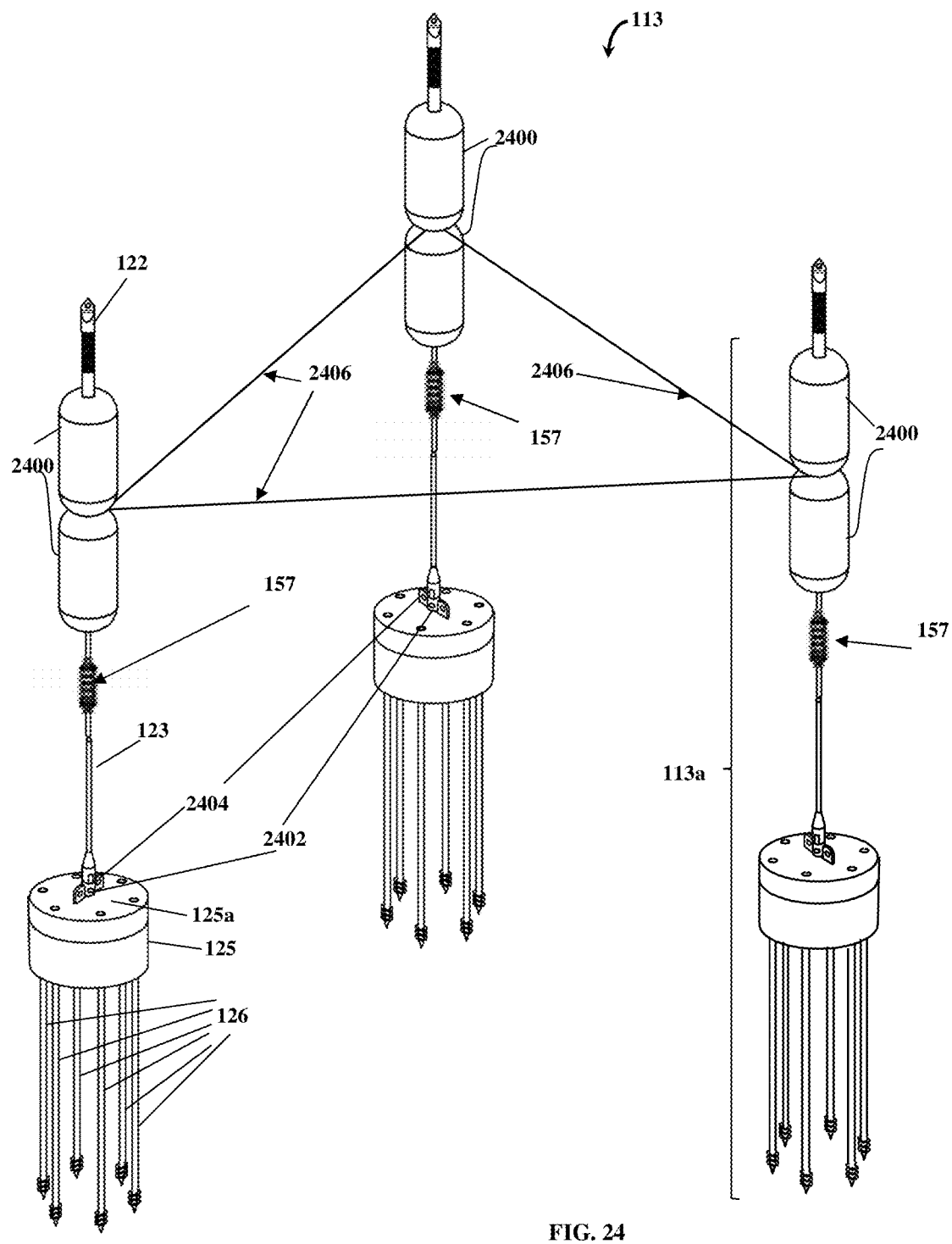
FIG. 24 illustrates the complete station keeping system wet stowed vertically in the water column and off the sea bed ready for hook up to the single column tension leg platform, where each tendon is connected to a set of temporary buoys, wherein the vertically stowed tendons are secured together by temporary spacer wires.

FIG. 9 illustrates an embodiment of a mooring 113a, illustrated in FIG. 24, secured to a pontoon extension 118. The mooring 113a is part of the station keeping system 113 illustrated in FIG. 1. The station keeping system 113 comprises multiple moorings 113a as illustrated in FIG. 24 and buoys 2400 attached temporarily, as shown in FIG. 24, to the moorings 113a to provide buoyancy to the moorings 113a. The station keeping system 113 further comprises permanent length adjustment joints 122, tendons 123, main and spare tendon porches 124a and 124b, an anchoring system 125, micropiles 126, and a spare tendon 127 if at all required, as shown in FIG. 10. In an embodiment, the station keeping system is either a micropiled drilled helical anchoring system, a turret based rotating system, or a hybrid combination of gravity, suction and driven pile.

As illustrated in FIGS. 1 and 10, the nacelle rotor assembly 150 comprises a tower 152 comprising two or more tower sections 152a and 152b, as shown in FIG. 11, a nacelle 154, a plurality of rotor blades 155, a turbine (not shown), a turbine shaft (not shown), a generator (not shown), a plurality of struts 156 and lighting systems 1103, as shown in FIG. 11.

Figure 12:
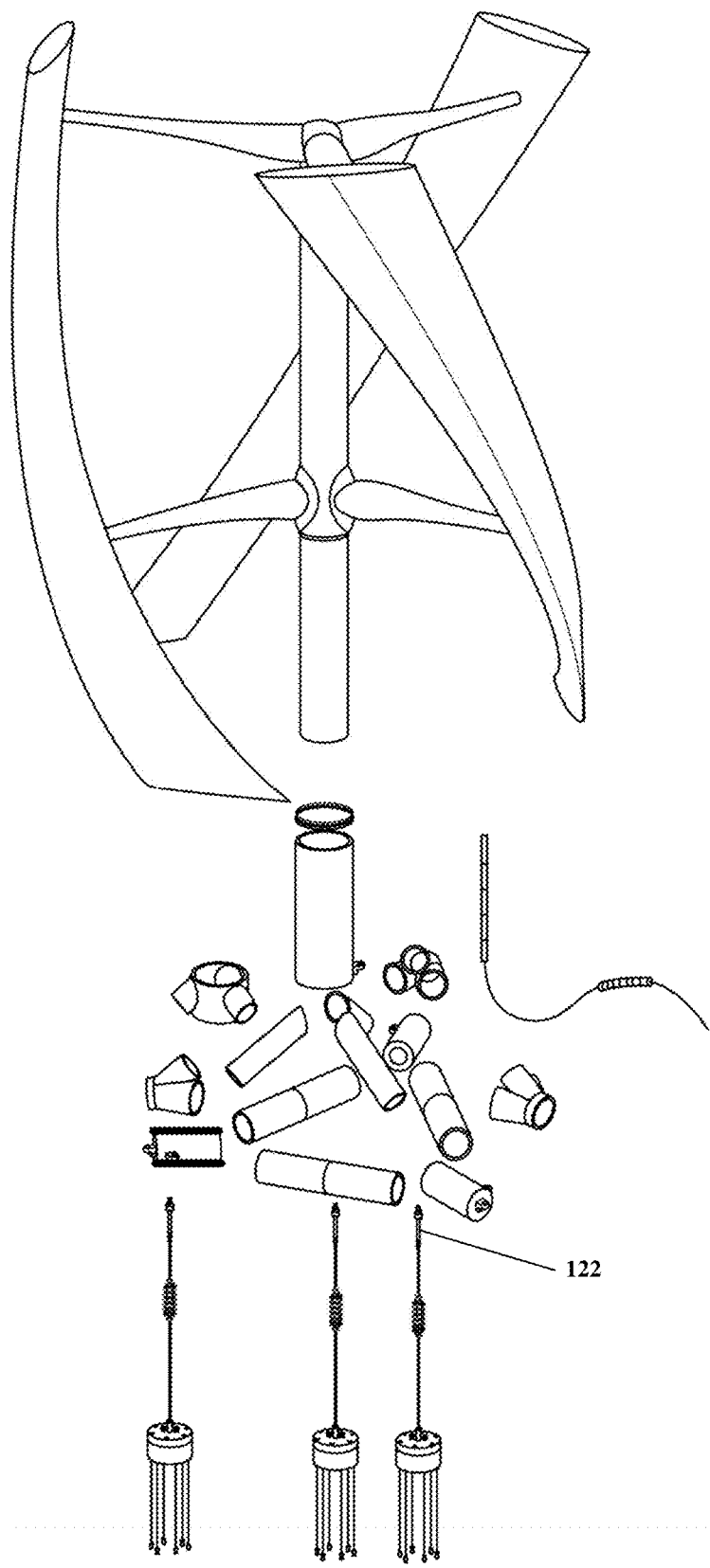
FIG. 12 illustrates an exploded view of the embodiment of the single column tension leg platform shown in FIG. 11.
Figure 20:
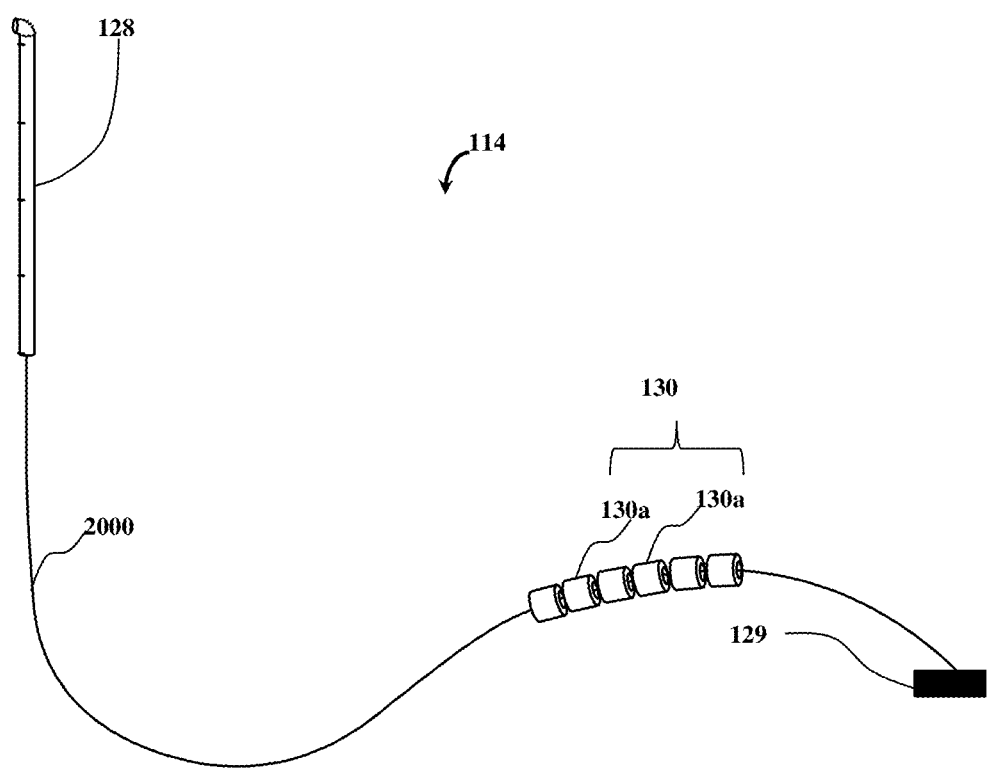
FIG. 20 illustrates an inter array cable system.

FIG. 10 illustrates an exploded view of the embodiment of the floating offshore wind turbine 100 shown in FIG. 1. FIG. 11 illustrates the embodiment of the single column tension leg platform 110 shown in FIG. 1 comprising the vertical axis wind turbine 1100. FIG. 12 illustrates an exploded view of the embodiment of the single column tension leg platform 110 shown in FIG. 11. As shown in FIGS. 1, 11 and 20, the inter array cable system 114 comprises a cable hull entry point assembly 128, riser system 130, and appropriate mattressing 129 to protect the cable at the point of cable landing on the sea floor. The vertical hull 115 comprises a hole 400, as shown in FIG. 4, that creates an entry point for the inter array cable riser system 114. The cable hull entry point assembly 128 is attached to the hole 400 of the vertical hull 115.

As illustrated in FIGS. 1 and 10-12, the buoyant base 112 of the single column tension leg platform 110 has a triangular shape.

Figure 13:
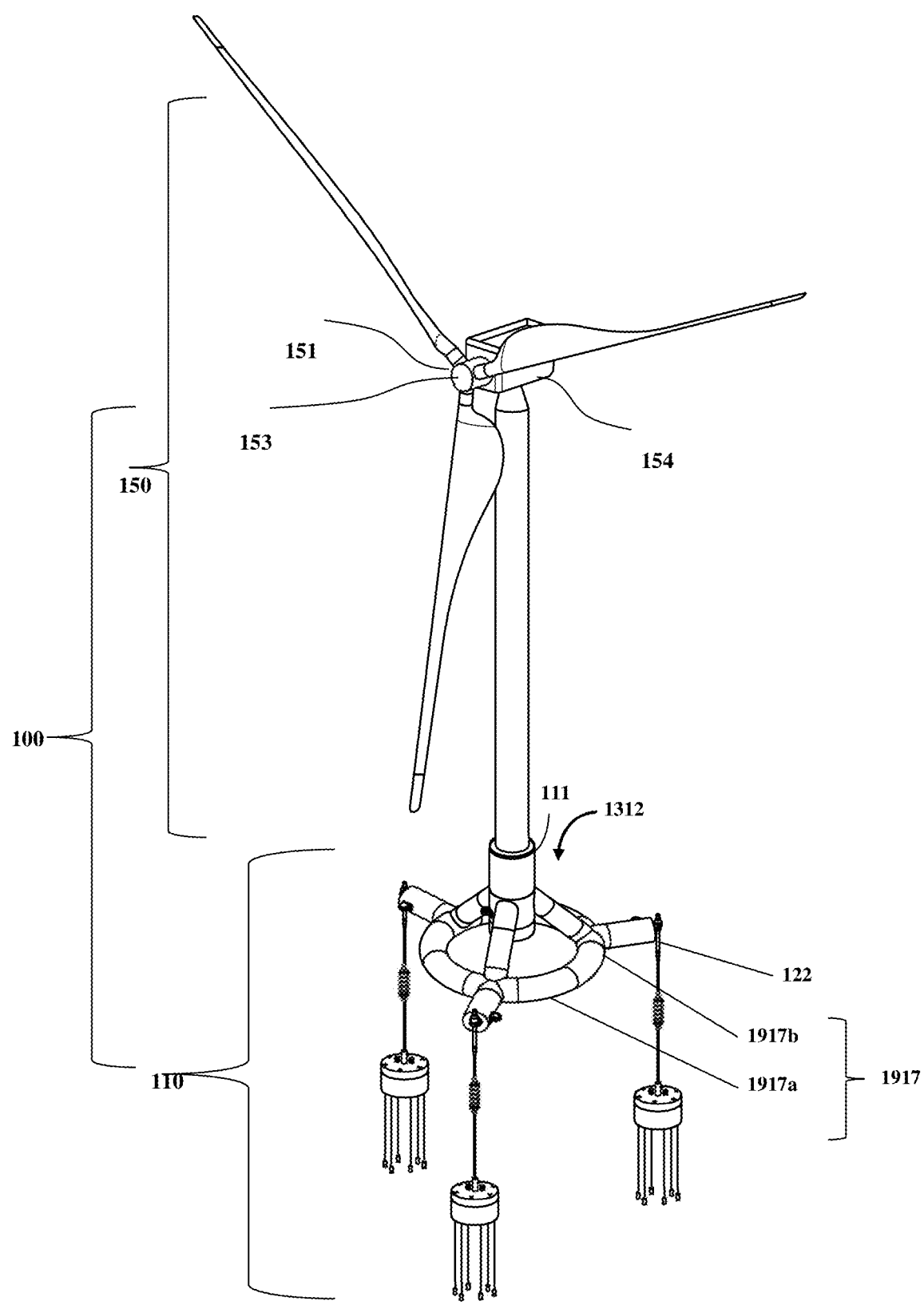
FIG. 13 illustrates another embodiment of the single column tension leg platform with a circular shaped hull for a floating offshore wind turbine comprising a horizontal axis wind turbine.

FIG. 13 illustrates another embodiment of the single column tension leg platform 110 with a circular shaped hull for a floating offshore wind turbine 100 comprising a horizontal axis wind turbine 151. As illustrated in FIG. 13, the buoyant base 1312 of the single column tension leg platform 110 has a circular shape.

Figure 14:
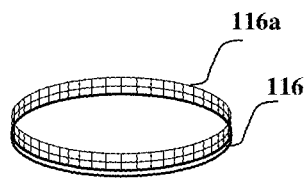
FIG. 14 illustrates a transition piece for connecting a vertical tubular column hull of the single column tension leg platform to a tower of the horizontal axis wind turbine.
Figure 15:
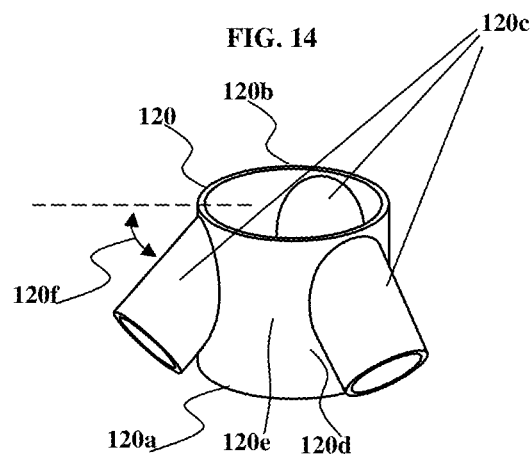
FIG. 15 illustrates a top ring joint for connecting three or more column braces to the vertical tubular column hull.
Figure 16:
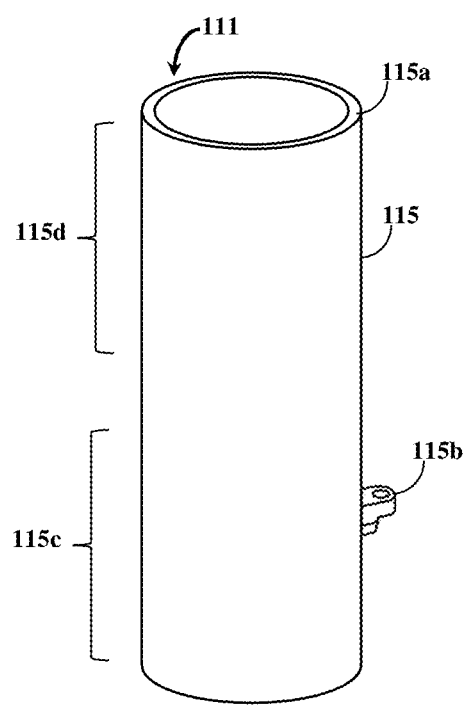
FIG. 16 illustrates the vertical hull of the single column tension leg platform.
Figure 17:
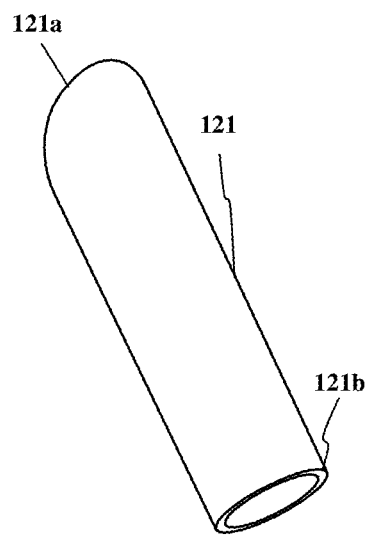
FIG. 17 illustrates an embodiment of a column brace used in the embodiment of the single column tension leg platform shown in FIG. 13.

FIG. 14 illustrates a transition piece 116 for connecting a vertical tubular column hull 115 of the central main vertical floating column 111 of the single column tension leg platform 110 to a tower of the horizontal axis wind turbine 152. The transition piece 116 is same as the transition piece 116 shown in FIG. 2. FIG. 15 illustrates a top ring joint 120 for connecting three or more column braces 121 to the vertical tubular column hull 115. The top ring joint 120 illustrated in FIG. 15 is same as the top ring joint 120 shown in FIG. 3. FIG. 16 illustrates the vertical hull 115 of the central main vertical floating column 111 of the single column tension leg platform 110. The vertical hull 115 shown in FIG. 16 is same as the vertical hull 115 shown in FIG. 4. FIG. 17 illustrates an embodiment of a column brace 121 used in the embodiment of the single column tension leg platform 110 shown in FIG. 13. The column brace 121 shown in FIG. 17 is same as the column brace 121 shown in FIG. 5.

Figure 18:
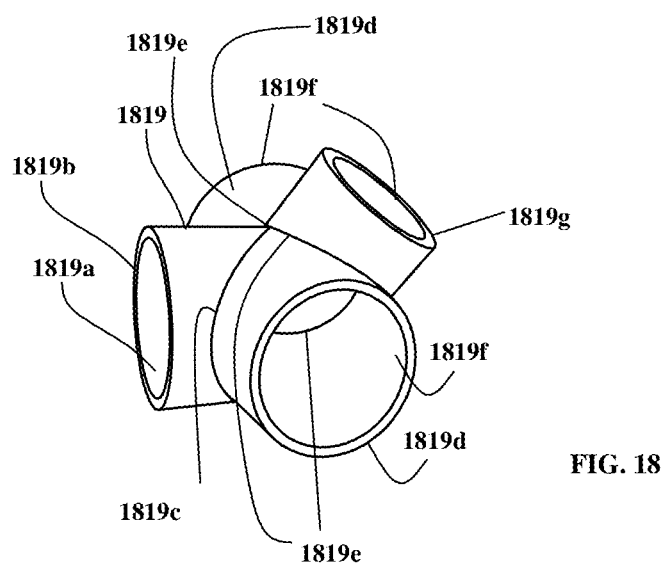
FIG. 18 illustrates an embodiment of an end joint used in the embodiment of the circular shaped hull of the single column tension leg platform shown in FIG. 13.
Figure 19A:
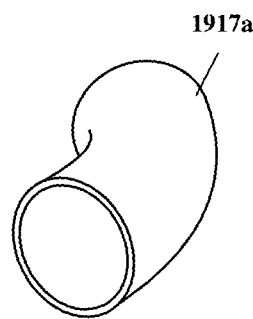
FIGS. 19A and 19B illustrate perspective views of an embodiment of a pontoon section used in the embodiment of the single column tension leg platform shown in FIG. 13.
Figure 19B:
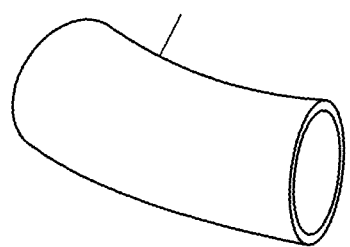

As illustrated in FIG. 13, the column brace 121 FIG. 17, connects the pontoon 1917 to the vertical tubular column hull 115 through an end joint 1819 shown in FIG. 18. FIG. 18 illustrates an embodiment of an end joint 1819 used in the embodiment of the circular shaped hull 1312 of the single column tension leg platform 110 shown in FIG. 13. FIGS. 19A and 19B illustrate perspective views of an embodiment of a pontoon 1917 used in the embodiment of the single column tension leg platform 110 shown in FIG. 13 that uses a buoyant base 1312 having a circular shape 1312. As illustrated in FIG. 13, the end joint 1819 further connects the pontoon 1917 and the pontoon extension 118 shown in FIG. 7. The pontoon 1917 comprises a ballast tank 4300a. As shown in FIGS. 19A and 19B, each of the pontoons 1971 comprises one or more pontoon sections 1917a and 1917b attached together.

In an embodiment, the column brace 121 is a cylindrical tubular structure. An external diameter of the column brace 121 is slightly less than an internal diameter of the cylindrical tubular holder 120c of the top ring joint 120, shown in FIGS. 3 and 15, to enable a top portion 121a of the column brace 121 to be slid into one of the cylindrical tubular holders 120c and fastened to the cylindrical tubular holder 120c. As illustrated in FIG. 18, the end joint 1819 comprises a primary tubular section 1819a comprising a top opening 1819b and a bottom opening 1819c. A plurality of secondary tubular sections 1819d and 1819g merge into the bottom opening 1819c of the primary tubular section 1819a. More specifically, the upper openings 1819e of the secondary tubular sections 1819d and 1819g merge into the bottom opening 1819c of the primary tubular section 1819a. Portions of the bottom opening 1819c of the primary tubular section 1819a that are outside the upper openings 1819e of the secondary tubular sections 1819d and 1819g are closed. In an embodiment, inner diameter of the secondary tubular sections 1819d and 1819g is slightly greater than the external diameter of the column brace 121 to accommodate the column brace 121 at the lower opening 1819f of middle secondary tubular section 1819d. In an embodiment, the column brace 121 resembles the shape of a truncated hollow cylinder with the top portion 121a being truncated, as shown in FIGS. 5 and 17. The outermost secondary tubular sections 1819d of the end joint 1819 and the pontoons 1917 have a curved shape. Attaching the pontoons 1917 to the end joints 1819 through the outermost secondary tubular sections 1819d creates the circular shape of the buoyant base 112. Therefore, the pontoons 1917 and the outermost secondary tubular sections 1819d represent arcs of the circular buoyant base 112.

FIG. 20 illustrates an inter array cable system 114. As shown in FIG. 20, the inter array cable system 114 comprises a cable hull entry point assembly 128, riser system 130, and mattressing 129. The riser system 130 comprises buoys 130a configured to maintain buoyancy of an electrical cable 2000 of the floating offshore wind turbine 100 that is used to transport electrical power from the floating offshore wind turbine 100 to an offshore substation (not shown). The electrical cable 2000 are typically installed in single lengths from one floating offshore wind turbine 100 to its neighbour, forming a string (collection circuit) feeding the offshore substation.

Figure 21:
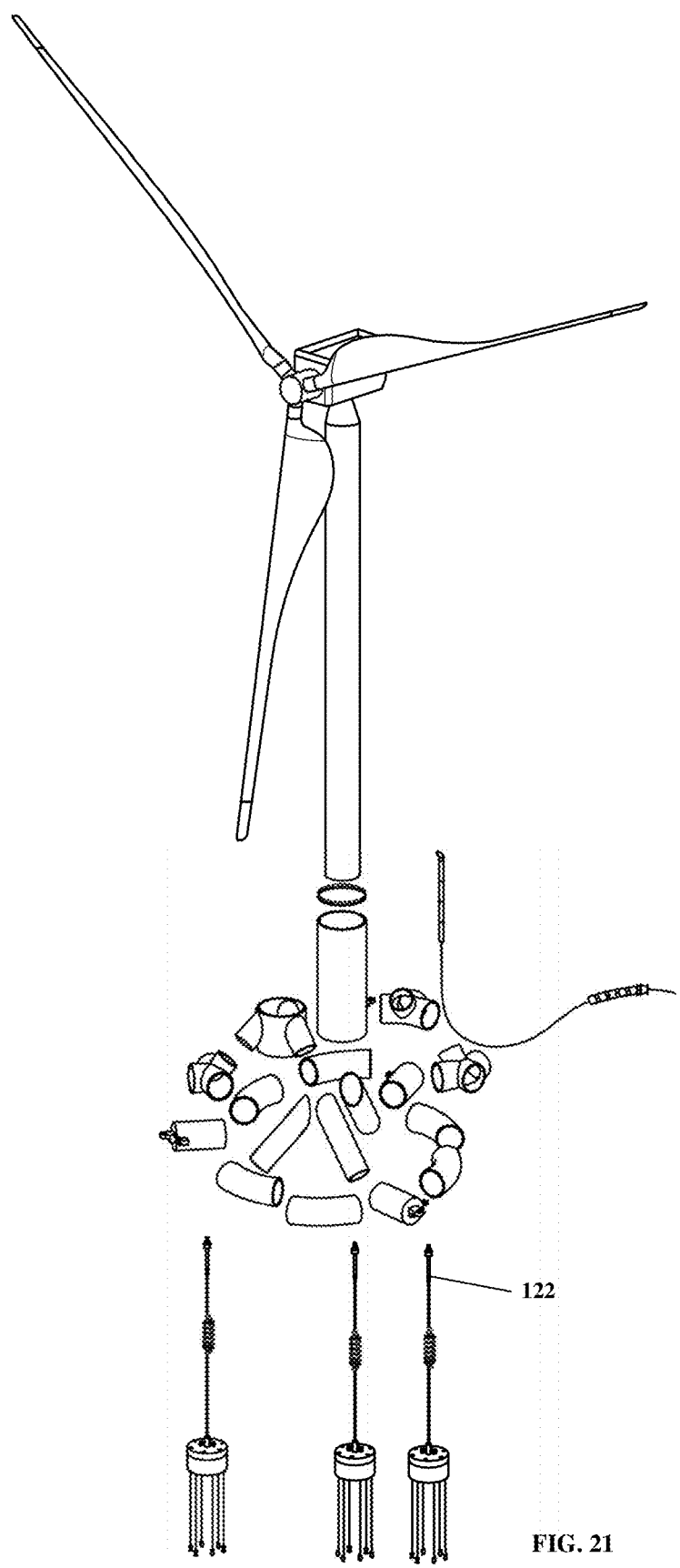
FIG. 21 illustrates an exploded view of the embodiment of the single column tension leg platform with a circular shaped hull shown in FIG. 13 comprising a horizontal axis wind turbine.
Figure 22:
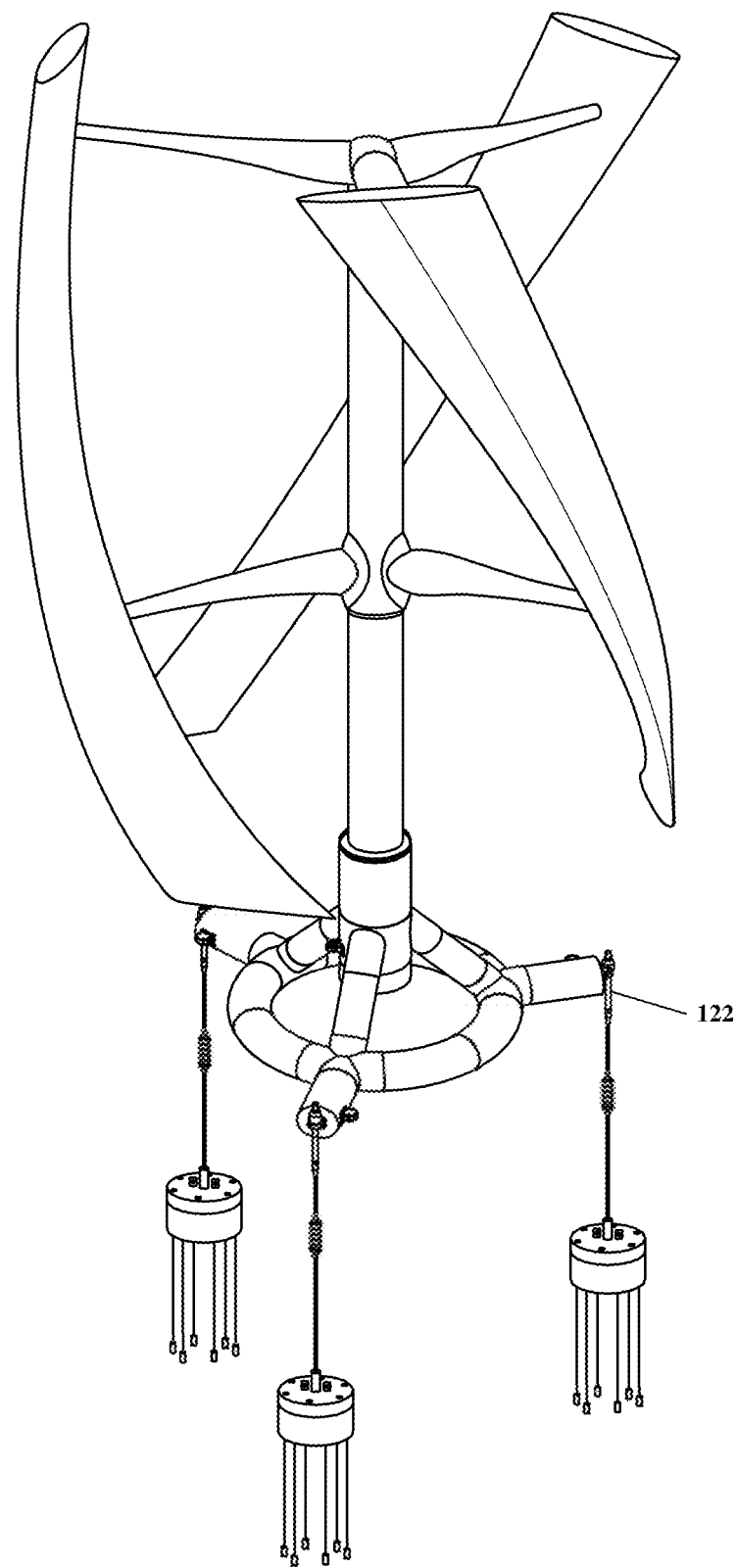
FIG. 22 illustrates the embodiment of the single column tension leg platform with a circular shaped hull shown in FIG. 13 comprising a vertical axis wind turbine.
Figure 23:
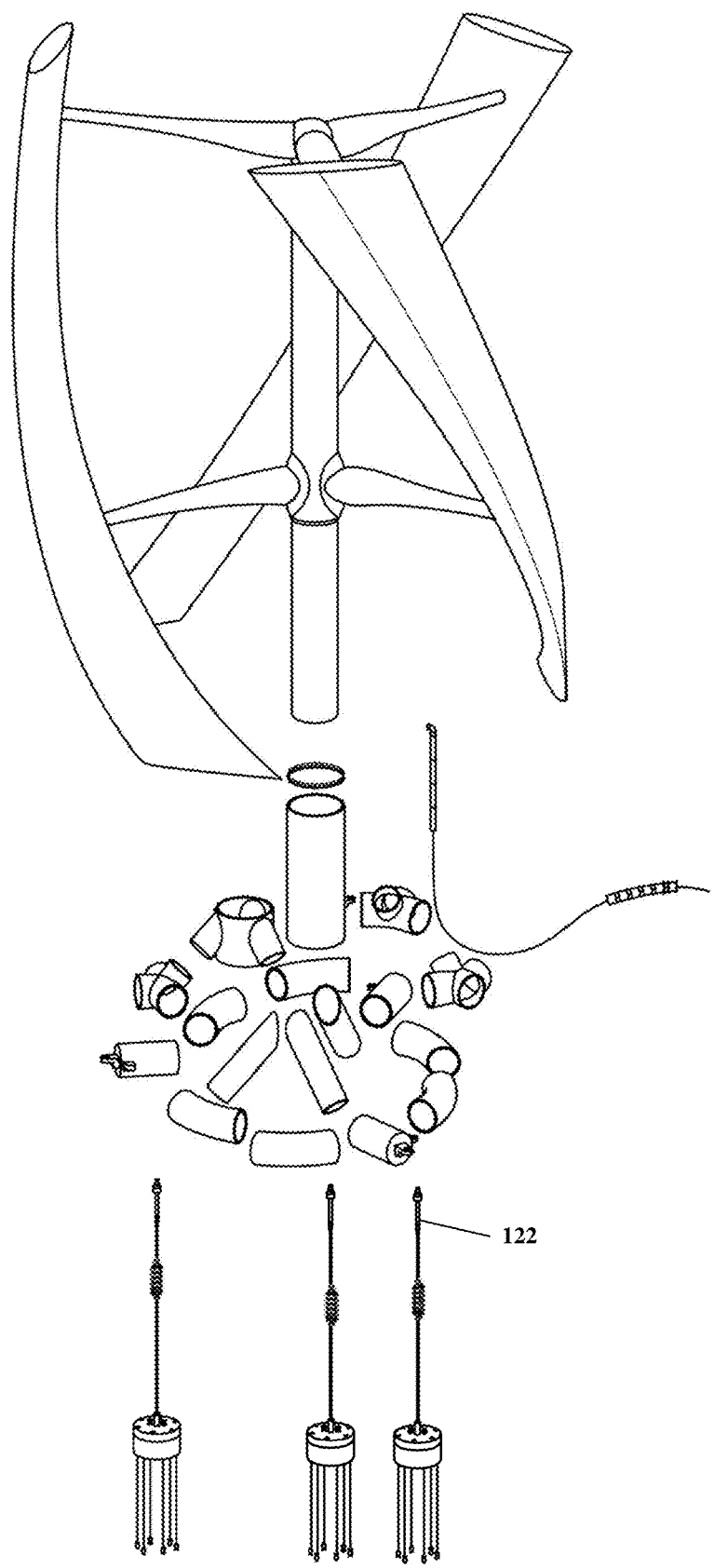
FIG. 23 illustrates an exploded view of the embodiment of the single column tension leg platform shown in FIG. 22.

FIG. 21 illustrates an exploded view of the embodiment of the single column tension leg platform 110 with a circular shaped hull 1312 shown in FIG. 13. The embodiment of the single column tension leg platform 110 shown in FIG. 13 uses a horizontal axis wind turbine 151. FIG. 22 illustrates the embodiment of the single column tension leg platform 110 with a circular shaped hull 1312 shown in FIG. 13 comprising a vertical axis wind turbine 150 as illustrated in FIG. 11. FIG. 23 illustrates an exploded view of the embodiment of the single column tension leg platform 110 shown in FIG. 22.

Figure 25:
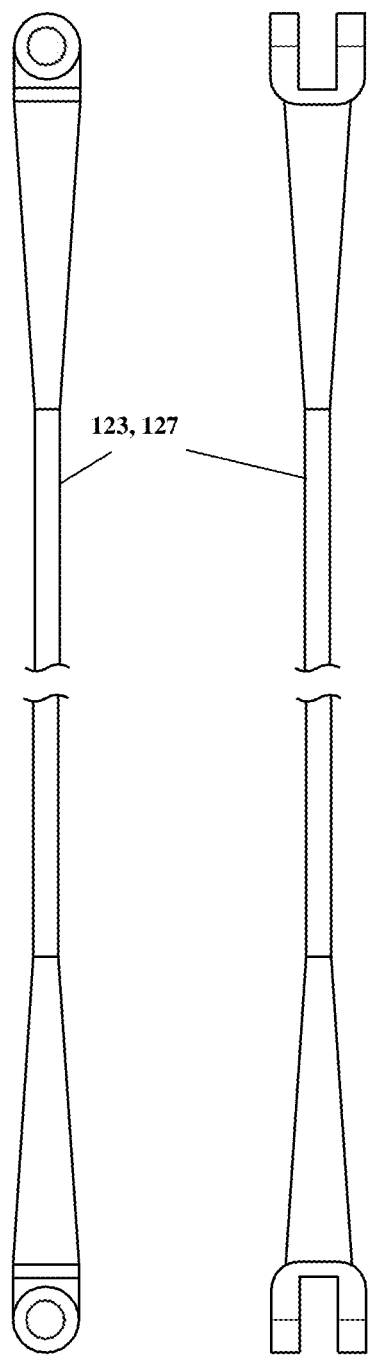
FIG. 25 illustrates front and side views of the tendon used to attach an anchoring system to the pontoon extension through a permanent length adjustment joint.
Figure 26:
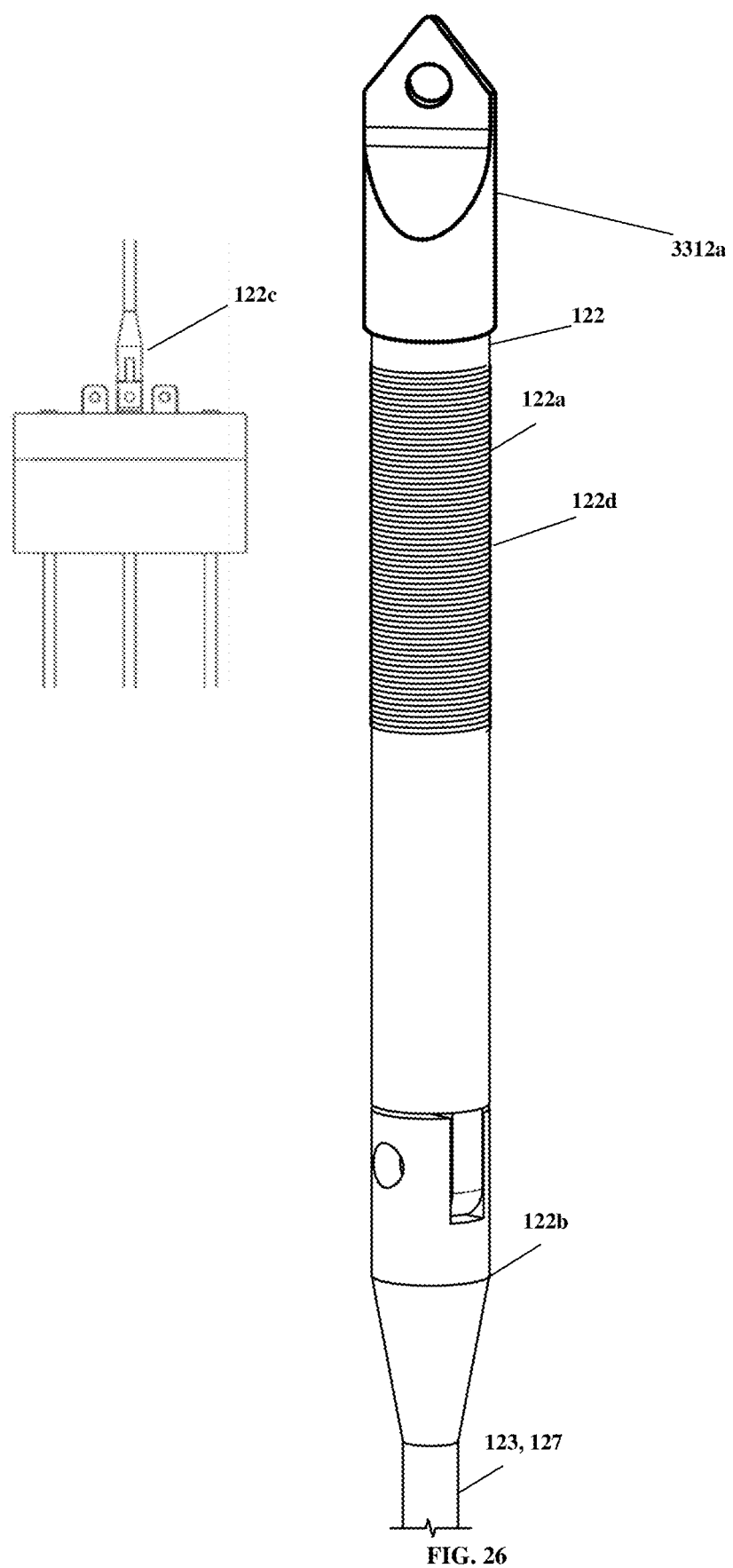
FIG. 26 illustrates the permanent length adjustment joint attached to the top of tendon, and the tendon top and bottom connectors.

FIG. 24 illustrates multiple moorings 113a configured to be secured to the primary tendon porch 124a on each pontoon extensions 118 of the single column tension leg platform 110, where each mooring 113a comprises a set of buoys 2400 temporarily secured to a tendon 123 of the mooring 113a. As illustrated in FIG. 24, the anchoring system 125 comprises a plurality of connectors 2402 and 2404 disposed on a top surface 125a of the anchoring system 125. The connectors 2402 and 2404 comprise a main tendon connector 2402 and a spare tendon connector 2404. The main tendon connector 2402 is located at a center of the top surface 125a of the anchoring system 125, and the spare tendon connectors 2404 are located adjacent to the main tendon connector 2402. The spare tendon connectors 2404 provide a secondary connector mechanism for a spare or temporary tendon 123 to be connected to the spare tendon porch 124b as illustrated in FIG. 7 in case the main tendon or tendon connector 2402 is damaged or is in need of replacement, or in case multiple tendons 123 need to be connected to the same anchoring system 125. FIG. 25 illustrates front and side views of the tendon 123 and 127 used to attach the anchoring system 125 to the main or spare tendon porch 124a or 124b, respectively, on the pontoon extension 118 or to a fourth redundant mooring tendon porch 115b as illustrated in FIG. 4 through a permanent length adjustment joint 122. The spare tendon porch 124b allows hooking-up of a spare tendon 127. The spare tendon porch 124b caters to future more stringent redundant mooring requirements and to ensure in-situ maintenance or replacement of the moorings 113a, avoiding long periods of lost production for FOWTs which need to be brought ashore for replacement of the moorings 113a. FIG. 26 illustrates the permanent length adjustment joint 122 attached to the top of tendon 123, 127, and the tendon top connector 122b and the tendon bottom connector 122c.

Figure 27A:
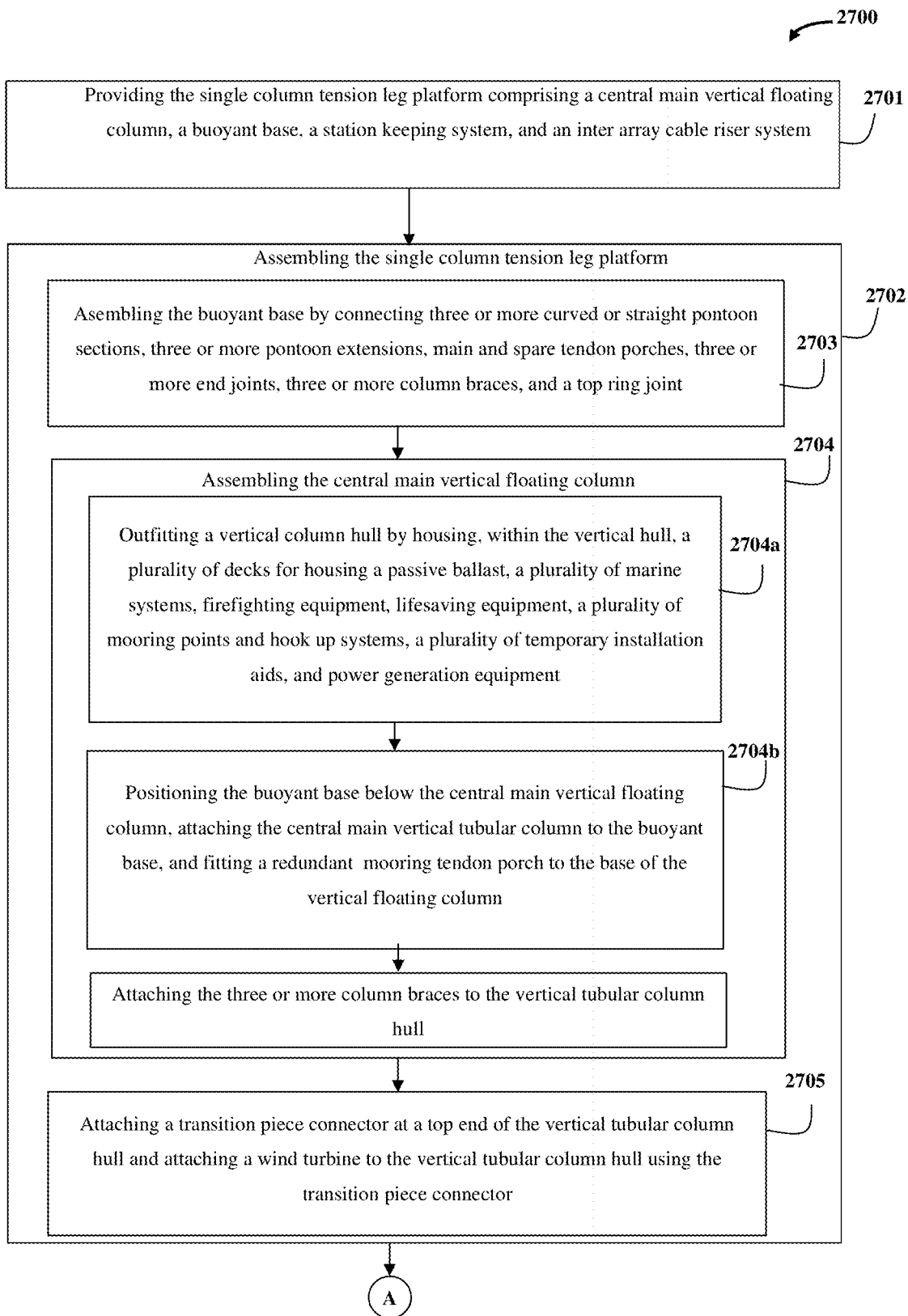
FIGS. 27A-27B exemplarily illustrate a method 2700 for assembling and installing a single column tension leg platform 110.
Figure 27B:
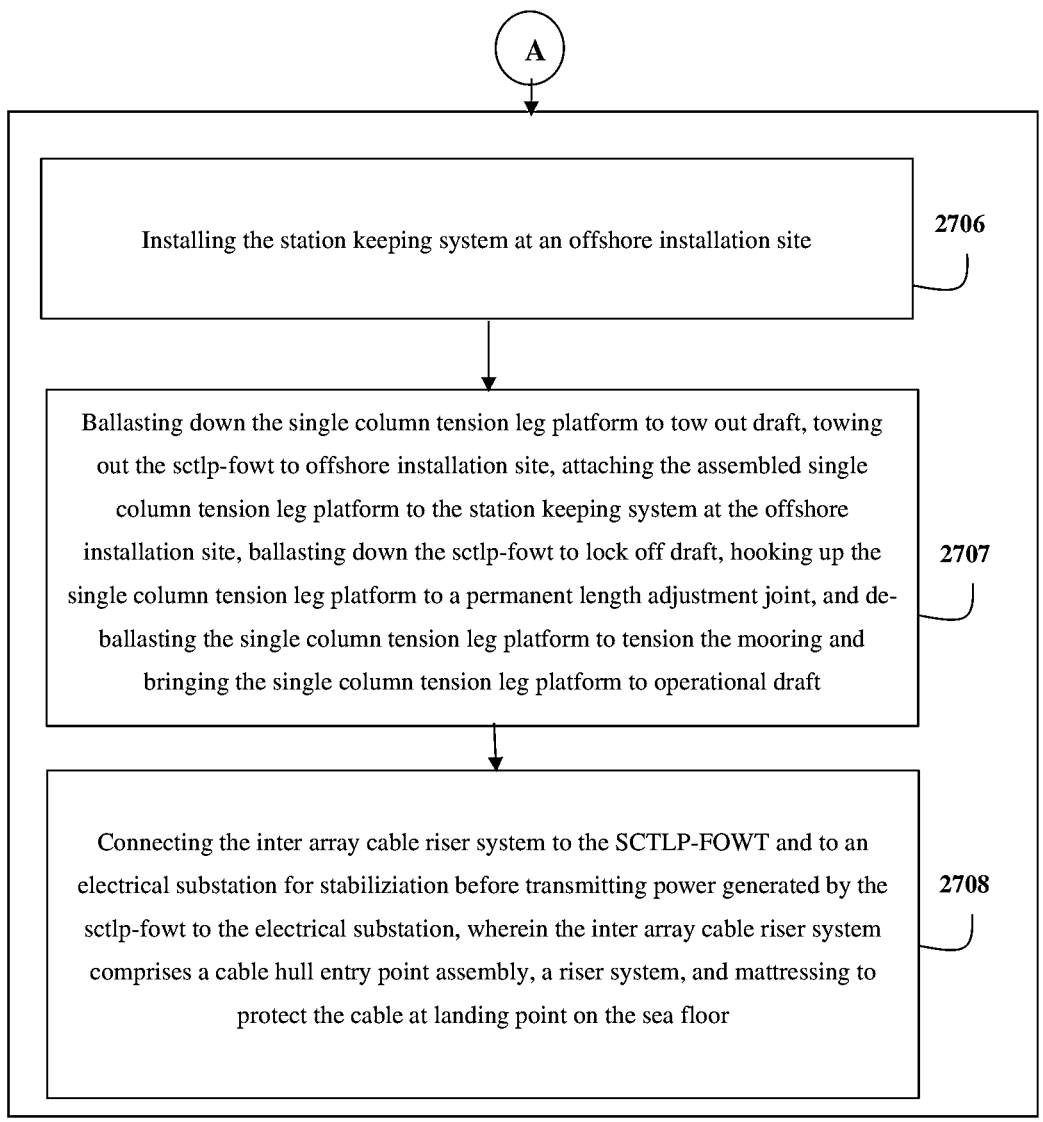

FIGS. 27A-27B exemplarily illustrate a method 2700 for assembling and installing a single column tension leg platform 110. The method 2700 comprises providing 2701 a single column tension leg platform comprising a central main vertical floating column, a buoyant base, a station keeping system, and an inter array cable system 114. Next, the single column tension leg platform is assembled 2702. Assembling 2702 the single column tension leg platform comprises assembling 2703 the buoyant base by connecting three or more curved or straight pontoon sections, three or more pontoon extensions, main and spare tendon porches, three or more end joints, three or more column braces, and a top ring joint. In an embodiment, the pontoons or pontoon sections are either curved or straight. Assembling 2702 the single column tension leg platform further comprises assembling 2704 the central main vertical floating column. Assembling 2704 the central main vertical floating column comprises outfitting 2704a the vertical tubular column hull 115 of the central main vertical floating column by housing a plurality of decks within the vertical hull for housing a passive ballast and marine systems, firefighting equipment, lifesaving equipment, a plurality of mooring points and hook up systems, a plurality of temporary installation aids, and power generation equipment within the vertical tubular column. Assembling 2704 the central main vertical floating column 111 further comprises positioning 2704b the buoyant base below the central main vertical floating column, attaching the central main vertical tubular column to the buoyant base, and fitting a redundant mooring tendon porch 115b to the base or lower section 115c of the central main vertical floating column 111. Assembling 2704 the central main vertical floating column 111 further comprises attaching the three or more column braces to the vertical tubular column hull. The buoyant base provides support to the vertical tubular column hull 115 of the central main vertical floating column 111.

Assembling 2702 the single column tension leg platform further comprises attaching 2705 a transition piece connector 116 at a top end of the vertical tubular column hull 115 and attaching a wind turbine/nacelle rotor assembly 150 to the vertical tubular column hull 115 using the transition piece connector 116. Attaching the wind tower comprises connecting the vertical tubular column hull of the single column tension leg platform to a tower 152 of the nacelle rotor assembly 150 using the transition piece 116, installing the nacelle rotor assembly on top of the tower 152, attaching a plurality of rotor blades 155 to a nose cone 153 of the nacelle 154 through struts 156. The nose cone 153 is attached to a shaft of the generator.

The vertical tubular column hull 115 of the single column tension leg platform 110 is connected to the tower 152 of the nacelle rotor assembly 150 using the transition piece connector 116. More specifically, the tower 152 of the nacelle rotor assembly 150 is connected at the top of the vertical tubular column hull 115 using the transition piece connector 116 via a bolted, quick coupler or other connection. The tower 152, the nacelle rotor assembly 150 containing the generator (not shown) will sit at the top of the tower. The nose cone 153 of the nacelle will have struts 156 connecting the turbine blades 155 to the nacelle nose cone 153. Both HAWT 151 and VAWT 1100 turbines and tower 152 will be outfitted with warning lights 1103 as required by Federal Aviation Authority (FAA) regulations.

The VAWT 1100 tower 152, generator and shaft will be contained within the central main vertical floating column 115 of the central main vertical floating column 111. or as specified by Original Equipment Manufacturer (OEM) or client. The tower 152 and VAWT 1100 will be sized to OEM and client specifications. The SCTLP-FOWT 100 can will be scaled up or down to meet the client selected tower 152 and turbine 151 or 1100 size. In general, the two turbine designs 151 and 1100 will comprise of the following.

HAWT 151: The tower 152 will be designed with two or more sections 152a and 152b which will be bolted together, or connected together using quick connect slip ring or of any other design. The nacelle rotor assembly 150 will contain the generator, drive shaft, bearings, nose cone 153, pitch/yaw and other systems all designed by OEM. Turbine blades 155 are connected to the nose cone 153.

VAWT: May or may not have an outer tower 152, instead may have a direct vertical drive shaft extending from the top of the FOWT 150 into the vertical tubular column hull 115 of the central main vertical floating column 111. The generator and other systems are generally housed in the FOWT 150 vertical tubular column hull 115 which lowers the centre of gravity of the system and can be easily accessed during operations and maintenance. The tower and Turbine systems will be entirely designed by OEM and to client's specifications.

Figure 29:
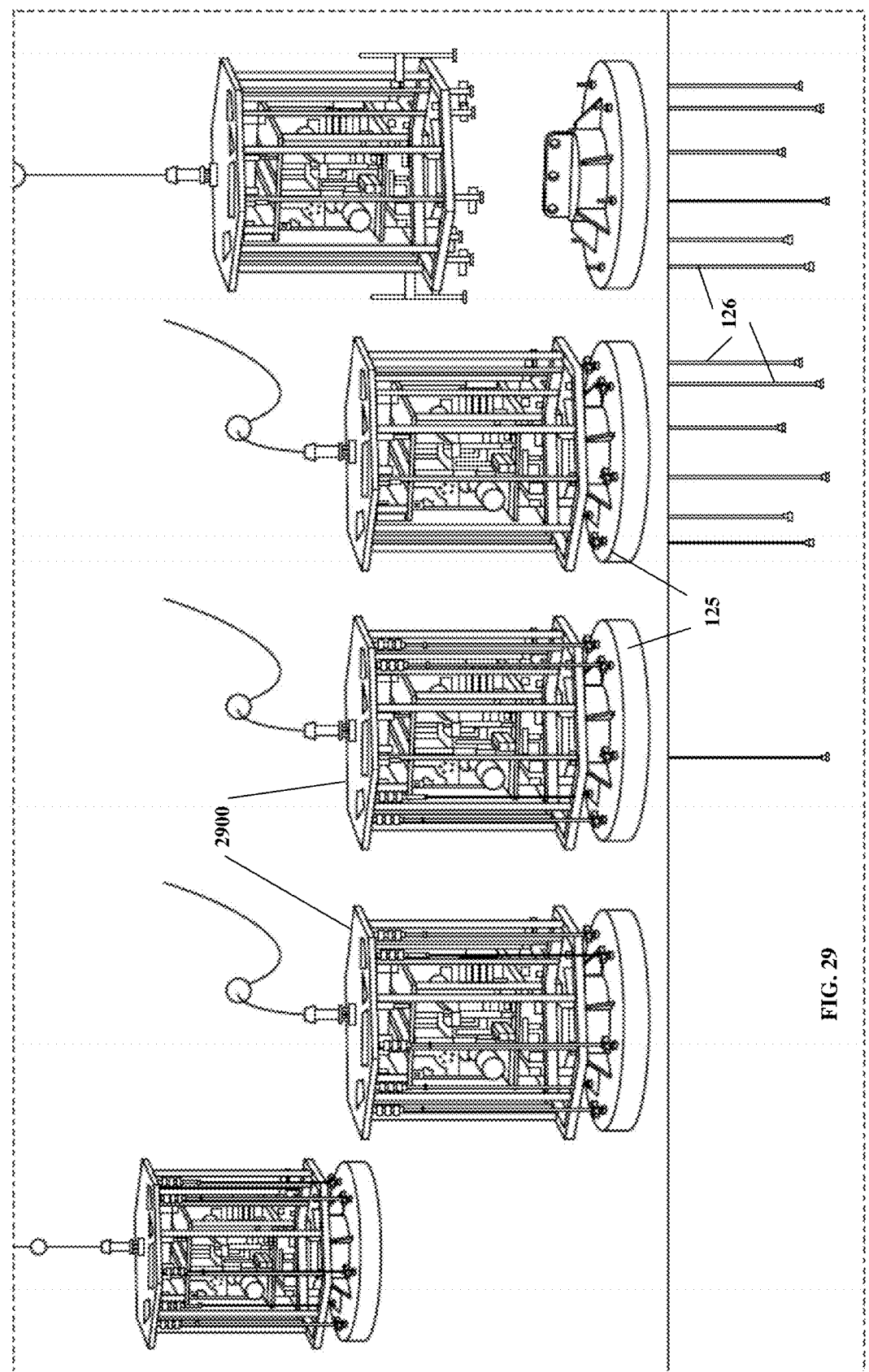
FIG. 29 exemplarily illustrates the process of installing micropiles using an OEM supplied equipment.
Figure 42:
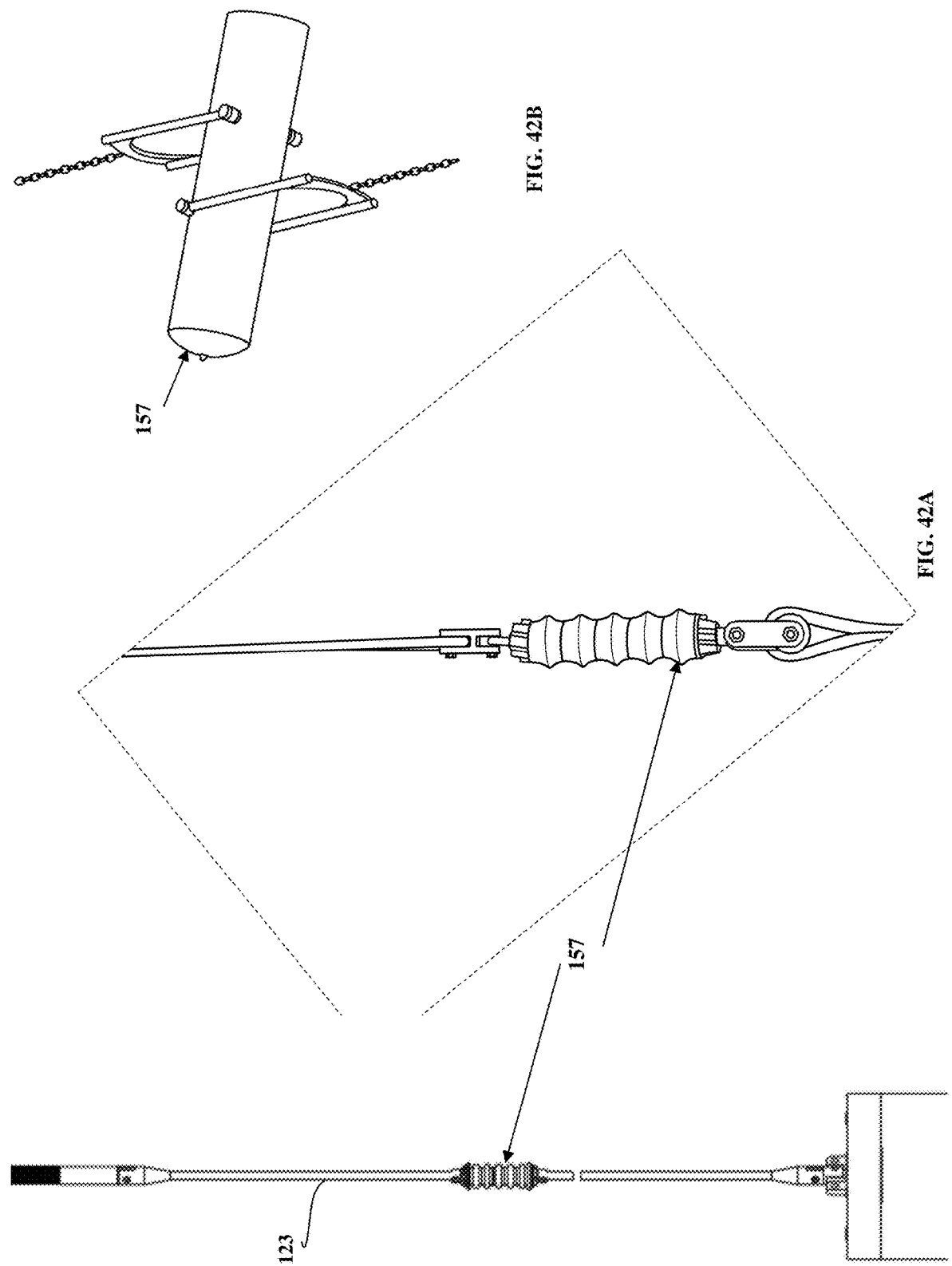
FIGS. 42A and 42B illustrate exemplary load reduction devices (LRD) which are OEM supplied.

Assembling 2702 the single column tension leg platform further comprises installing 2706 the station keeping system 113 at an offshore installation site. The step of installing the station keeping system 113 comprises anchoring the station keeping system 113 to the sea floor. FIGS. 28A-28C illustrate steps of installing a station keeping system 113 at an offshore installation site. FIG. 29 exemplarily illustrates the process of installing micropiles using an OEM supplied equipment 2900. As shown in FIG. 28A, the installation vessel 2800 launches, its ROV 2802 to monitor and assist with anchor installation. It also launches a subsea rig 2900, shown in FIG. 29 which has micropile drill units (not shown), for each of the micropiles 126 to be drilled. The subsea rig 2900 has hydraulics power, monitoring and communications systems to install each helical micropile 126 anchor. In an embodiment, these anchors systems 125 are OEM supplied and negates the need for expensive traditional anchoring equipment and large vessels for installation. FIG. 28B illustrates OEM equipment, for example, a synthetic tendon with tendon top and bottom tendon connectors which may also be fitted with an OEM supplied load reduction device (LRD) 157, as shown in FIGS. 1, 42A and 42B. The load reduction device 157 is installed in each of the moorings 113a. In an embodiment, the LRD 157 is installed inline along a tendon 123, as shown in FIG. 42A, using connectors 4200. The load reduction device 157 is configured to reduce peak tendon 123 tensions to which the entire station keeping system 113 is designed. This helps optimizes all components of the station keeping system 113 which will not have to be designed to peak tendon tension leading to an optimization of tendon 123 size, optimization of tendon top connector 122b, optimization of tendon bottom connector 122c, optimization of the entire anchoring system 125, optimization of the length adjustment joints 122, tendon porch 124a and 124b, and the hull structure of the pontoon extensions 118.

Figure 36:
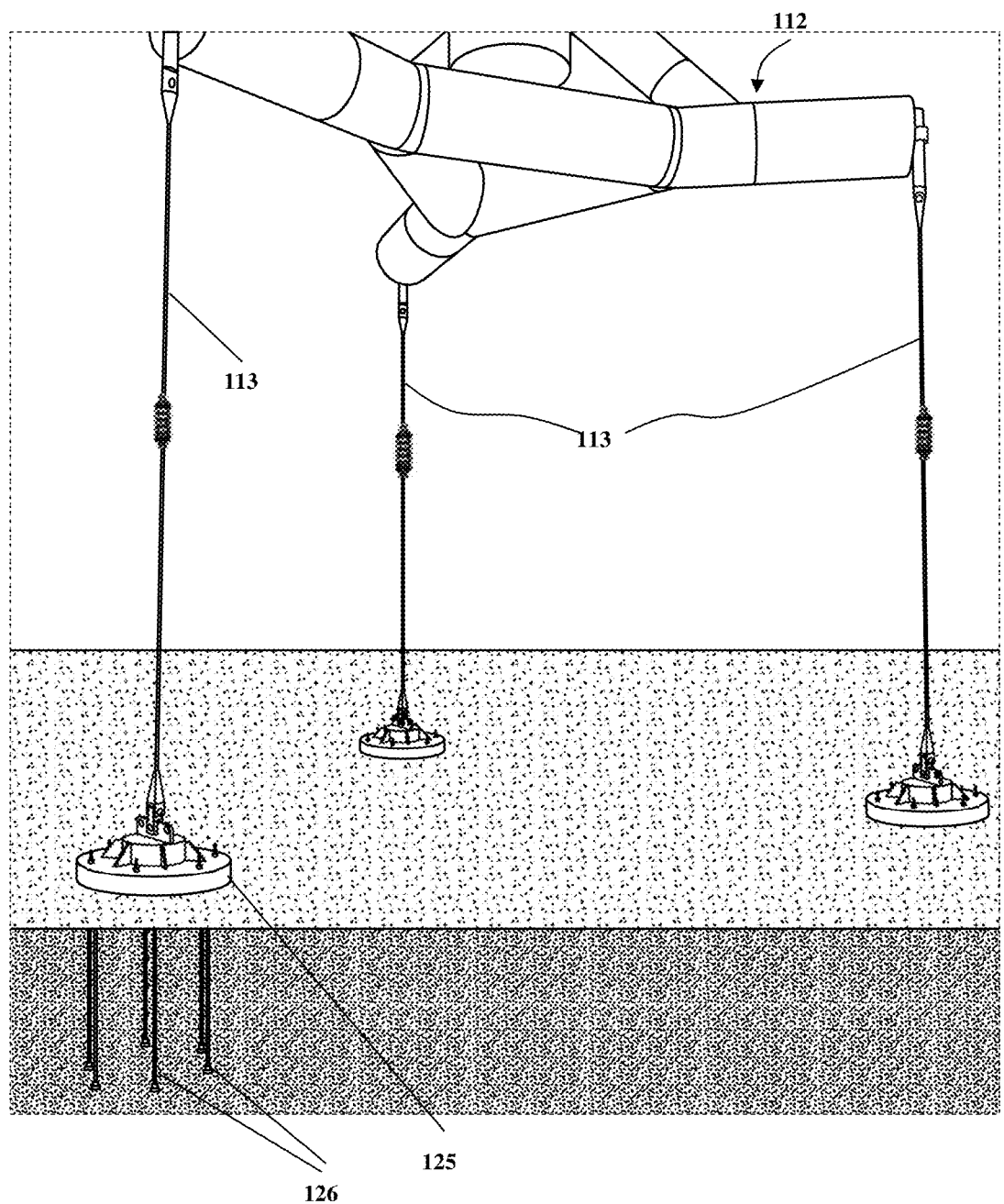
FIG. 36 illustrates the anchoring system of the station keeping system, secured to the seabed.

After drilling holes for each of the micropiles 126 to intended depth, subsea grout is mixed and the subsea grout is delivered to the drilled holes. The micropiles 126 are grouted and on curing are ready for use. The type of anchoring system 125 as illustrated in FIG. 36 was selected for a tight footprint, minimal seafloor intervention with low noise drilled helical micropiles 126 to minimize sea mammal harassment due to installation noise and adhere to strict regulatory requirements into the future. The small footprint Tension Leg Platform (TLP) station i.e., the buoyant base 112 station keeping system 113 will minimize risk of sea mammal entanglement and danger to navigation and the fishing industry. The micropile 126 based anchoring system 125 is one of the anchoring systems used for the SCTLP-FOWT 100 disclosed herein. However, depending on location specifications and client preference, the SCTLP can be outfitted with any other anchoring system.

Each mooring 113a, shown in FIGS. 24 and 9 comprises an anchoring system 125. Each anchoring system 125 comprises at least one main anchor tendon connector 2402 and one or two spare anchor tendon connectors 2404. Likewise, each station keeping system 113 comprises about three moorings 113a, each mooring consists of a synthetic tendon 123 which may be fitted with an OEM supplied load reduction device (LRD) 157 shown in FIGS. 42A and 42B, connected at the top via an OEM supplied tendon top connector 122b, a permanent Length Adjustment Joint (LAJ) 122 to a main tendon porch 124a on the buoyant base 112. The mooring will be via a single primary tendon 123 or if required through an additional fourth spare redundant tendon 127, as shown in FIG. 10. The installation vessel 2800 then launches its remotely operated vehicle (ROV) 2802 and commences tendon 123 and if required tendon 127 installation. Each tendon 123 and 127 is connected to its anchor 125 with an OEM provided tendon bottom connector 122c which connects into the anchor's main tendon connector 2402. The anchors spare tendon connector is used during maintenance or change out of the main tendon.

Figure 30:
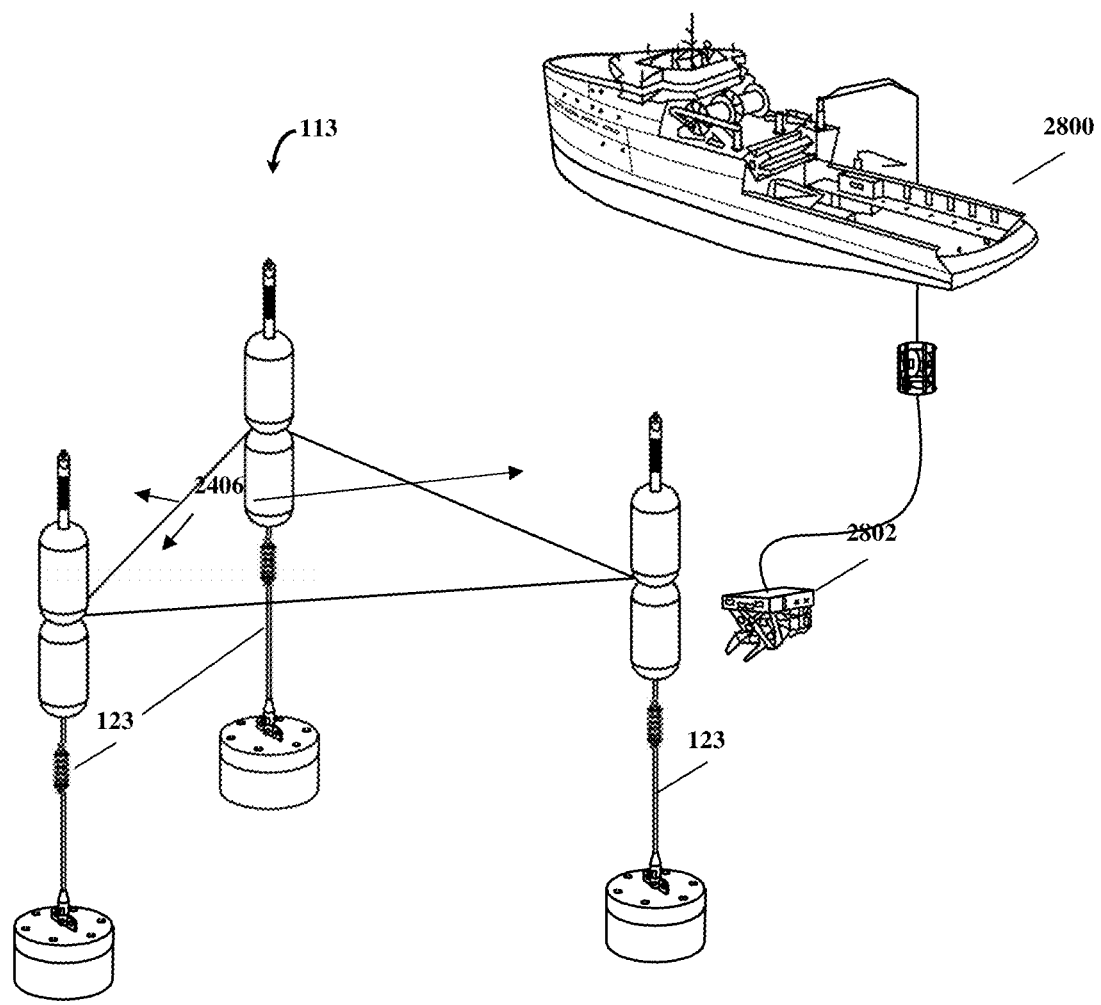
FIG. 30 illustrates a smaller installation vessel using a remotely operated vehicle (ROV) to connect the vertically stowed tendons suspended in the water column by a set of temporary buoys and off the sea bed, using spacer wires.

The top of the tendon 123 and 127 is fitted with a short permanent Length Adjustment Joint (LAJ) 122, as shown in FIGS. 1, 26 and 28c, which is grooved only at final lock off point of the SCTLP-FOWT 100 to optimize costs of the LAJ 122. Each tendon 123 and 127 when installed is temporarily fitted with buoys 2400 to provide buoyancy. The buoys 2400 are reusable and fitted just below the LAJ to suspended it vertically in the water column off the seabed and maintain the minimum necessary tension in the station keeping system 113, anchors 125 and/or the moorings 113a. More specifically, the buoys 2400 is fitted in between the short permanent length adjustment joint 122 and the tendon 123 and 127. The other anchors 125 and their tendons 123 and if required 127 are installed in the same way and all three are connected together with spacer wires 2406 to ensure tendon separation during vertical wet stowage. The tendons 123 and 127 are vertically stowed below the surface of the sea in a safe condition ready for hook up with the SCTLP-FOWT 100 when it arrives on site to be hooked up to the tendons 123 and if required 127. FIG. 30 illustrates a smaller installation vessel 2800 using a remotely operated vehicle (ROV) 2802 to connect the vertically stowed tendons 123 suspended in the water column by a set of temporary buoys 2400 and off the sea bed, using spacer wires 2406.

Figure 31:
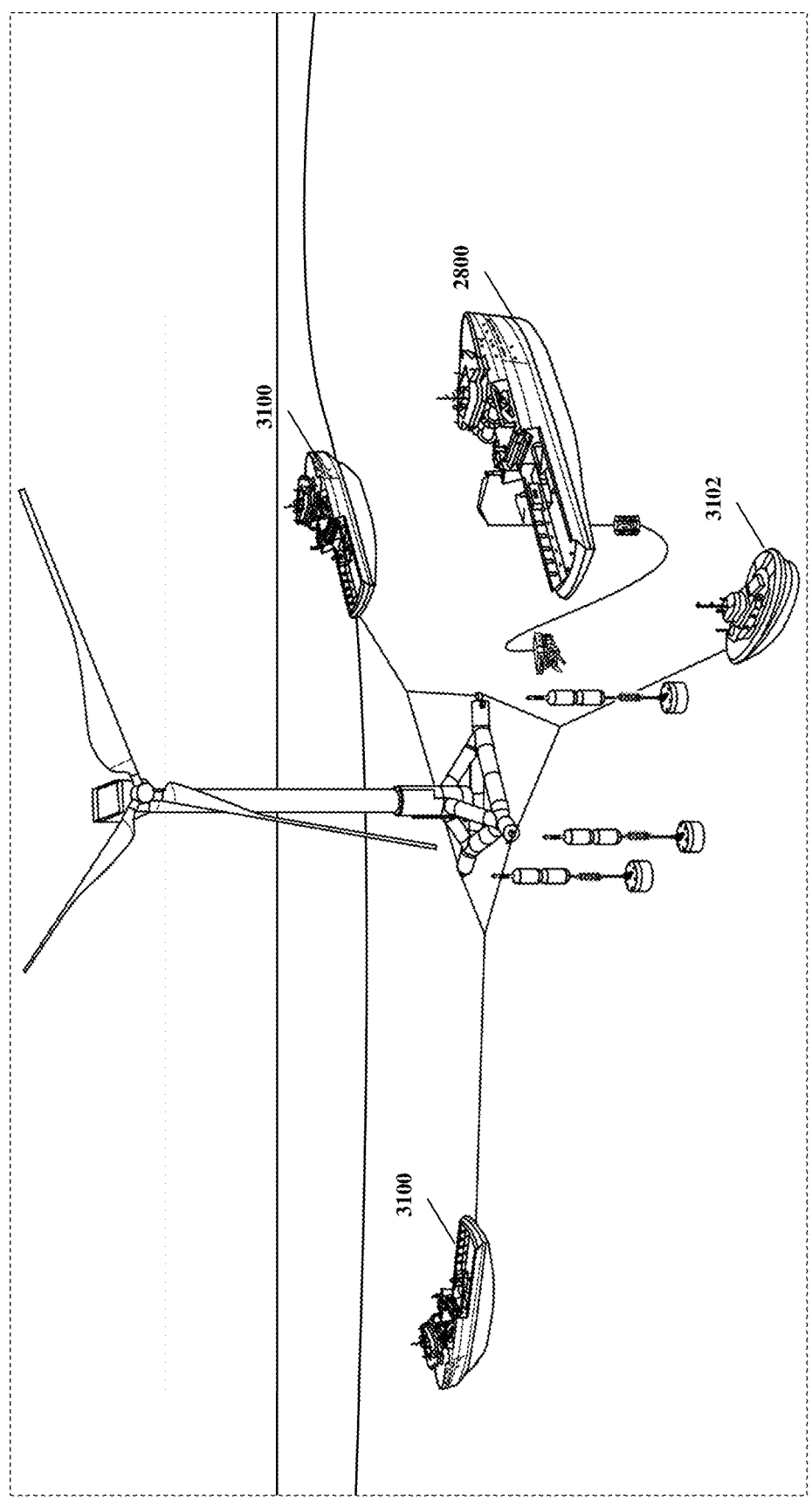
FIG. 31 illustrates a step of floating over and positioning the fully assembled and commissioned SCTLP-FOWT over the submerged station keeping system, with spacer wires removed, using small readily available tugs.

FIG. 31 illustrates a step of floating over and positioning the fully assembled and commissioned SCTLP-FOWT 100 over the submerged station keeping system 113, with spacer wires 2406 removed, using small readily available tugs 3100, 3102. As soon as the tugs 3100, 3102 towing the assembled buoyant base 112 and nacelle rotor assembly 150 of the SCTLP-FOWT 100 arrive at the installation site, the spacer wires 2406 are removed from the tendons 123. The tugs 3100, 3102 are then repositioned into a star mating configuration with the assembled buoyant base 112 and nacelle rotor assembly 150 of the SCTLP-FOWT 100 at the center of the tugs 3100, 3102 and then the assembled buoyant base 112 and nacelle rotor assembly 150 of the SCTLP-FOWT 100 is floated over the submerged tendons 123 in a controlled manner.

Figure 32A:
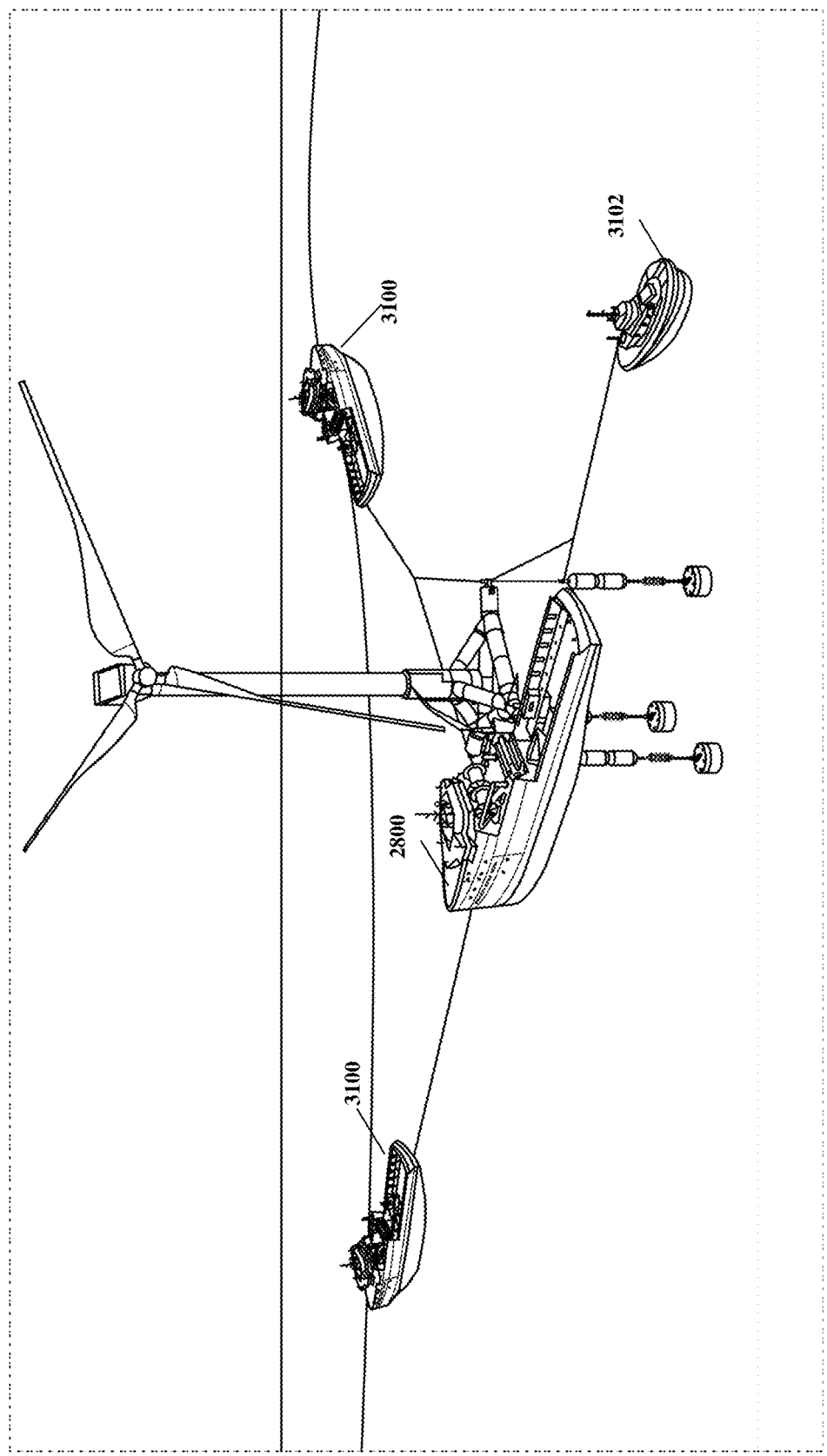
FIGS. 32A and 32B illustrate steps of placing personnel and hydraulic power units (HPU) and other installation equipment on the SCTLP-FOWT, attaching the length adjustment joint (LAJ) installation tool, tendon top connector assembly (TTCA) and tensioner system via the SCTLP-FOWT tendon porches to the submerged station keeping system.
Figure 32B:
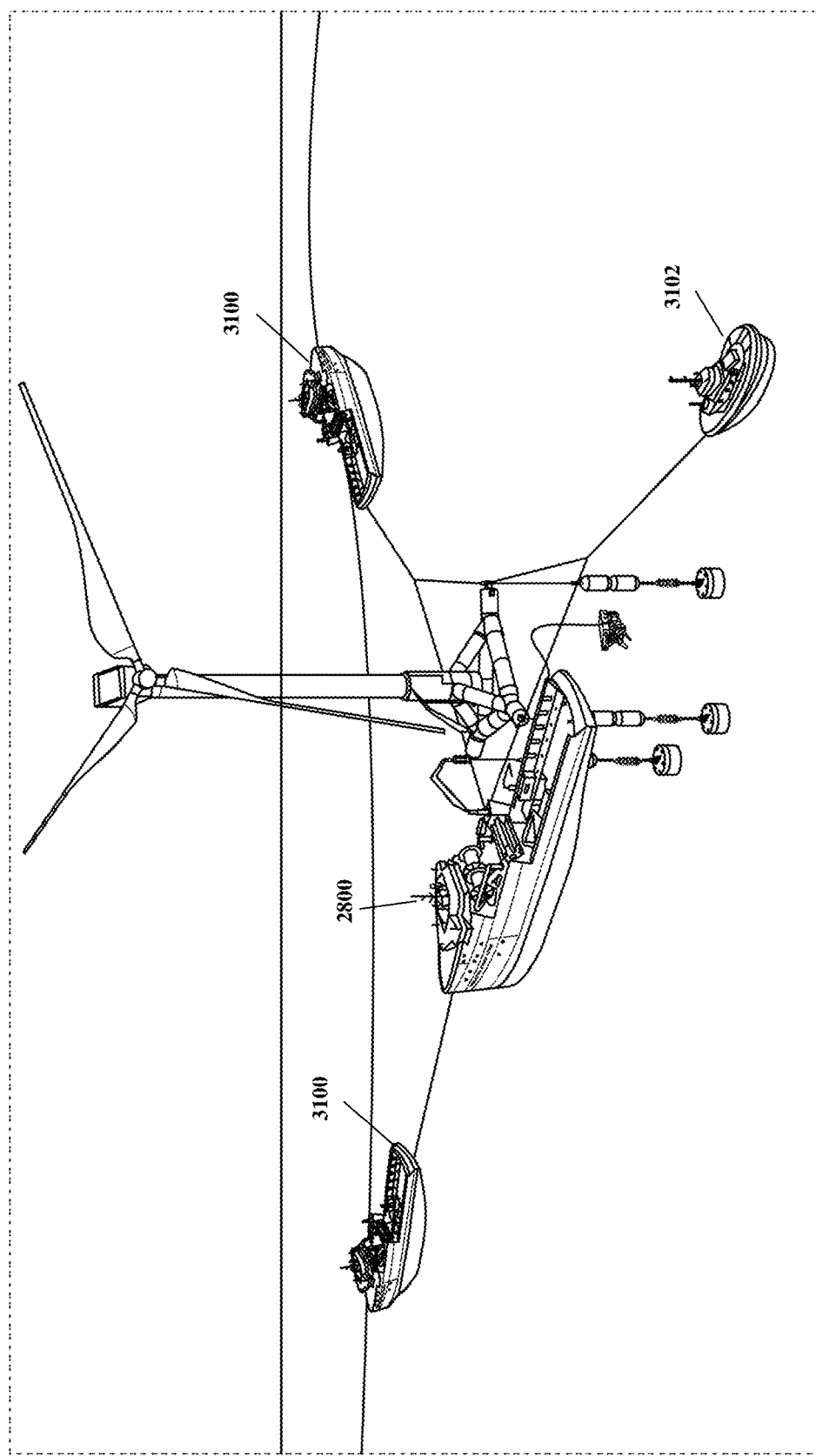
Figure 37C:
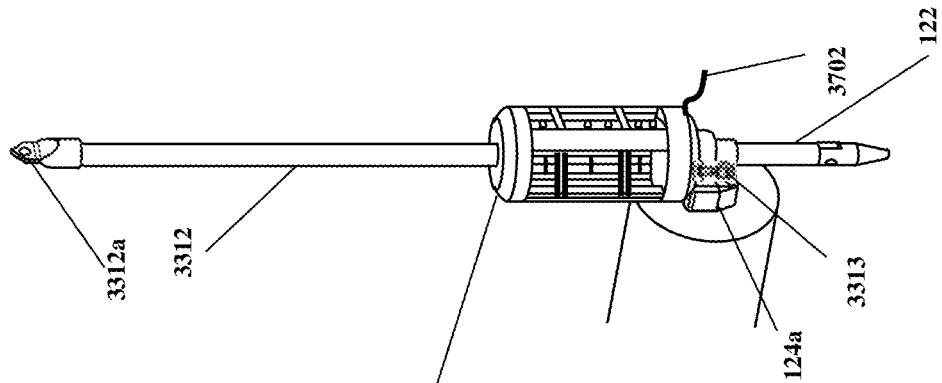
FIGS. 37A-37C illustrate installation of a disconnectable and reusable length adjustment joint (LAJ) installation tool, installation and activation of a tendon top connector assembly (TTCA) via an ROV hot stab, and a tensioner system.
Figure 37B:
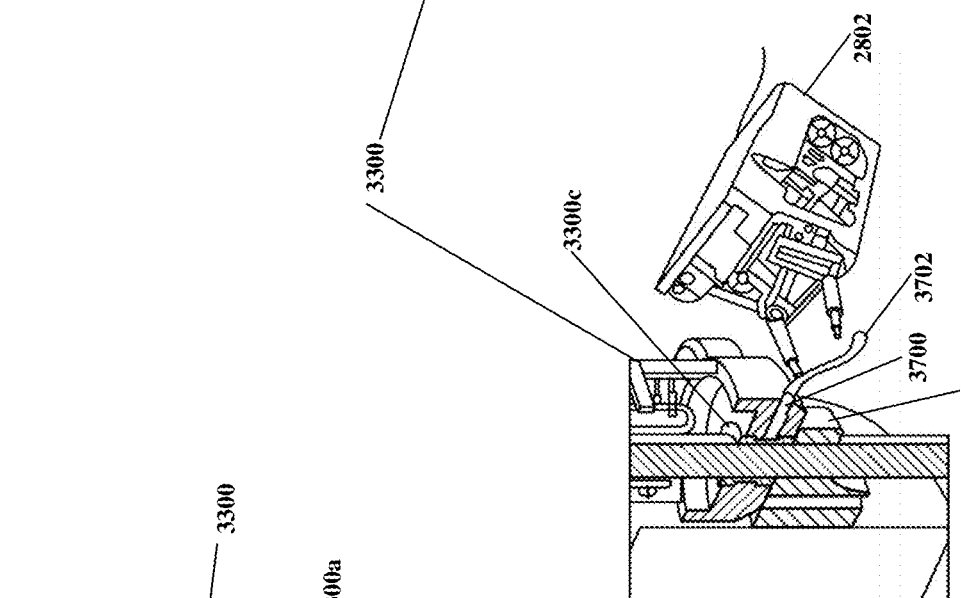
Figure 37A:
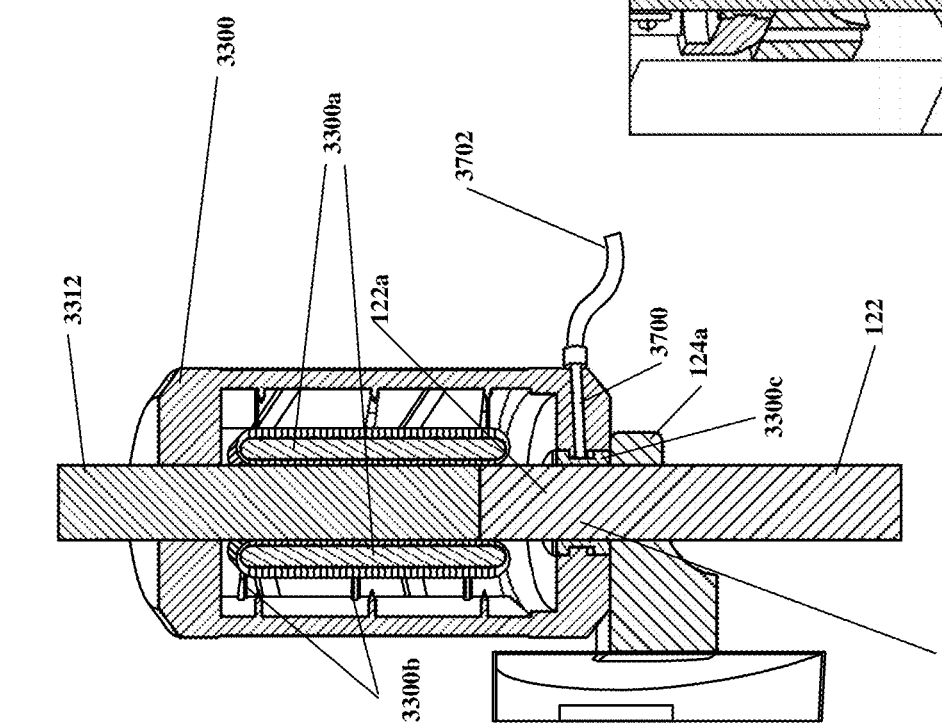

FIGS. 32A and 32B illustrate steps of placing personnel and hydraulic power units (HPU) and other installation equipment on the SCTLP-FOWT 100, attaching the length adjustment joint (LAJ) installation tool 3312, tendon top connector assembly (TTCA) 3300c and tensioner system 3300 via the SCTLP-FOWT 100 tendon porches 124a to the submerged station keeping system 113. When in position, the installation vessel 2800 places people, Hydraulic Power Unit (HPU) (not shown) and other installation tools on the assembled buoyant base 112 and nacelle rotor assembly 150 of the SCTLP-FOWT 100 in preparation of mating of the assembled buoyant base 112 and nacelle rotor assembly 150, and the station keeping system 113. The installation vessel 2800 then installs a disconnectable/reusable Length Adjustment Joint (LAJ) installation tool 3312, the Tendon Top Connector Assembly TTCA 3300c and a Tensioner System 3300, after positioning the single column tension leg platform over the tendons. In an embodiment, the disconnectable/reusable Length Adjustment Joint (LAJ) installation tool 3312 and the Tensioner System 3300 are proprietary installation tools shown in FIGS. 33A and 33B and FIGS. 37A-37C. As shown in FIGS. 37A-37C, the Length Adjustment Joint (LAJ) installation tool 3312 comprises a LAJ Top connector 3312a connected to the top of the LAJ installation tool 3312 used as a crane connection point when installing the LAJ installation tool 3312 offshore, as shown in FIG. 32B. The Length Adjustment Joint (LAJ) installation tool 3312 shown in FIGS. 33 and 37A-37C is a unique installation tool developed for the installation of the SCTLP-FOWT disclosed herein.

Figure 33A:
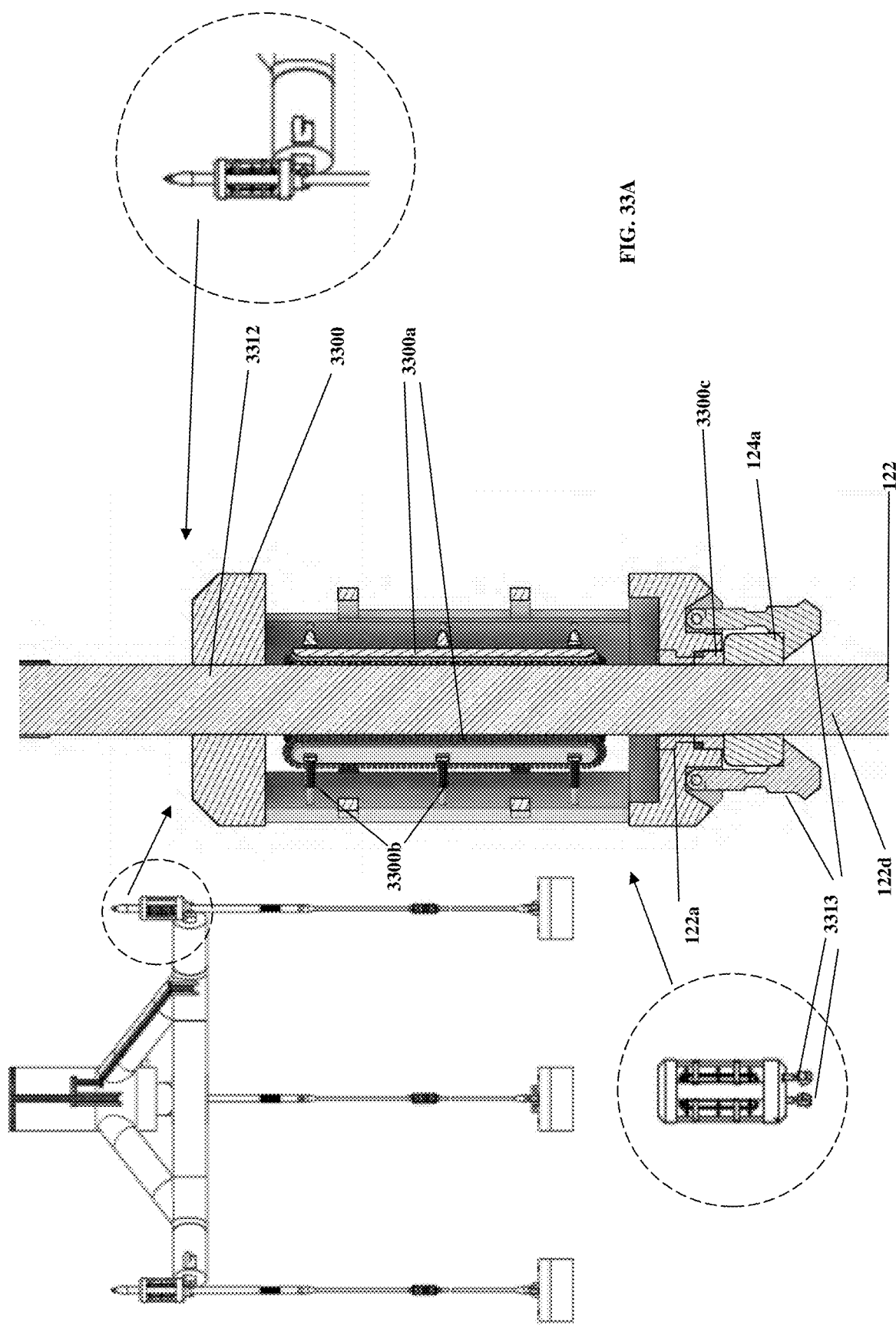
FIGS. 33A and 33B illustrate the tensioner system placed on the tendon porches of the SCTLP-FOWT, gripping a length adjustment joint (LAJ) installation tool via four sets of gripper pads and the tendon porches via a set of hydraulic clasps which when activated lock the single column tension leg platform to the tendons and the station keeping system.
Figure 33B:
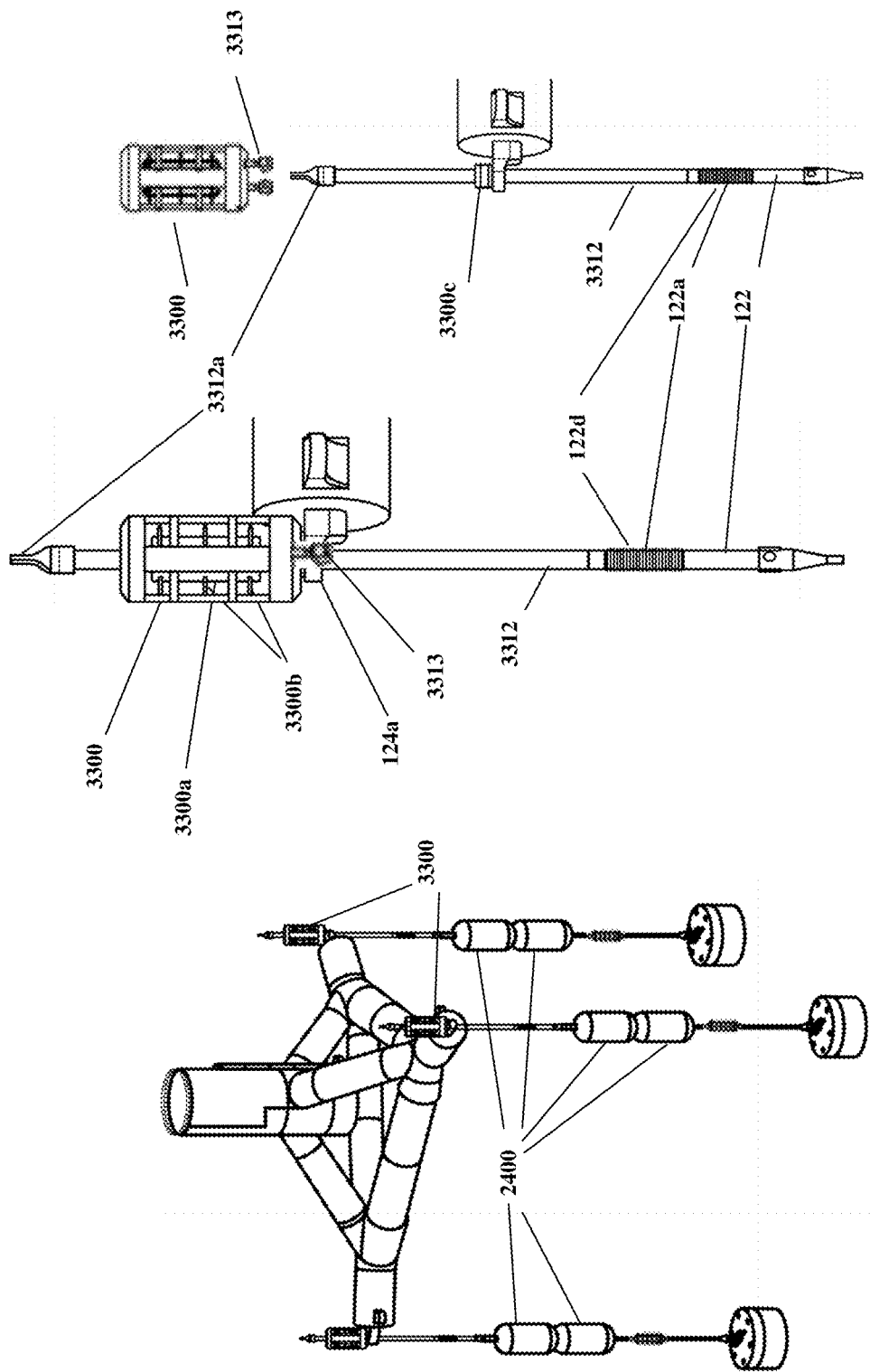
Figure 37D:
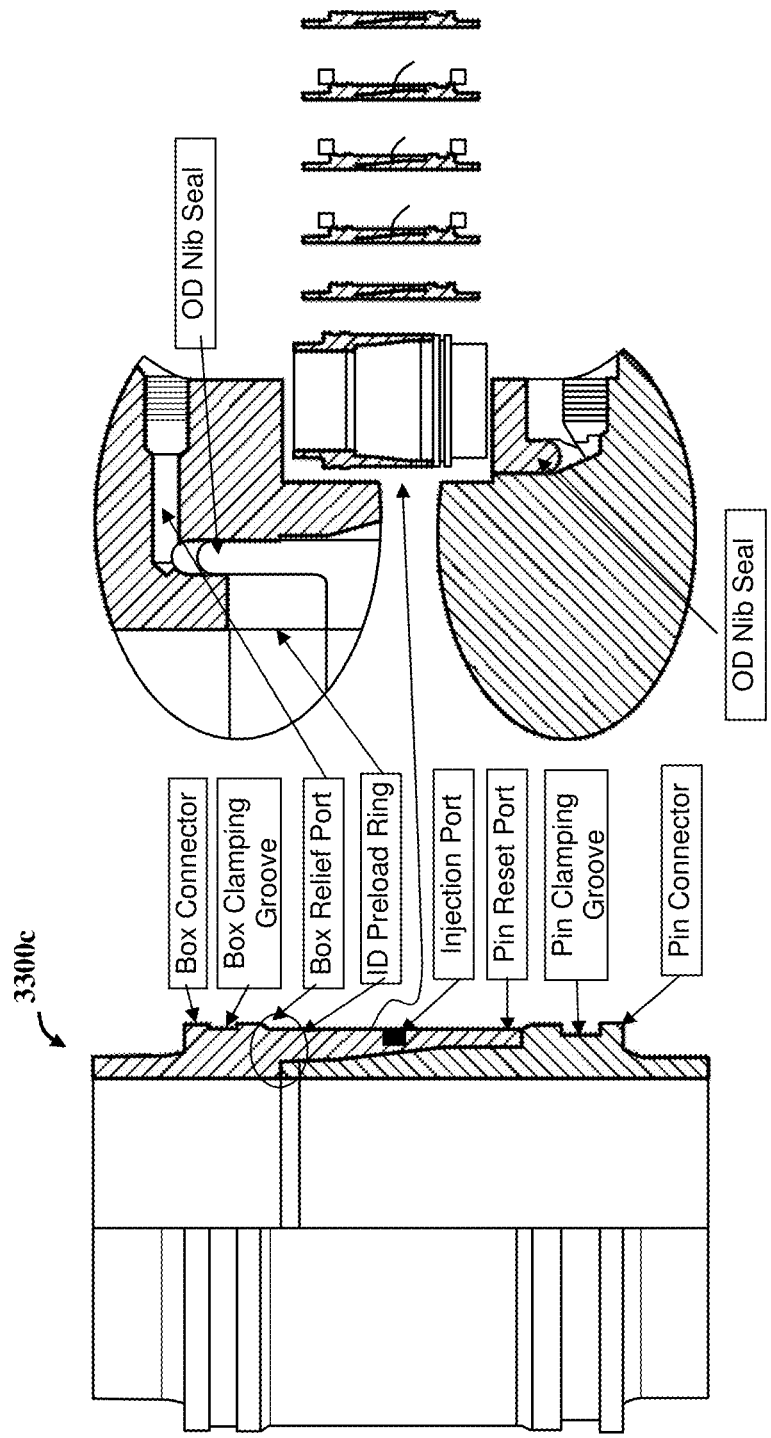
FIG. 37D illustrates a mechanical make/break coupling which is hydraulically activated.

The LAJ installation tool 3312 is connected to the submerged permanent LAJ 122 which is attached to the top of tendon 123. The connection is made by the installation vessel's 2800 remotely operated vehicle (ROV) 2802 using a simple quick coupler or threaded screwed in attachment or hydraulically operated make/break coupling, similar to the tendon top connector assembly (TTCA) 3300c which is much slimmer and designed to sit almost flush with the LAJ and LAJ installation tool, shown in FIG. 37D which is activated by a hydraulic power unit (HPU) (not shown) on the FOWT. FIG. 37D illustrates a mechanical make/break coupling 3300c which is hydraulically activated. The mechanical make/break coupling 3300c illustrated in FIG. 37D is an OEM equipment. FIGS. 33A and 33B illustrate the tensioner system 3300, gripping the length adjustment joint (LAJ) installation tool 3312 and the tendon porches 124a using four sets of gripper pads 3300a and a pair of hydraulic clasps 3313 on activating the tensioner system 3300 to lock the buoyant base 112 of the single column tension leg platform 100 to the tendons 123.

Figure 34:
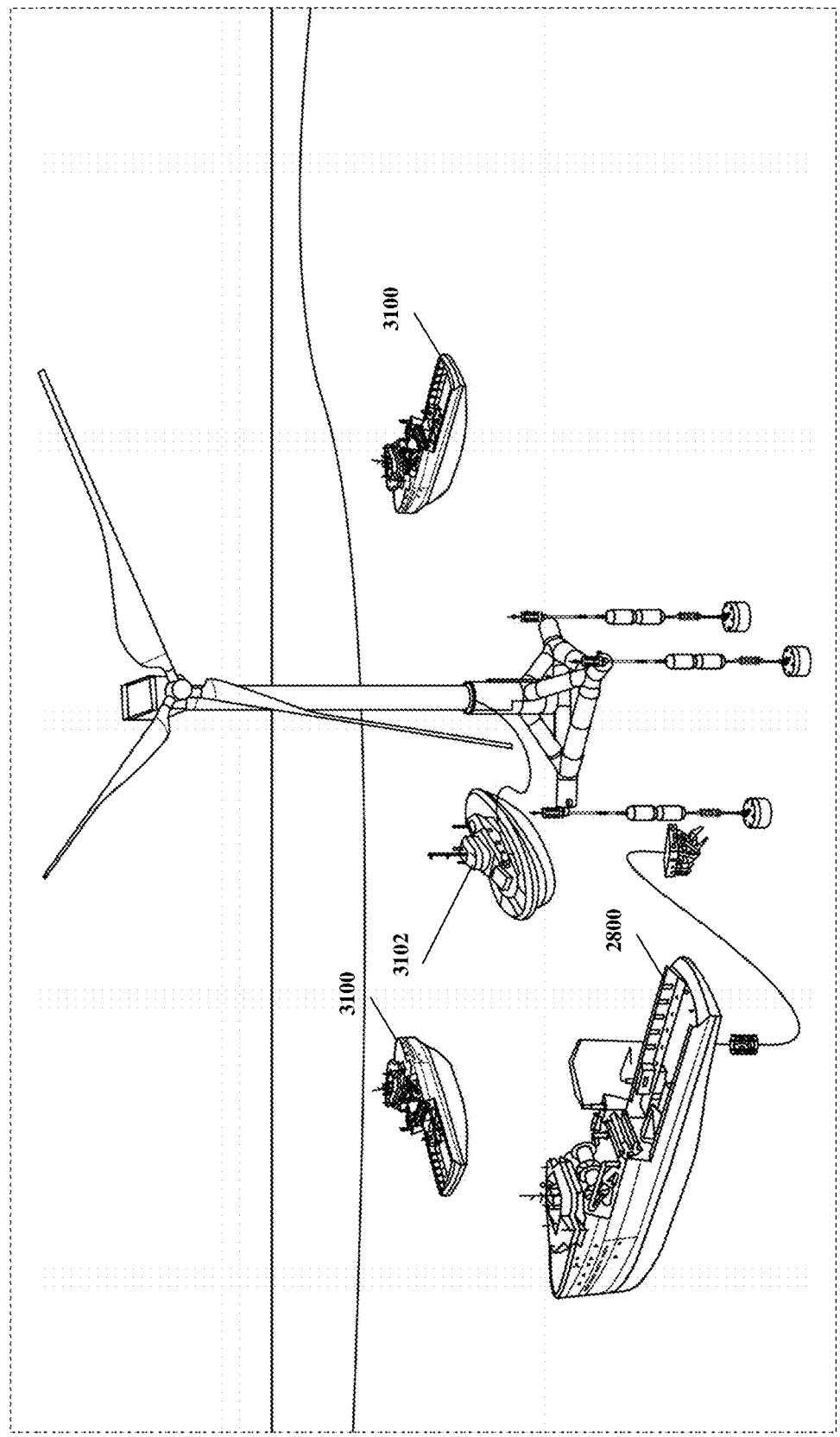
FIG. 34 illustrates a step of connection of the SCTLP-FOWT to the station keeping system, disconnection of towing tugs from the single column tension leg platform, hook up of the tug used for ballasting/de-ballasting and ready for commencement of installation with the ROV deployed for monitoring.

The TTCA 3300c is a simple make/break hydraulically activated unit placed on top of the tendon porch 124a and activated by the same HPU. The tensioner system 3300 has 4 sets of gripper pads 3300a which grip the entire surface of the LAJ installation tool 3312 and are belt driven. The 4 sets of gripper pads 3300a grip the entire surface of the LAJ installation tool 3312 from all the four directions. Each set of gripper pads 3300a maintains a pre-set tension on the LAJ installation tool 3312 via 3 or 4 sets of hydraulic pistons 3300b, to initiate a controlled crawl down the LAJ installation tool 3312. The HPU activates the Tensioner system 3300 which locks the assembled buoyant base 112 and nacelle rotor assembly 150 of the SCTLP-FOWT 100 to the tendons 123. FIG. 34 illustrates a step of disconnecting the tugs 2800 from the single column tension leg platform 100. The tug 2800 which is the lead ocean towing tug and tugs 3100 and 3102 that were in the star installation formation are disconnected from the SCTLP-FOWT 100. The ballast tug 3102, shown in FIG. 34, is hooked up to the SCTLP-FOWT's 100 ballast system manifold (not shown) but situated at the top of the transition piece 116 to commence ballasting down. In an embodiment, the ballast tanks are ballasted in the following configuration/sequence. First, the pontoon tanks 4300a are ballasted, followed by tanks 4300b in the column brace 119, and lastly the ballast tank 4300 in the vertical tubular column hull 115 of the central main vertical floating column 111. In an embodiment, the ballast tanks 4300a, 4300b, and 4300c are de-ballasted in a reverse of the ballasting sequence.

In an embodiment, the tensioner system 3300 is placed on the tendon porch 124a as shown in FIGS. 33A and 33B. In an embodiment, buoys 2400 are temporarily attached to the tendons 123 to assist the tensioner system 3300 during attaching the assembled buoyant base 112 and nacelle rotor assembly 150 of the SCTLP-FOWT 100. In an embodiment, the LAJ installation tool 3312 is smooth/un-grooved along its entire length.

Assembling 2702 the single column tension leg platform 100 further comprises ballasting 2707 down the single column tension leg platform to tow out draft, towing out the SCTLP-FOWT to installation site, attaching the assembled single column tension leg platform to the station keeping system at the offshore site, ballasting down the SCTLP-FOWT to lock off draft hooking up the single column tension leg platform to the permanent length adjustment joint, and de-ballasting the single column tension leg platform to tension the mooring and bringing the single column tension leg platform to operational draft.

Figure 35:
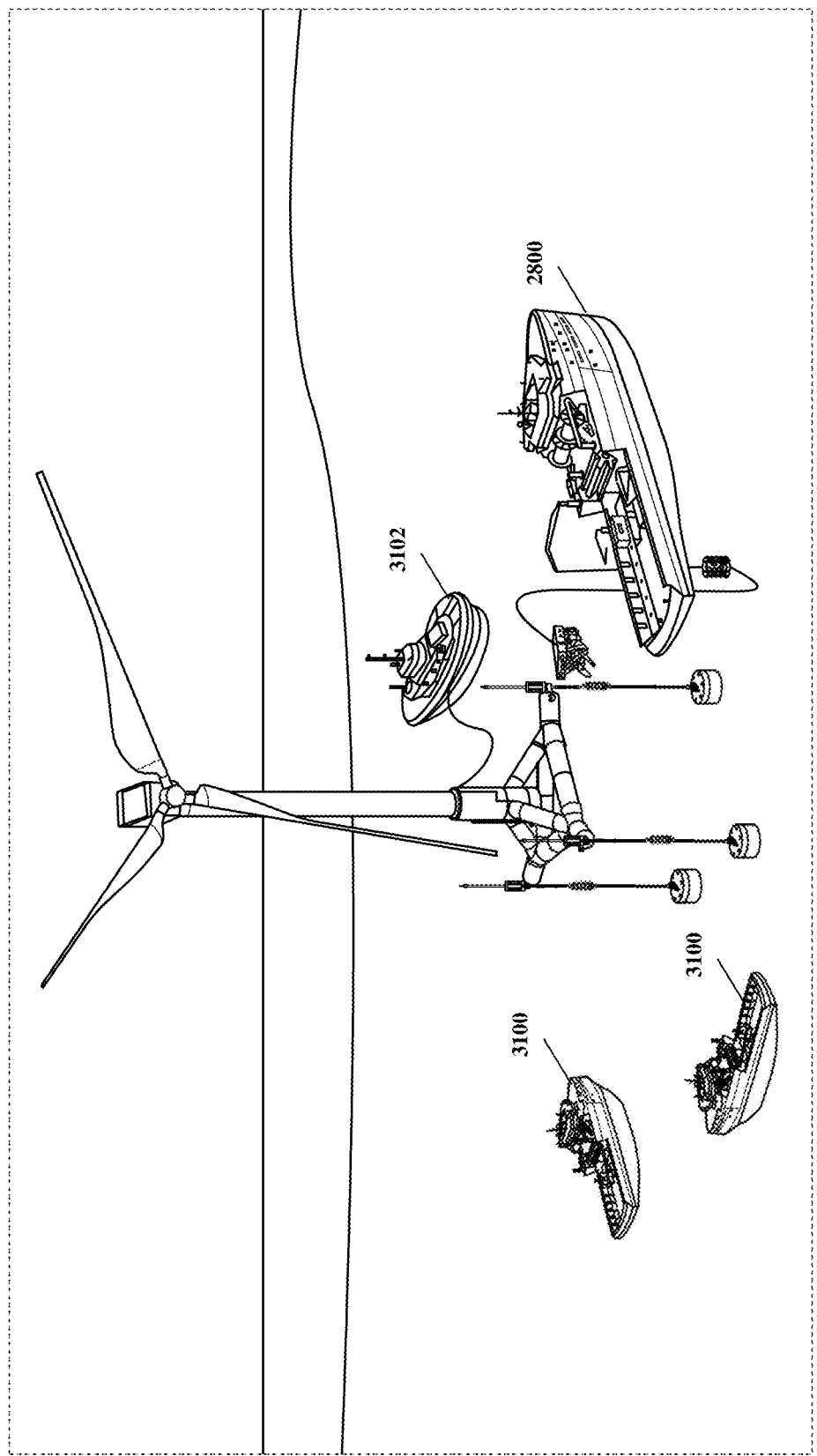
FIG. 35 illustrates a step of removing the temporary buoys and initiating crawl of the tensioner system simultaneously along with ballasting down of the single column tension leg platform via the ballast/de-ballast tug with installation vessels ROV monitoring progress.

FIG. 35 illustrates a step of removing the temporary buoys 2400 and initiating crawl of the tensioner system 3300 down the LAJ installation tool 3312, simultaneously along with ballasting down of the single column tension leg platform 100 via the ballast/de-ballast tug 3102 while the installation vessel's ROV 2802 is monitoring progress underwater. More specifically, the tensioner system 3300 crawl is initiated simultaneously while ballasting down the buoyant base 112 of the SCTLP-FOWT 100. The Tensioner system 3300 presses down on the tendon porch 124a maintaining a constant pre-determined pressure on the buoyant base 112 of the SCTLP-FOWT 100 while also gripping the LAJ installation tool 3312 and the tendon porch 124a securely. In this way equilibrium in the system is maintained which holds the SCTLP-FOWT 100 firmly in position to the tendons 123 from this stage until lock off position and draft is reached. FIG. 36 illustrates the anchoring system 125 of the station keeping system 113 secured to a bottom of a water body. In an embodiment, the anchoring system shown in FIG. 36 (micropiles or any other type of anchors) are OEM supplied equipment.

The temporary buoyancy units i.e., buoys 2400 are removed from all tendons 123 and the SCTLP-FOWT 100 is then ballasted down in a controlled manner using the ballast pumps (not shown) of the ballast tugs 3102, or using portable ballast pumps (not shown) while simultaneously crawling the tensioner system 3300 down the LAJ installation tool 3312. In an embodiment, to optimize the SCTLP-FOWT 100, ballast pumps will not be installed. Instead, the passive ballast system 4300 will use the tugs pumps. During this process a desired pretension is always maintained on the entire SCTLP-FOWT 100 station keeping system. System equilibrium is maintained i.e., buoyancy of the SCTLP-FOWT 100 acting upwards while the tensioners and ballast pushes the FOWT down always maintaining more buoyancy which relates to a pre-tension in the station keeping system which provides the necessary support to the SCTLP-FOWT 100 and maintains it upright and stable through the mating process.

When the FOWT 100 reaches lock off draft/position 122d on the grooved/threaded section 122a of the permanent LAJ 122, the SCTLP-FOWT 100 is levelled using ballast. After the SCTLP-FOWT 100 is fully level and upright, the TTCA 3300c make/break coupling is hydraulically activated by the ROV 2802 using a specially designed hot stab 3702 through an injection port orifice 3700 shown in FIGS. 37A-37D, and the SCTLP-FOWT 100 is locked off to the permanent LAJ 122 and the pre-installed tendons 123.

FIGS. 37A-37D illustrate installation of a disconnectable and reusable length adjustment joint (LAJ) installation tool 3312, a tendon top connector assembly (TTCA) 3300c, and a tensioner system 3300. The TTCA 3300c and tensioner system 3300 are designed to work as a single unit for locking off the SCTLP FOWT 100 to grooved/threaded section 122a of the permanent LAJ 122. The TTCA 3300c sits on top of the tendon porch 124a, flush within the base of the tensioner system 3300. The TTCA 3300c is activated via an injection port orifice 3700 from the exterior of the tensioner system 3300 body, which can be accessed by an ROV 2802 hot stab 3702. At the predetermined lock off draft 122d, the ROV 2802 inserts a hot stab 3702 into the injection port 3700 and hydraulically activates the TTCA 3300c locking off the TTCA 3300c and the assembled buoyant base 112 and nacelle rotor assembly 150 of the SCTLP-FOWT 100 to the permanent LAJ 122.

Figure 38:
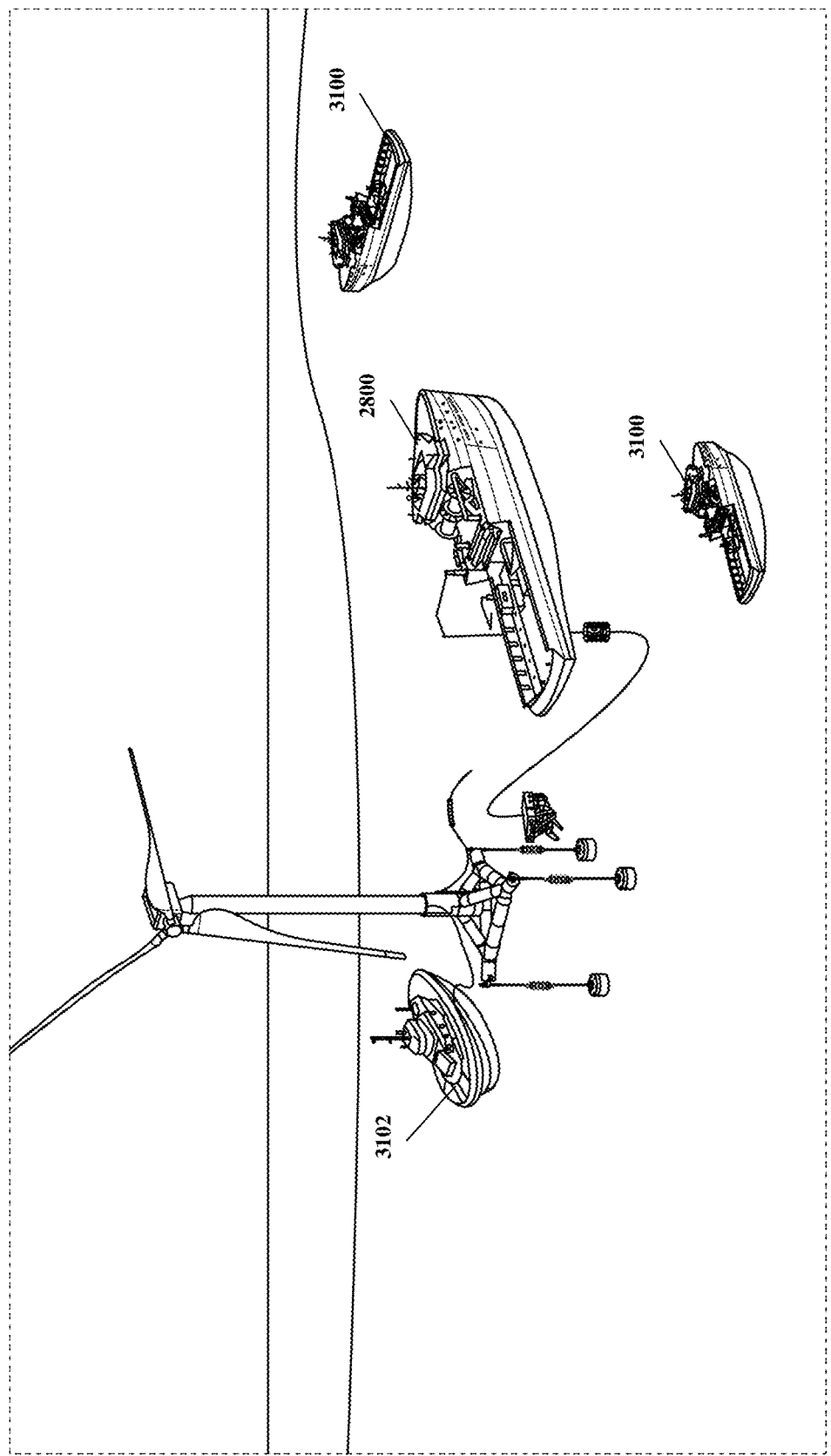
FIG. 38 illustrates a step of de-ballasting the single column tension leg platform using the ballast/de-ballast tug to reach in-place or operational draft.

After locking off the SCTLP-FOWT 100 it is once again levelled, and pretension equalized to pre-calculated lock off draft pre-tension. The buoyant base 112 of the SCTLP-FOWT 100 is then de-ballasted in a controlled manner to in-place or installation draft while closely monitoring the draft of the SCTLP-FOWT 100, tendon tension and maintaining the SCTLP-FOWT 100 upright through the process. FIG. 38 illustrates the step of de-ballasting the SCTLP-FOWT 100 using the ballast pumps of ballast tug 3102. When the SCTLP-FOWT 100 reaches its final in-place or installation draft, intended pre-tension is fine-tuned by ballast adjustments while ensuring the SCTLP-FOWT 100 is upright. On completion, the ballast tug 3102 is disconnected, the ballast system 4300 is shut down and secured, tensioner system 3300, LAJ installation tool 3312, and the HPU's are removed from the SCTLP-FOWT 100 and returned to the installation vessel 2800 for reuse on the next SCTLP-FOWT 100 installation. In an embodiment, the entire buoyant base 112 acts as the ballast system 4300.

Assembling 2702 the single column tension leg platform further comprises connecting 2708 the inter array cable riser system to the single column tension leg platform-floating offshore wind turbine (SCTLP-FOWT) and to an electrical substation for stabilization before transmitting power generated by the single column tension leg platform-floating offshore wind turbine (SCTLP-FOWT) to the electrical substation. The electrical substation may further transmit the power to a desire location. The inter array cable riser system comprises a cable hull entry point assembly, a riser system, and appropriate mattressing to protect the cable at the seabed landing point, as shown in FIGS. 1,11 and 20.

Figure 39:
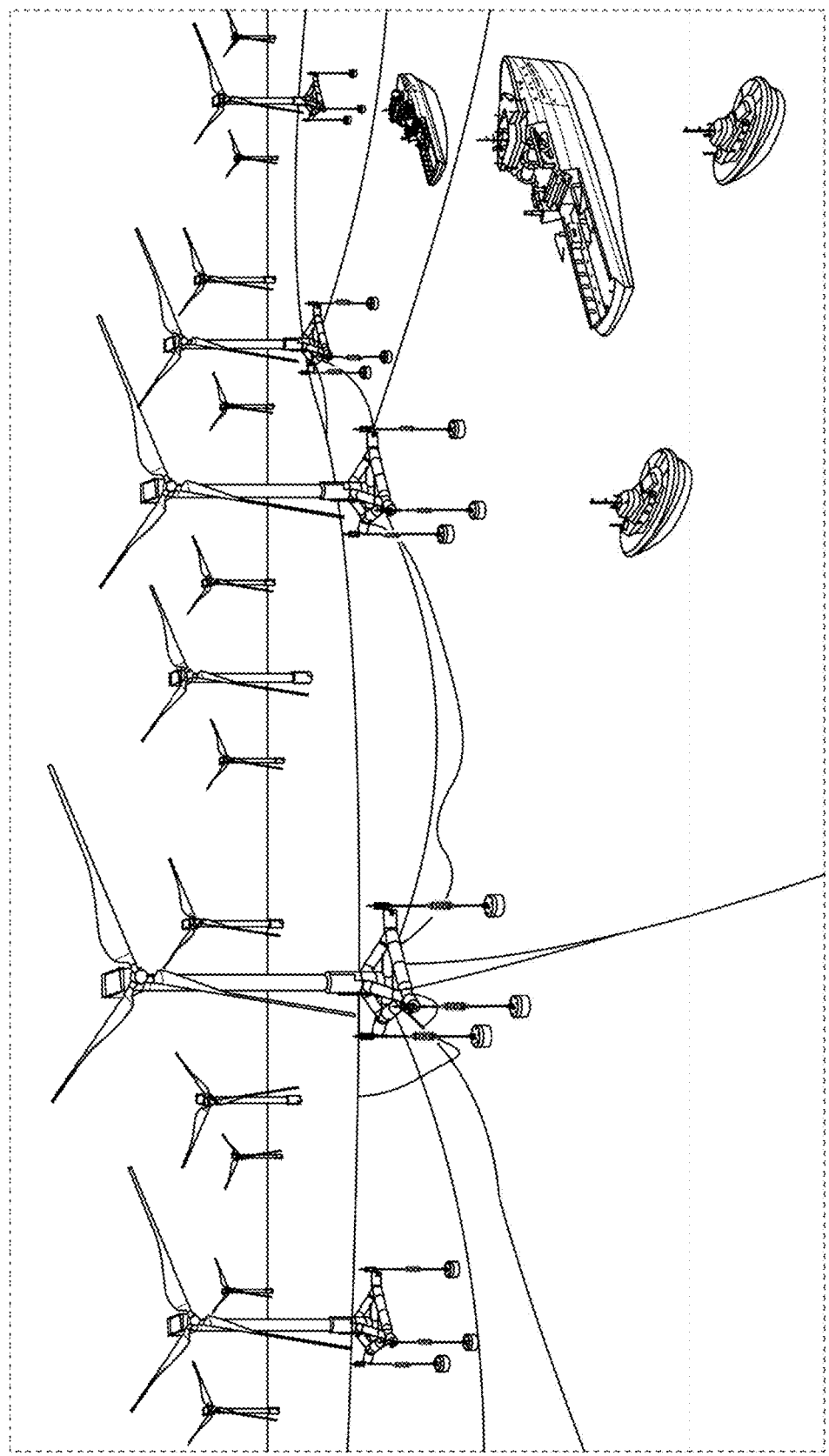
FIG. 39 illustrates a step of securing the ballast system and connecting electrical cables of each of the floating offshore wind turbine to create an inter-array of cables to transport electrical power from the floating offshore wind turbines to an offshore substation and finally ashore.

FIGS. 40A-40B illustrates installation of a tendon top connector assembly (TTCA) cover 4000. FIG. 40C illustrates a riser for the inter array-cable system 130 for the inter array-cable system 114. A TTCA 3300c has a fiberglass high visibility orange protective cover 4000. The fiberglass high visibility orange protective cover 4000 is installed over the TTCA 3300c to protect it for life after which the installation marine spread is demobilized. The SCTLP-FOWT's 100 inter array-cable system 114 is the final piece of equipment to be installed by an Inter Array Cable installation vessel during the cable installation campaign. FIG. 39 illustrates a step of securing the ballast system 4300 and connecting electrical cables of each of the floating offshore wind turbine to create an inter-array of cables to transport electrical power from the floating offshore wind turbines to an offshore substation after which the power is exported ashore or to a desired location.

Figure 45A:
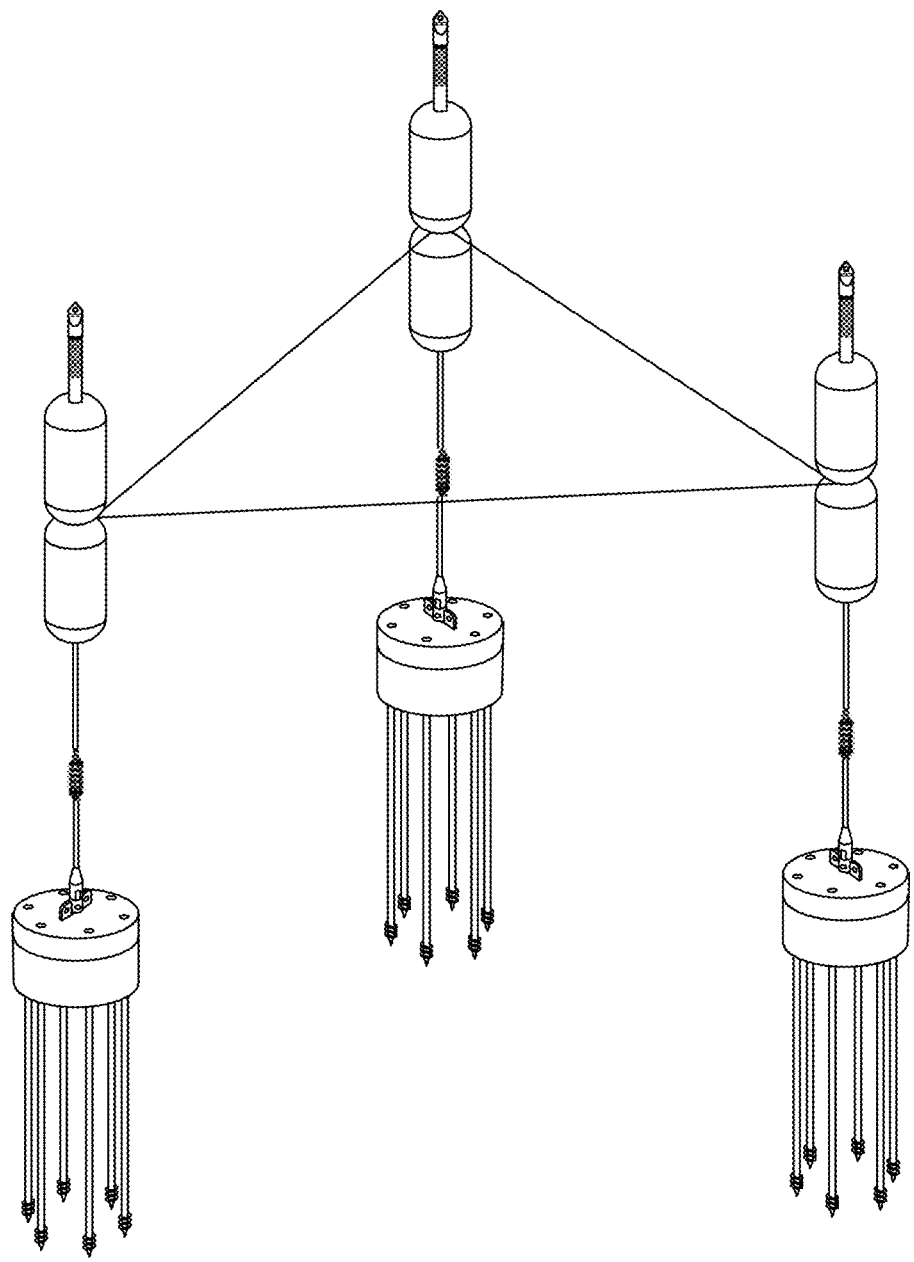
FIGS. 45A-45F illustrates the sequence of installing a Single Column Tension Leg Platform (SCTLP).
Figure 45B:
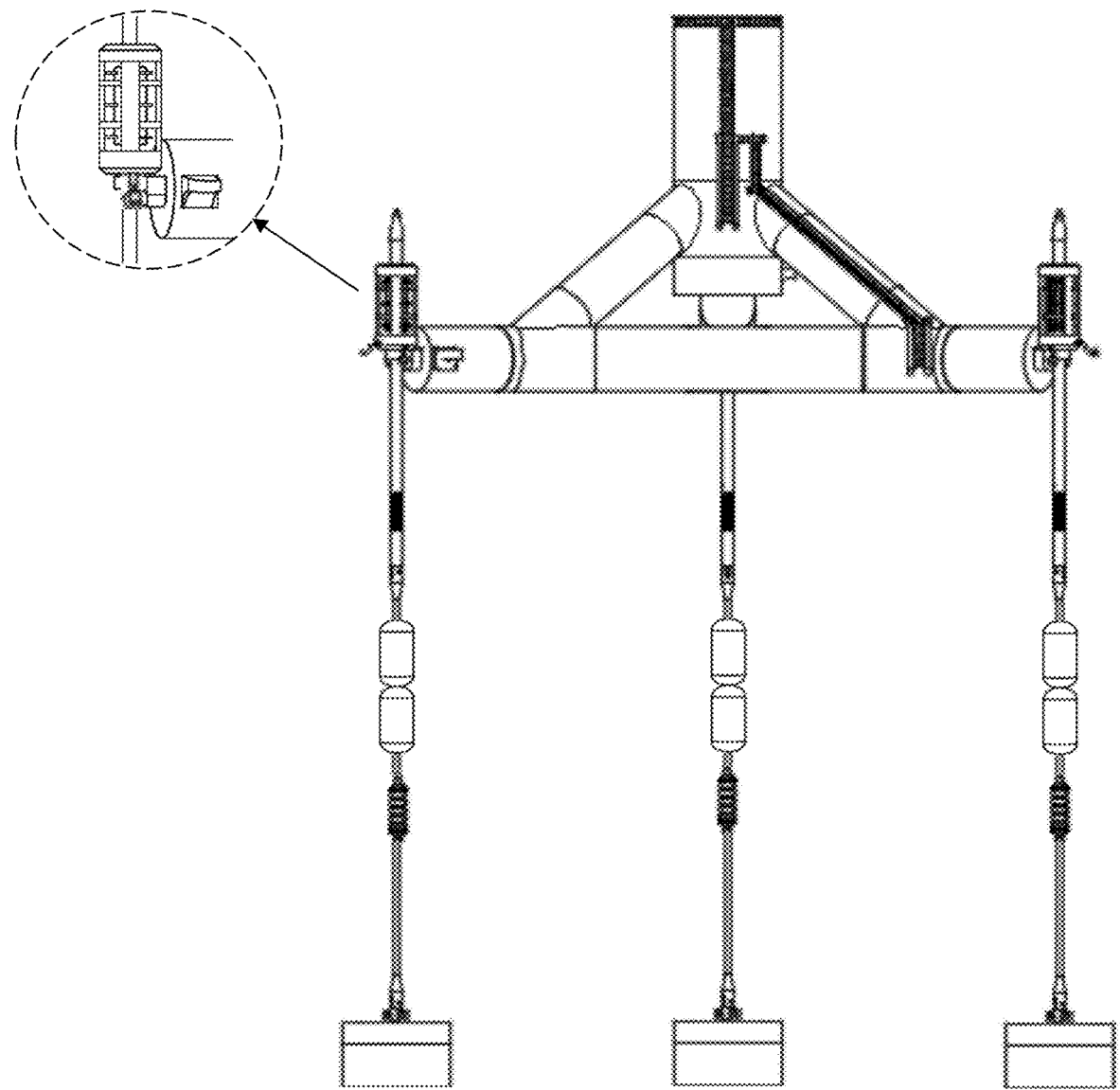
Figure 45C:
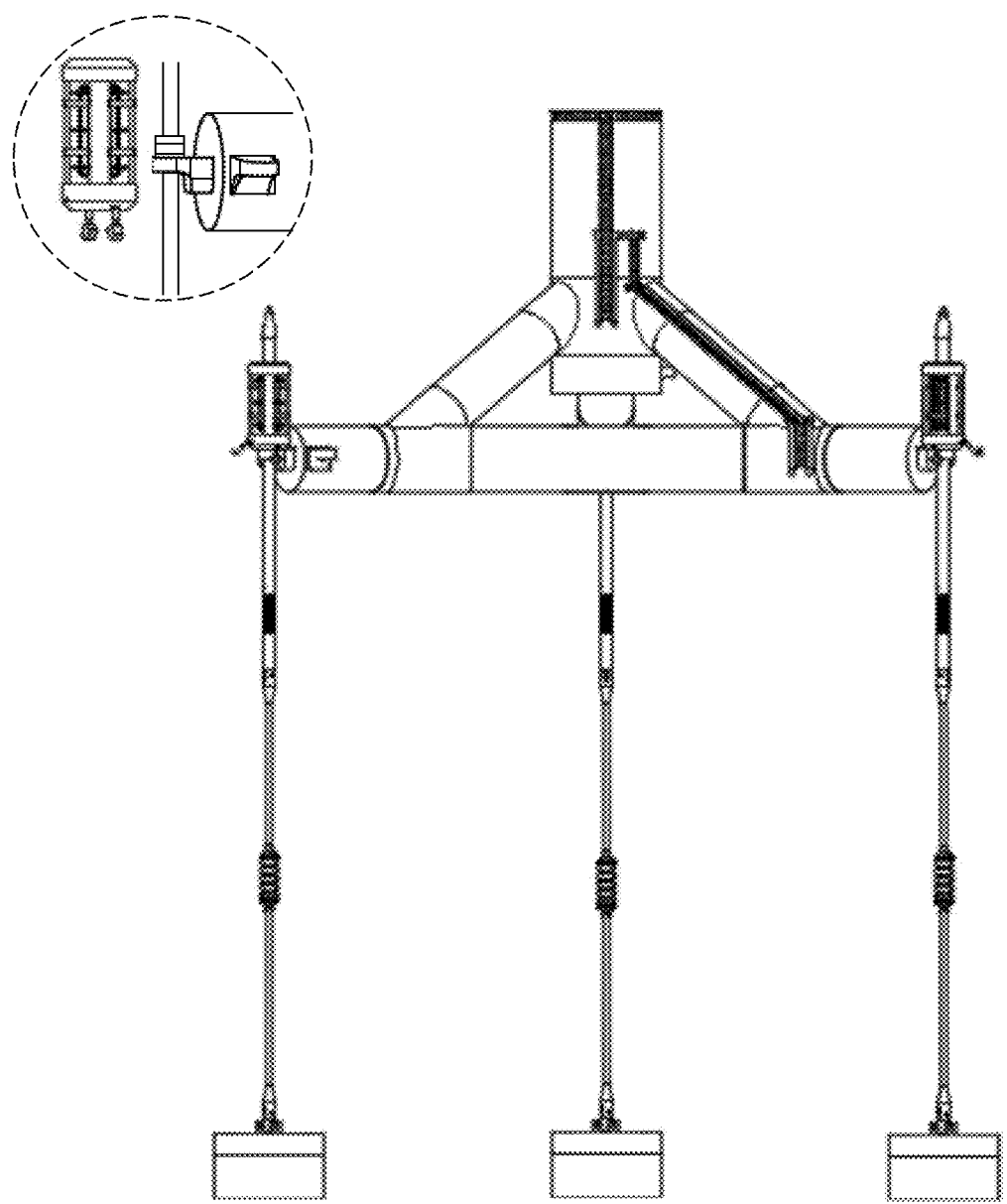

FIGS. 45A-45F illustrates the sequence of installing a SCTLP-FOWT 100. In the first stage, an installation vessel 2800 installs the anchor 125, tendons 123 and if required 127 and Length Adjustment Joint (LAJ) 122. Each tendon 123 and 127 is suspended vertically in the water column by temporary buoys 2400 and spacer wires 2406, as shown in FIG. 45A. In the second stage, the SCTLP-FOWT 100 is floated into position over the moorings 113a. Just prior to mating, the installation vessel 2800 installs the disconnectable/reusable LAJ installation tool 3312 (smooth pipe), as shown in FIG. 45B. The SCTLP-FOWT 100 is then hooked up to the LAJ installation tool 3312 and the TTCA 3300c is then installed. About 3 tensioners 3300 are connected over the TTCA 3300c, the gripper system/gripper pads 3300a engage to the LAJ installation tool 3312 and the hydraulic clasps 3313 grip the tendon porch 124a. The temporary buoys 2400 are now removed and returned to the installation vessel 2800, as shown in FIG. 45C. In the third stage, as shown in FIG. 45C, the SCTLP-FOWT 100 is then ballasted down while the three tensioners 3300 simultaneously crawl down the LAJ installation tool 3312 maintaining the SCTLP-FOWT 100 upright and level throughout the process. When the SCTLP-FOWT 100 reaches lock off position on the permanent LAJ 122 which has a threaded section, the TTCA 3300c make/break coupling 3300c is activated via ROV 2802/Hot Stab.

Figure 45D:
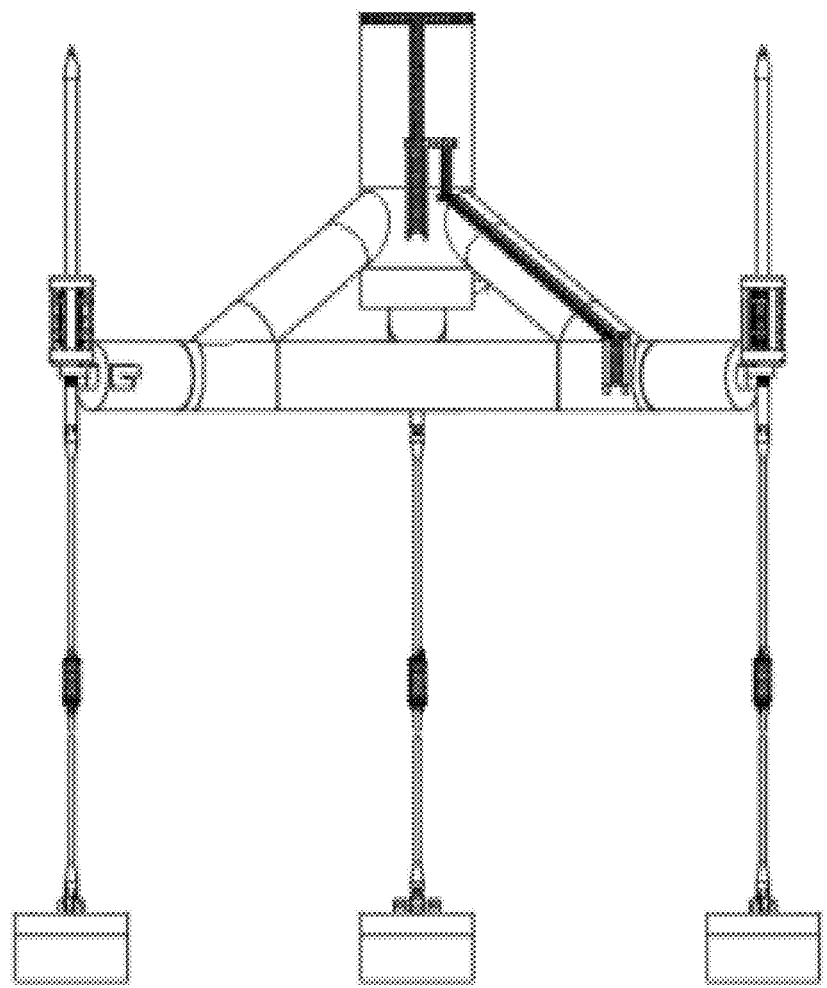
Figure 45E:
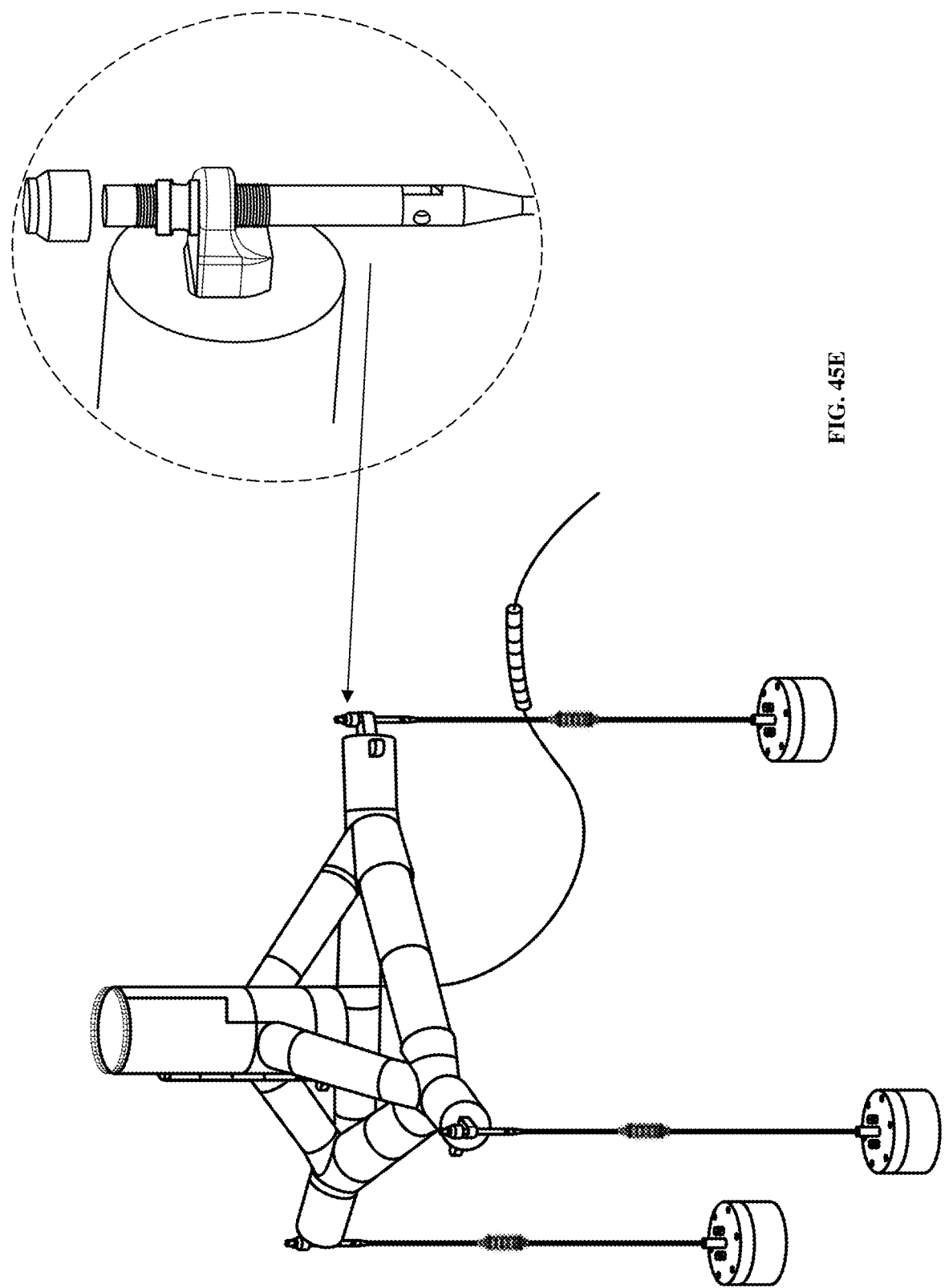
Figure 45F:
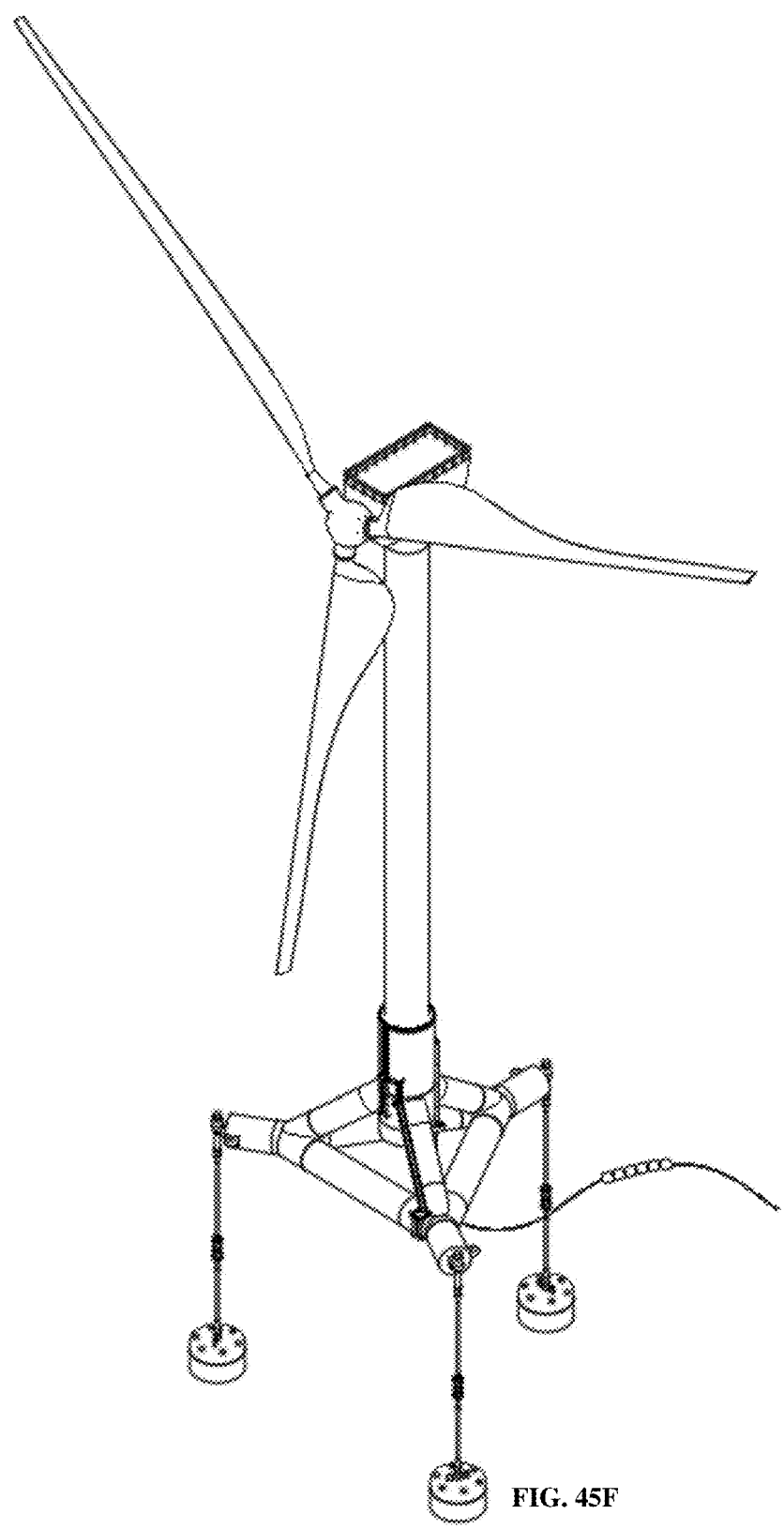

In the fourth stage, as shown in FIG. 45D, the SCTLP-FOWT 100 is levelled, and tension equalized to pre-calculated draft tension. The SCTLP-FOWT 100 is finally de-ballasted to in-place or operational draft, levelled and adjusted to pre-calculated in-place pre-tension. In the fifth stage, as shown in FIG. 45E, the LAJ installation tool 3312 is removed and reused on the next SCTLP-FOWT 100 installation. A TTCA 3300c protective red cover is installed over the TTCA and the installation is completed, as shown in FIG. 45F.

Figure 46A:
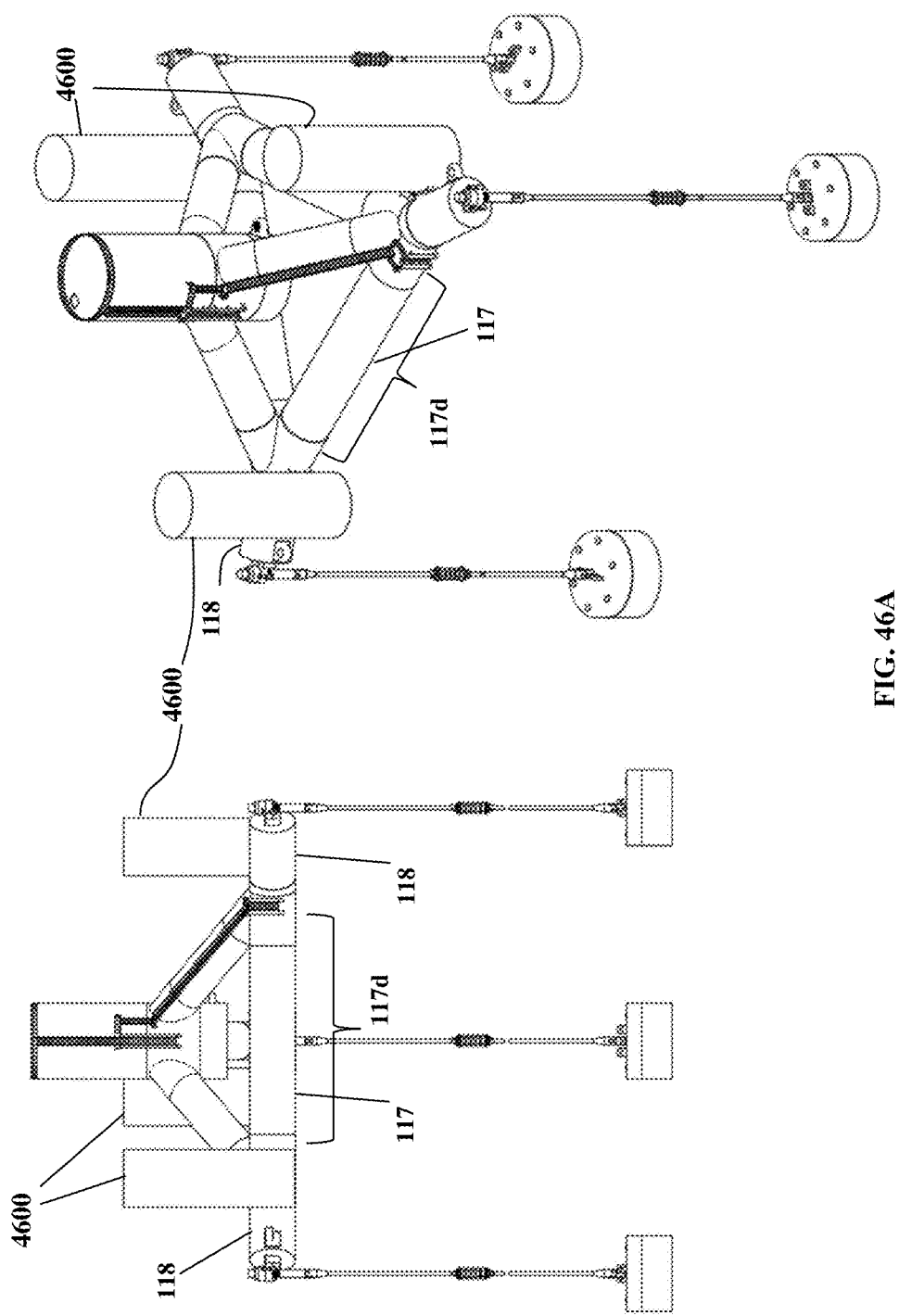
FIGS. 46A and 46B illustrate installation and removal of Temporary Buoyancy Tanks (TBTs) to and from the SCTLP-FOWT.
Figure 46B:
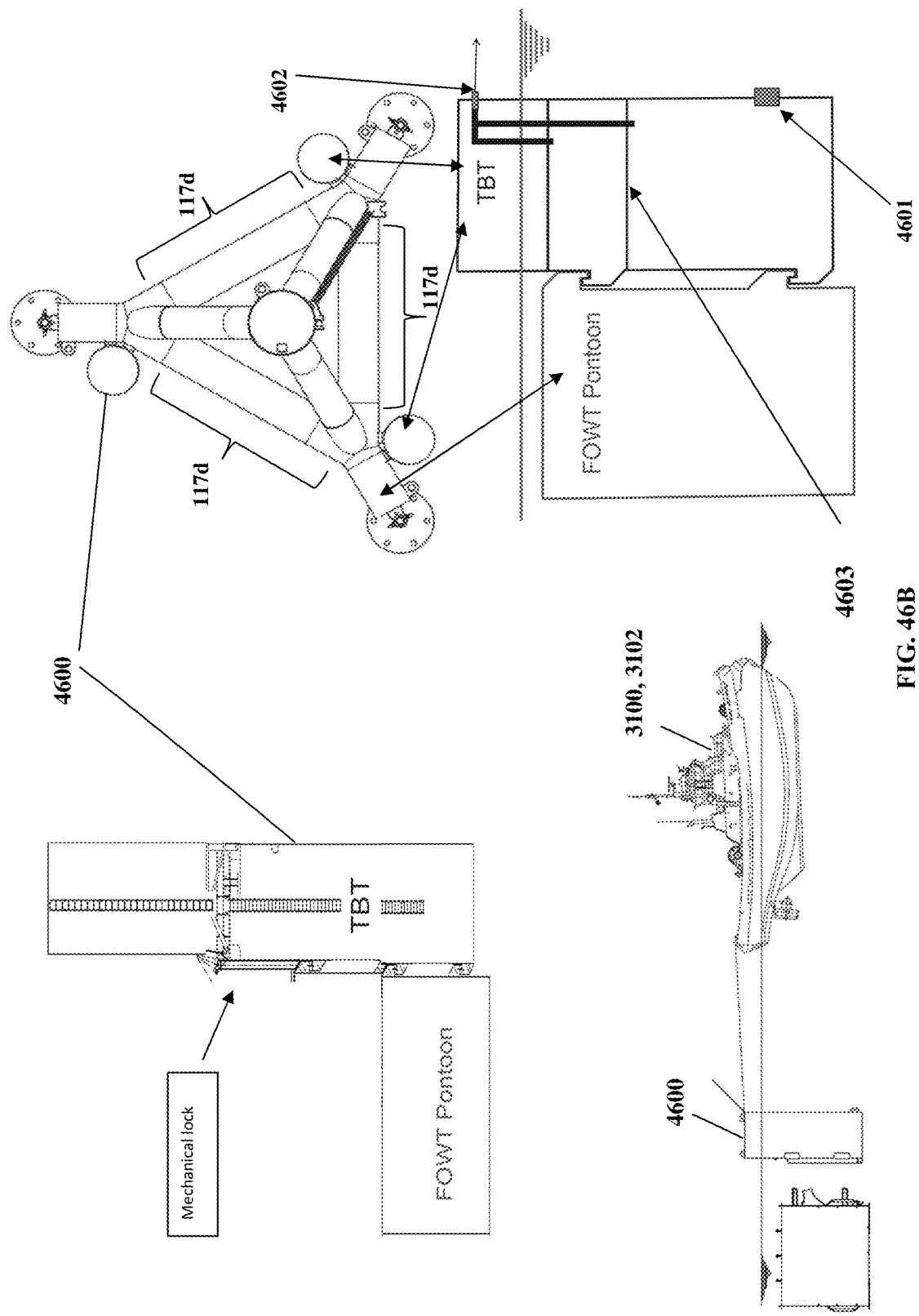

In an embodiment, instead of the reusable tensioner system installation tool 3300 and the LAJ installation tool 3312 to aid in the installation of the SCTLP-FOWT 100, a plurality of Temporary Buoyancy Tanks TBTs 4600, as shown in FIGS. 46A and 46B, are attached to a clear side 117d of the pontoons 117. In an embodiment, the TBTs 4600 are attached to either the pontoon extension 118, the column braces 121 or the central main vertical floating column 111. These TBTs 4600 are watertight cylindrical tanks designed with the required additional buoyancy to safely install the SCTLP-FOWT 100 and keep it stable without the support of the LAJ installation tool 3312 while it is being ballasted down to lock off draft/position 122d on the grooved/threaded section 122a of the permanent LAJ 122. Each TBT 4600 comprises one or more quick flooding mechanical rip out flooding plugs 4601 at the bottom of the TBT 4600 and one or more mechanical rip out vent plugs 4602 at the air vents (FIG. 46B) at a top of the TBT 4600 to flood the TBT 4600 in a controlled manner for removal post lock off. A watertight bulkhead 4603 will be installed in the upper part of the TBT 4600 to ensure sufficient reserve buoyancy post flooding and removal for wet tow stability. The TBTs 4600 are secured mechanically to the SCTLP-FOWT 100 and with buoyancy upthrust of the TBTs 4600 themselves. Post installation of the SCTLP-FOWT 100, tugs 3100 and 3102 pull the mechanical plugs and flood the TBTs 4600 allowing them to be disconnected and safely towed ashore for reuse on the next SCTLP-FOWT 100 installation.

In another embodiment, instead of the reusable tensioner system installation tool 3300, a full-length grooved Length Adjustment Joint (LAJ) (not shown) and LAJ installation tool 3312 may be used. This will allow for the Tendon Top Connector Assembly (TTCA) 3300c to be designed with a ratcheting mechanism (not shown). The ratcheting mechanism will allow the TTCA 3300c to be engaged in the ratcheting mode at the top of the LAJ installation tool 3312 and will rachet down the SCTLP-FOWT 100 along the grooves 122a as it is ballasted down to lock off draft. The ratcheting mechanism will not allow the SCTLP-FOWT 100 to move upwards. At lock off draft, the TTCA 3300c is fully activated using the ROV 2802 and the HPU unit (not shown), which secures the SCTLP-FOWT 100 to the LAJ 122. The rest of the installation remains the same as described above.

Figure 41:
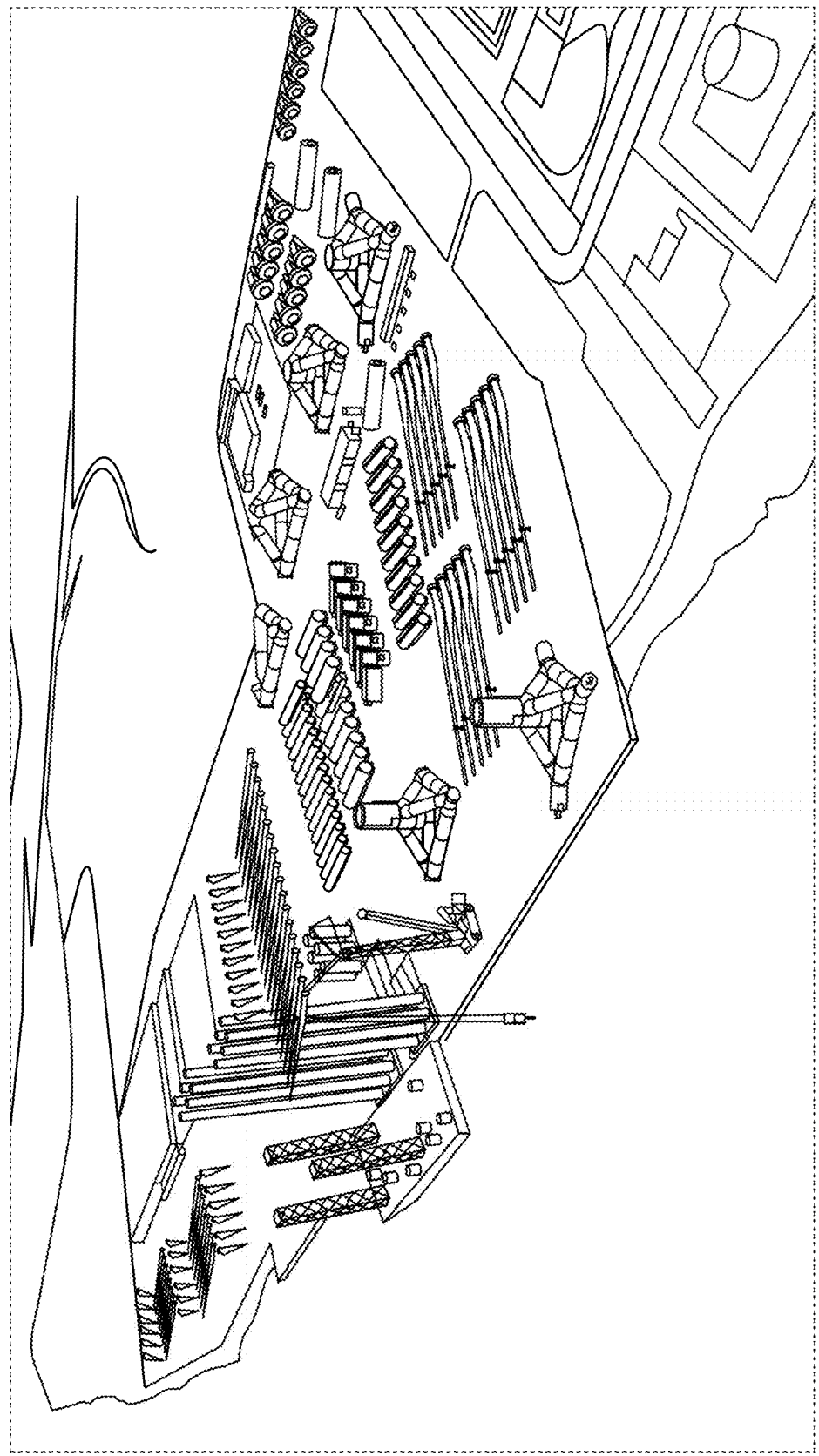
FIG. 41 illustrates quayside fabrication of the single column tension leg platform for the floating offshore wind turbine.

FIG. 41 illustrates quayside fabrication of the single column tension leg platform for the floating offshore wind turbine. The steps of fabrication of the triangular or circular hull or buoyant base 112 is the same. Depending on the fabrication yard/assembly point crane capacity, different factory line assembly plans may be implemented. A smaller commercial sized 800 MW floating wind project currently requires about 60-63 FOWT's units to be constructed and installed on a single project. On the contrary, the SCTLP-FOWT 100 is designed with a majority of simple easily rolled tubular pipes to mitigate the risk of Supply Chain Risk and optimize fabrication costs.

The following design features of the SCTLP-FOWT 100 ensure easy factory line fabrication assembly and deployment from ports:

1) The SCTLP-FOWT 100 is designed to float with a shallow draft, to enable the SCTLP-FOWT 100 to be assembled quayside and towed out from the ports which have a water depth of 20 ft or more.
2) Crane capacity at the main assembly point does not cause a limitation to the SCTLP-FOWT 100 fabrication since SCTLP-FOWT 100 is designed to be assembled entirely on the quay and then lifted into the water or partially fabricated on the quay and completed while afloat alongside the quay.
3) The design consists of simple parts made entirely of rolled tubular steel for inexpensive mass production which can be fabricated at numerous locations and shipped to the assembly point via deck carriers, freighters or tug and barge or by road. This is suitable for easy factory line assembly at the integration/assembly Port and mitigates supply chain risk when a large number of these units need to be produced for a single project.
4) The SCTLP-FOWT's 100 single top ring joint 120 and three end joints 119 are the only units which need to be fabricated by a more capable yard and shipped to the assembly/integration point. These units are specifically designed for quick and easy assembly of the pontoon extensions to the main pontoons and column braces by either welding or hydraulically fusing via quick connectors at the assembly or integration port/point. This facilitates factory line fabrication and assembly of the final product.
5) The Triangular or Circular hull, also referred to as buoyant base 112 is assembled using 3 straight or curved pontoons, 3 pontoon extensions, 3 column braces, a single top joint ring, 3 end joints, a central main vertical floating column 111 and a transition piece connector 116 located on top of the central main vertical floating column 111.

First, the Triangular or Circular buoyant base 112 is assembled on the quay with end joints and top ring joint forming the main skeleton of the SCTLP-FOWT 100. Next the pontoon extensions with tendon porches are connected to the end joints. The connections can be made either by welding or hydraulically fusing via quick connectors. At this stage, the buoyant base 112 is structurally sound to be lifted and placed in the water quayside if sufficient crane capacity is not available at the assembly/integration point. If there is adequate crane capacity, the central main vertical floating column 111 can be inserted through the top ring joint and welded in place on the quay, after which the redundant mooring tendon porch 115b or mooring point 115b can be added to the vertical tubular column hull 115 of central main vertical floating column 111 to make the structure of the buoyant base 112 whole. In an embodiment, a lower opening 120a of the top ring joint 120 is positioned over the top surface 115a vertical tubular column hull 115 and then the top ring joint 120 is slid over the vertical tubular column hull 115. The top ring joint 120 is then welded to the lower section 115c of the vertical tubular column hull 115. At this stage the buoyant base 112 can be lifted and placed in the water quayside. While safely afloat alongside the quay, the tower, turbine and blades can be integrated, commissioned and tested. Next, the boat landing, access ladders, lighting, passive ballast system 4300 & marine systems and all other systems required for the SCTLP-FOWT 100 operation are integrated, commissioned and tested. The buoyant base 112 is ballasted to tow out draft using external pumps, towing bridle hooked up and tow out commenced to installation site.

If there is inadequate crane capacity at the fabrication/assembly yard or port, the buoyant base 112 structure without the main vertical floating column 111 can be lifted off the quay and place in the water quayside for final integration. At the lift stage, the unit is structurally sound to be lifted and placed in the water quayside. Next, the main vertical floating column 111 is lifted and integrated with the lower buoyant base 112 structure. The steps of attaching the redundant mooring tendon porch 115b, tower/turbine assembly, ballasting and tow out will remain unchanged. The fabrication sequence listed above may be changed depending on the fabrication facilities and launching facilities.

FIGS. 42A and 42B illustrate exemplary load reduction devices (LRD) 157. The tendons will most probably be fitted with OEM delivered Load Reduction Devices (LRD) 157 which can substantially reduce peak tendon tension leading to station keeping system optimization mainly but not limited to tendon size, tendon top/bottom connector, full anchor system and tendon porch optimization.

The foregoing examples and illustrative implementations of various embodiments have been provided merely for explanation and are in no way to be construed as limiting of the embodiments disclosed herein. Dimensions of various parts of the modular plug-in power distribution panel assembly disclosed above are exemplary, and are not limiting of the scope of the embodiments herein. While the embodiments have been described with reference to various illustrative implementations, drawings, and techniques, it is understood that the words, which have been used herein, are words of description and illustration, rather than words of limitation. Furthermore, although the embodiments have been described herein with reference to particular means, materials, techniques, and implementations, the embodiments herein are not intended to be limited to the particulars disclosed herein; rather, the embodiments extend to all functionally equivalent structures, methods and uses, such as are within the scope of the appended claims. It will be understood by those skilled in the art, having the benefit of the teachings of this specification, that the embodiments disclosed herein are capable of modifications and other embodiments may be effected and changes may be made thereto, without departing from the scope and spirit of the embodiments disclosed herein.

I claim:

1. A single column tension leg platform for a floating offshore wind turbine, comprising:
    a central main vertical floating column, wherein the central main vertical floating column comprises:
        a vertical tubular column hull;
        a transition piece connector at a top end of the vertical tubular column hull for connecting the vertical tubular column hull to a nacelle rotor assembly;
        a plurality of decks within the vertical tubular column hull for housing a passive ballast system and a plurality of marine systems, wherein the passive ballast system comprises a plurality of ballast tanks for water and/or permanent ballast;
        firefighting equipment;
        lifesaving equipment;
        a plurality of mooring points and hook up systems;
        a plurality of temporary installation aids; and
        power generation equipment;
    a buoyant base attached to and disposed below the central main vertical floating column;
    a station keeping system; and
    an inter array cable riser system.

2. The single column tension leg platform of claim 1, wherein the nacelle rotor assembly comprises:
    a tower comprising two or more tower sections;
    a nacelle;
    a plurality of rotor blades;
    a turbine;
    a turbine shaft;
    a generator;
    a plurality of struts; and
    one or more lighting systems.

3. A single column tension leg platform for a floating offshore wind turbine, comprising:
    a central main vertical floating column;
    a buoyant base attached to and disposed below the central main vertical floating column, wherein the buoyant base comprises:
        three or more pontoons, wherein each of the pontoons comprises one or more pontoon sections;
        three or more pontoon extensions;
        three or more end joints for connecting the pontoons and the pontoon extensions;
        three or more column braces for connecting the pontoons to the vertical tubular column hull;
        a top ring joint for connecting the three or more column braces; and
        a plurality of ballast tanks;
    a station keeping system;
    an inter array cable riser system; and
    a plurality of temporary buoyancy tanks attached to one of a clear side of the pontoons, the pontoon extensions, the column braces, and the central main vertical floating column, wherein each of the temporary buoyancy tanks comprise one or more quick flooding mechanical rip out flooding plugs at a bottom of the temporary buoyancy tank and one or more mechanical rip out vent plugs at an air vent at a top of the temporary buoyancy tank.

4. A single column tension leg platform for a floating offshore wind turbine, comprising:
    a central main vertical floating column;
    a buoyant base attached to and disposed below the central main vertical floating column;
    a station keeping system, wherein the station keeping system comprises:
        a plurality of moorings;
        a plurality of buoys;
        permanent length adjustment joint;
        a plurality of tendons;
        a main tendon porch and one or more spare tendon porches;
        an anchoring system;
        a plurality of micropiles; and
        a spare tendon; and
    an inter array cable riser system.

5. A single column tension leg platform for a floating offshore wind turbine, comprising:
    a central main vertical floating column;
    a buoyant base attached to and disposed below the central main vertical floating column;
    a station keeping system; and
    an inter array cable riser system, wherein the inter array cable riser system comprises:
        a cable hull entry point assembly;
        riser system; and
        mattressing.

6. The single column tension leg platform of claim 1, wherein the buoyant base is of one of a triangular shape and a circular shape.

7. The single column tension leg platform of claim 1, wherein the nacelle rotor assembly comprises one of a horizontal axis wind turbine (HAWT) and a vertical axis wind turbine (VAWT).

8. The single column tension leg platform of claim 1, wherein the station keeping system is one of a tension leg, micropiled drilled helical anchoring system, a turret based rotating system, a hybrid combination of gravity, suction, and driven pile.

9. The single column tension leg platform of claim 3, wherein the pontoons and pontoon sections are one of curved and straight.

10. A method for assembling and installing a single column tension leg platform-floating offshore wind turbine (SCTLP-FOWT), comprising:
    providing the single column tension leg platform, comprising:
        a central main vertical floating column;
        a buoyant base;
        a station keeping system; and
        an inter array cable riser system;
    assembling the single column tension leg platform, comprising:
        assembling the buoyant base by connecting three or more pontoons, three or more pontoon extensions, main and spare tendons, three or more end joints, three or more column braces, and a top ring joint;
        assembling the central main vertical floating column, comprising:

outfitting a vertical tubular column hull of the central main vertical floating column by housing, within the vertical tubular column hull, parts comprising:
- a plurality of decks for housing a passive ballast system, wherein the passive ballast system comprises a plurality of ballast tanks for water and/or permanent ballast;
- a plurality of marine systems;
- firefighting equipment;
- lifesaving equipment;
- a plurality of mooring points and hook up systems;
- a plurality of temporary installation aids; and
- power generation equipment;

positioning the buoyant base below the central main vertical floating column, attaching the central main vertical floating column to the buoyant base, and fitting a redundant mooring tendon porch to a base of the vertical tubular column hull;

attaching the three or more column braces to the vertical tubular column hull, wherein the buoyant base provides support to the vertical tubular column hull of the central main vertical floating column;

attaching a transition piece connector at a top end of the vertical tubular column hull and attaching the wind turbine to the vertical tubular column hull using the transition piece connector;

installing the station keeping system at an offshore installation site, wherein the station keeping system comprises a plurality of moorings, a plurality of buoys, a plurality of spacer wires, a permanent length adjustment joint, a plurality of tendons, an anchoring system, a plurality of micropiles, a plurality of load reduction devices, a main tendon porch and one or more spare tendon porches, wherein installing the station keeping system comprises anchoring the station keeping system to the floor of a water body using an anchoring system;

ballasting down the single column tension leg platform to tow out draft, towing out the SCTLP-FOWT to the offshore installation site, attaching the assembled single column tension leg platform to the station keeping system at the offshore installation site, ballasting down the SCTLP-FOWT to lock off draft, hooking up the single column tension leg platform to the permanent length adjustment joint, and de-ballasting the single column tension leg platform to tension the moorings and bringing the single column tension leg platform to operational draft; and connecting the inter array cable riser system to the SCTLP-FOWT and to an electrical substation for stabilization before transmitting power generated by the SCTLP-FOWT to the electrical substation, wherein the inter array cable riser system comprises a cable hull entry point assembly, a riser system, and mattressing to protect the cable at landing point on the floor of the water body.

11. The method of claim 10, wherein attaching the wind turbine to the vertical tubular column hull using the transition piece connector further comprises assembling the wind turbine, comprising:
- connecting the vertical tubular column hull of the single column tension leg platform to a tower of a nacelle rotor assembly using the transition piece connector;
- installing the nacelle rotor assembly on top of the tower; and
- attaching a plurality of rotor blades to a nose cone of the nacelle through struts, wherein the nose cone is attached to a shaft of the generator.

12. The method of claim 10, further comprising:
- installing the anchoring system in the floor of the water body using the micropiles;
- attaching the tendons to the anchoring system using a tendon bottom connector which connects into main tendon connector on the anchoring system; and
- fitting a load reduction device in each of the moorings.

13. The method of claim 12, further comprising:
- fitting a short permanent length adjustment joint (LAJ) to top of the tendon with a temporary buoy in between the short permanent length adjustment joint and the tendon;
- lowering the single column tension leg platform and positioning the single column tension leg platform over the tendons;
- installing a disconnectable and reusable length adjustment joint (LAJ) installation tool, a tendon top connector assembly (TTCA), and a tensioner system, after positioning the single column tension leg platform over the tendons;
- connecting the length adjustment joint (LAJ) installation tool to the permanent length adjustment joint (LAJ) which is attached to the top of tendon;
- using the tensioner system to enable the installation, wherein the tensioner system grips the length adjustment joint (LAJ) installation tool and the tendon porch using four sets of gripper pads and a pair of hydraulic clasps in the tensioner system;
- activating the tensioner system to lock the single column tension leg platform to the tendons during the installation process;
- removing the buoys and initiating crawl of the tensioner system simultaneously along with ballasting down of the single column tension leg platform, wherein the tensioner system presses down on the tendon porch and maintains a constant pre-determined pressure while gripping the LAJ installation tool and tendon porch securely, thereby holding the single column tension leg platform firmly in position to the tendons until lock off position/draft is reached;
- levelling the single column tension leg platform using ballast when the single column tension leg platform reaches the lock off draft position on a grooved section of the permanent length adjustment joint (LAJ);
- activating the tendon top connector assembly (TTCA) when the single column tension leg platform is fully levelled and upright, and locking the single column tension leg platform to the permanent length adjustment joint (LAJ) and the pre-installed tendons;
- levelling the single column tension leg platform again, and pre-tension equalizing the single column tension leg platform to a pre-calculated lock off draft pre-tension value, after the single column tension leg platform is locked;
- de-ballasting the single column tension leg platform in a controlled manner to in-place or installation draft while closely monitoring draft, tendon tension and maintaining the single column tension leg platform upright throughout the process;
- fine-tuning intended pre-tension by ballast adjustments while ensuring the single column tension leg platform is upright after the single column tension leg platform has reached its final in-place or installation draft; and securing the ballast system and removing the tensioner system and the length adjustment joint (LAJ) installation tool from the single column tension leg platform.

14. The method of claim 12, further comprising:
attaching a plurality of temporary buoyancy tanks (TBTs) to one of the pontoon extensions, the column braces, the central main vertical floating column, and to a clear side of the pontoons, wherein the SCTLP-FOWT is attached with the temporary buoyancy tanks (TBTs) and a plurality of tendon top connector assemblies (TTCAs) ashore, and wherein the tendon top connector assemblies (TTCAs) are attached to a top of the tendon porches;
floating the SCTLP-FOWT, towing the SCTLP-FOWT over the water body using towing tugs, and positioning the SCTLP-FOWT over the tendons of the pre-installed moorings;
ballasting down the SCTLP-FOWT in a free and controlled manner to engage a grooved permanent length adjustment joint (LAJ) and reach lock off draft on the grooved permanent length adjustment joint (LAJ), with a plurality of towing tugs maintaining the SCTLP-FOWT in position over the tendons of the pre-installed moorings and the temporary buoyancy tanks (TBTs) maintaining stability of the SCTLP-FOWT;
activating the tendon top connector assemblies (TTCAs) when the single column tension leg platform is fully levelled and upright at lock off draft, and locking the SCTLP to the permanent length adjustment joint (LAJ) and the pre-installed tendons;
removing the buoys, unhooking the towing tugs from the SCTLP-FOWT, wherein the towing tugs are used to pull one or more mechanical rip out flooding plugs and one or more mechanical rip out vent plugs in each of the temporary buoyancy tanks (TBTs) and flood the temporary buoyancy tanks (TBTs) for allowing disconnection and towing of the temporary buoyancy tanks (TBTs);
levelling the single column tension leg platform again, and pre-tension equalizing the single column tension leg platform to a pre-calculated lock off draft pre-tension value, after the single column tension leg platform is locked;
de-ballasting the single column tension leg platform in a controlled manner to in-place or installation draft while closely monitoring draft, tendon tension and maintaining the single column tension leg platform upright throughout the process;
fine-tuning intended pre-tension by ballast adjustments while ensuring the single column tension leg platform is upright after the single column tension leg platform has reached its final in-place or installation draft; and
securing the ballast system and removing the tensioner system and the length adjustment joint (LAJ) installation tool from the single column tension leg platform.

15. The method of claim 12, further comprising:
providing a full-length grooved length adjustment joint (LAJ) and a length adjustment joint (LAJ) installation tool,
fitting the full-length grooved length adjustment joint to top of the tendon with a temporary buoy in between the full-length grooved length adjustment joint and the tendon;
lowering the single column tension leg platform and positioning the single column tension leg platform over the tendons;
installing the length adjustment joint (LAJ) installation tool and a tendon top connector assembly (TTCA), after positioning the single column tension leg platform over the tendons, wherein the tendon top connector assembly (TTCA) comprises a ratcheting mechanism;
connecting the length adjustment joint (LAJ) installation tool to the full-length grooved length adjustment joint (LAJ) which is attached to the top of tendon;
engaging the ratcheting mechanism in the tendon top connector assembly (TTCA) with the grooves in the full-length grooved length adjustment joint (LAJ);
removing the temporary buoys and ratcheting down the SCTLP-FOWT along the grooves to ballast down the SCTLP-FOWT to lock off draft using the ratcheting mechanism in the tendon top connector assembly (TTCA), wherein the ratcheting mechanism is configured to preclude the SCTLP-FOWT from moving upwards;
levelling the single column tension leg platform using ballast when the single column tension leg platform reaches the lock off draft position on a grooved section of the full-length grooved length adjustment joint (LAJ);
activating the tendon top connector assembly (TTCA) when the single column tension leg platform is fully levelled and upright using a remotely operated vehicle (ROV) and a hydraulic power unit (HPU) to secure the SCTLP-FOWT to the full-length grooved length adjustment joint (LAJ), and locking the single column tension leg platform to the permanent length adjustment joint (LAJ) and the pre-installed tendons;
levelling the single column tension leg platform again, and pre-tension equalizing the single column tension leg platform to a pre-calculated lock off draft pre-tension value, after the single column tension leg platform is locked;
de-ballasting the single column tension leg platform in a controlled manner to in-place or installation draft while closely monitoring draft, tendon tension and maintaining the single column tension leg platform upright throughout the process;
fine-tuning intended pre-tension by ballast adjustments while ensuring the single column tension leg platform is upright after the single column tension leg platform has reached its final in-place or installation draft; and
securing the ballast system and removing the length adjustment joint (LAJ) installation tool from the single column tension leg platform.

16. The method of claim 12, wherein the load reduction device is installed in each of the moorings, wherein the load reduction device is configured to reduce peak tendon tensions to which the entire station keeping system is designed.

17. The method of claim 10, wherein a nacelle rotor assembly is attached to the assembled and installed single column tension leg platform using the transition piece connector at the top end of the vertical tubular column hull.

18. The method of claim 10, wherein disposing the buoyant base below the central main vertical floating column further comprises fitting a redundant mooring tendon porch to the base of the vertical column, and fitting one or more spare tendon porches to each of the pontoon extensions.

* * * * *